(12) United States Patent
Zhang et al.

(10) Patent No.: US 12,556,625 B2
(45) Date of Patent: Feb. 17, 2026

(54) ROTATING SHAFT MECHANISM AND TERMINAL DEVICE

(71) Applicant: Honor Device Co., Ltd., Shenzhen (CN)

(72) Inventors: Yaolei Zhang, Shenzhen (CN); Bin Yan, Shenzhen (CN); Guotong Zhou, Shenzhen (CN); Yihe Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 244 days.

(21) Appl. No.: 18/576,854

(22) PCT Filed: Dec. 26, 2022

(86) PCT No.: PCT/CN2022/141975
§ 371 (c)(1),
(2) Date: Jan. 5, 2024

(87) PCT Pub. No.: WO2023/138313
PCT Pub. Date: Jul. 27, 2023

(65) Prior Publication Data
US 2024/0291913 A1    Aug. 29, 2024

(30) Foreign Application Priority Data

Jan. 18, 2022 (CN) .................. 202210064711.X
Jan. 20, 2022 (CN) .................. 202210071650.X
Apr. 8, 2022 (CN) .................. 202210371279.9

(51) Int. Cl.
*G06F 1/16* (2006.01)
*H04M 1/02* (2006.01)

(52) U.S. Cl.
CPC .......... *H04M 1/022* (2013.01); *G06F 1/1618* (2013.01); *G06F 1/1681* (2013.01)

(58) Field of Classification Search
CPC .................................................... G06F 1/1681
See application file for complete search history.

(56) References Cited

U.S. PATENT DOCUMENTS 11,846,997 B2      12/2023   Liao et al.
11,977,421 B2 *    5/2024    Yang ..................... E05D 11/082
(Continued)

FOREIGN PATENT DOCUMENTS

CN    209358590 U    9/2019
CN    111045485 A    4/2020
(Continued)

*Primary Examiner* — Adrian S Wilson
(74) *Attorney, Agent, or Firm* — Leydig, Voit & Mayer, Ltd.

(57) ABSTRACT

Embodiments of this application relate to the technical field of terminal devices, and provide a rotating shaft mechanism and a terminal device. The rotating shaft mechanism includes a base, a swing arm, a connection assembly, and a shaft cover. The shaft cover is provided with an accommodating space, at least part of the base is arranged in the accommodating space, and the swing arm is rotatably connected to the base, so that the swing arm is rotatable between an unfolded position and a folded position relative to the base. The connection assembly is connected between the swing arm and the shaft cover, and the swing arm may drive the shaft cover to move toward the base through the connection assembly during rotation of the swing arm from the unfolded position to the folded position. This application may be applied to a terminal device such as a mobile phone.

20 Claims, 33 Drawing Sheets

(56) References Cited

U.S. PATENT DOCUMENTS

| | | | |
|---|---|---|---|
| 12,242,301 B2 * | 3/2025 | Hou | G06F 1/1652 |
| 2017/0010637 A1 * | 1/2017 | Garelli | G06F 1/203 |
| 2020/0315047 A1 | 10/2020 | Kang et al. | |
| 2021/0355988 A1 | 11/2021 | Cheng et al. | |
| 2022/0353354 A1 * | 11/2022 | Song | H04M 1/022 |
| 2024/0004430 A1 | 1/2024 | Zhao et al. | |
| 2024/0098915 A1 | 3/2024 | Zhang et al. | |
| 2024/0111340 A1 | 4/2024 | Niu et al. | |
| 2024/0179229 A1 | 5/2024 | Fu et al. | |
| 2024/0259487 A1 | 8/2024 | Sun et al. | |

FOREIGN PATENT DOCUMENTS

| | | |
|---|---|---|
| CN | 111416890 A | 7/2020 |
| CN | 111692196 A | 9/2020 |
| CN | 112243053 A | 1/2021 |
| CN | 213028129 U | 4/2021 |
| CN | 112751961 A | 5/2021 |
| CN | 113067923 A | 7/2021 |
| CN | 113315860 A | 8/2021 |
| CN | 113870692 A | 12/2021 |
| CN | 113888960 A | 1/2022 |
| CN | 113890910 A | 1/2022 |
| CN | 113923281 A | 1/2022 |
| EP | 4117257 A1 | 1/2023 |
| JP | 2020125791 A | 8/2020 |

* cited by examiner

ROTATING SHAFT MECHANISM AND TERMINAL DEVICE

CROSS-REFERENCE TO RELATED APPLICATIONS

This application is a national stage of International Application No. PCT/CN2022/141975, filed on Dec. 26, 2022, which claims priority to Chinese Patent Application No. 202210064711.X, filed on Jan. 18, 2022, Chinese Patent Application No. 202210071650.X, filed on Jan. 20, 2022, and Chinese Patent Application No. 202210371279.9, filed on Apr. 8, 2022. The disclosures of all the aforementioned applications are hereby incorporated by reference in their entireties.

TECHNICAL FIELD

This application relates to the field of terminal device technologies, and in particular, to a rotating shaft mechanism and a terminal device.

BACKGROUND

A foldable screen mobile phone (or another terminal device with a foldable screen) is currently a hot area of electronic products, in which a rotating shaft mechanism is one of core components thereof, which is used to implement the function of folding and unfolding a display screen. In the related art, a rotating shaft mechanism includes a swing arm and a shaft cover, two sub-bodies of a terminal device are configured to bear a display screen, and the shaft cover functions to shield an internal structure to beautify the appearance of a joint between the two sub-bodies. The swing arm is connected to the sub-bodies and the shaft cover, and the swing arm can swing with the sub-bodies relative to the shaft cover, so that the two sub-bodies are switchable between a folded state and an unfolded state.

In the process of folding the display screen between the two sub-bodies of the foregoing terminal device, due to a limitation on the structural space at the joint between the two sub-bodies, when the two sub-bodies are in the folded state, a big gap exists between the shaft cover and each of the sub-bodies, and an internal component of the terminal device is easily exposed from the gap between the shaft cover and the sub-body. As a result, external water, dust, and the like can easily enter inside of the terminal device, which adversely affects normal operation of the internal element.

SUMMARY

Embodiments of this application provide a rotating shaft mechanism and a terminal device, which can resolve a problem that a shaft cover in the rotating shaft mechanism in the related art cannot desirably cover an internal space of the terminal device.

To achieve the foregoing objective, the following technical solutions are used in embodiments of this application:

According to a first aspect, an embodiment of this application provides a rotating shaft mechanism, including a base, a swing arm, a connection assembly, and a shaft cover. The shaft cover is provided with an accommodating space, at least part of the base is arranged in the accommodating space, and the swing arm is rotatably connected to the base, so that the swing arm is rotatable between an unfolded position and a folded position relative to the base. The connection assembly is connected between the swing arm and the shaft cover, and the swing arm drives the shaft cover to move toward the base through the connection assembly during rotation of the swing arm from the unfolded position to the folded position.

Through the foregoing technical solution, the shaft cover is driven by the connection assembly to move toward the base during rotation of the swing arm from the unfolded position to the folded position, so as to "lift" the shaft cover, so that the shaft cover can extend into the gap formed between the two sub-bodies when the terminal device is in the folded state, thereby increasing an amount of overlap between the shaft cover and the sub-bodies. In this way, the shaft cover can cover the internal element of the terminal device desirably, so that external water, dust, and the like can be better prevented from entering the inside of the terminal device, so as to ensure the normal operation of the internal element of the terminal device.

In some embodiments, the connection assembly includes a toggle member, and the toggle member rotates with the swing arm to drive the shaft cover to move toward the base during rotation of the swing arm from the unfolded position to the folded position.

Through the foregoing technical solution, a number of components of the connection assembly can be relatively small, which is not only beneficial to reducing the cost, but also beneficial to improving connection reliability between the connection assembly and the shaft cover.

In some embodiments, the toggle member includes a rotating shaft and an eccentric portion eccentrically arranged relative to the rotating shaft, the swing arm is rotatably connected to the base through the rotating shaft, the rotating shaft is fixed relative to the swing arm in a circumferential direction, and the eccentric portion abuts against the shaft cover to drive the shaft cover to move toward the base during rotation of the swing arm from the unfolded position to the folded position.

Through the foregoing technical solution, the eccentric portion is arranged eccentrically relative to the rotating shaft, so that during rotation of the swing arm, a movement trajectory of the eccentric portion occupies less space, and the eccentric portion may not interfere with surrounding components.

In some embodiments, the shaft cover is provided with a cavity, the eccentric portion extends into the cavity, and during rotation of the swing arm toward the folded position relative to the base, the eccentric portion is movable in the cavity and abuts against an inner wall of the cavity to drive the shaft cover to move toward the base.

Through the foregoing technical solution, the cavity can limit the eccentric portion, and the eccentric portion can smoothly drive the shaft cover to move and may not be detached from the shaft cover, thereby improving the connection reliability between the toggle member and the shaft cover.

In some embodiments, the eccentric portion is movable in the cavity in a width direction of the shaft cover; and in a first direction, the cavity has a first inner wall and a second inner wall opposite to each other, the first inner wall and the second inner wall abut against the eccentric portion, and the first direction is perpendicular to both a length direction of the shaft cover and the width direction of the shaft cover.

Through the foregoing technical solution, the eccentric portion not only can "lift" the shaft cover, but also can "lower" the shaft cover, and then a restoring member such as a spring does not need to be arranged to restore the shaft cover, so that the connection assembly has a simpler structure and fewer components. Moreover, during the rotation of the swing arm, the eccentric portion can keep in contact with the first inner wall and the second inner wall of the cavity, so as to avoid shaking or noise of the shaft cover caused by a collision between the eccentric portion and the first inner wall or the second inner wall at an initial stage or an end stage of the rotation of the swing arm as much as possible, and also avoid lagging of the shaft cover being lifted or lowered with the swing arm as much as possible, so that the shaft cover moves stably and smoothly during the folding and unfolding the display screen.

In some embodiments, the shaft cover includes a shaft cover wall and a shaft cover connector, the shaft cover wall defines the accommodating space, at least part of the shaft cover connector is arranged in the accommodating space and detachably connected to the shaft cover wall, and the cavity is arranged on the shaft cover connector.

Through the foregoing technical solution, when the structure of the cavity is damaged, it is not necessary to replace the whole shaft cover, which is beneficial to reducing the maintenance cost.

In some embodiments, in the width direction of the shaft cover, an end of the shaft cover connector is provided with an opening in communication with the cavity, and the opening is configured for the eccentric portion to extend into the cavity.

Through the foregoing technical solution, the eccentric portion can conveniently extend into the cavity, which is beneficial to improving the mounting efficiency of the toggle member.

In some embodiments, a limiting flange is arranged on the shaft cover wall, and the limiting flange is arranged opposite to the opening to limit at least part of the eccentric portion in the cavity.

Through the foregoing technical solution, the eccentric portion may be prevented from completely moving out of the cavity from the opening during the rotation of the rotating shaft.

In some embodiments, the eccentric portion is a columnar structure protruding relative to the rotating shaft, and a central axis of the eccentric portion is parallel to and different from a central axis of the rotating shaft.

Through the foregoing technical solution, the space occupied by the movement trajectory of the eccentric portion can be smaller.

In some embodiments, the rotating shaft includes a flat section and a cylindrical section, and the eccentric portion, the flat section, and the cylindrical section are connected in sequence; the swing arm is provided with a flat hole fitting the flat section, so that the rotating shaft is fixed relative to the swing arm in the circumferential direction; the swing arm is further provided with a swing arm hole fitting the cylindrical section; and the base is provided with base holes for the flat section and the cylindrical section to be inserted, and a shaft section of the flat section exposed from the flat hole and a shaft section of the cylindrical section exposed from the swing arm hole are respectively inserted into the corresponding base hole.

Through the foregoing technical solution, the structure of the toggle member is simple and compact, and the swing arm can also drive the rotating shaft to rotate while realizing the rotatable connection between the swing arm and the base, so as to drive the eccentric portion to rotate without driving the base to move.

In some embodiments, the eccentric portion and the rotating shaft are integrally formed.

Through the foregoing technical solution, the connection strength between the toggle portion and the rotating shaft can be improved, and the number of components of the rotating shaft mechanism can be reduced.

In some embodiments, the shaft cover is slidably connected to the base in the first direction, so that the shaft cover is movable toward the accommodating space in the first direction, and the first direction is perpendicular to both the length direction of the shaft cover and the width direction of the shaft cover.

Through the foregoing technical solution, the shaft cover may be prevented from shaking in a process of the swing arm driving the shaft cover to move close to or away from the accommodating space, so that the shaft cover can move more stably.

In some embodiments, the swing arm drives the shaft cover to move away from the base through the connection assembly during rotation of the swing arm from the folded position to the unfolded position.

Through the foregoing technical solution, the swing arm can drive the shaft cover to realize bidirectional movement through the connection assembly, so that the connection structure between the connection assembly and the shaft cover is relatively simple, and the number of components of the connection assembly is relatively small.

In some embodiments, the swing arm includes a first swing arm and a second swing arm, the first swing arm and the second swing arm are both rotatably connected to the base, the second swing arm has the unfolded position and the folded position, and the second swing arm is connected to the shaft cover through the connection assembly; and the first swing arm is connected to the second swing arm through a first connection structure, so that the first swing arm drives the second swing arm to rotate between the unfolded position and the folded position.

Through the foregoing technical solution, a sliding connection structure connected to the swing arm does not need to be arranged on the sub-body, thereby simplifying the connection between the swing arm and the sub-body, and improving the connection reliability between the swing arm and the sub-body.

In some embodiments, the first connection structure includes a sliding groove and a sliding part, the sliding groove is arranged on one of the first swing arm and the second swing arm, and the sliding part is arranged on the other of the first swing arm and the second swing arm; and one end of the sliding groove is arranged close to the base, the other end of the sliding groove is arranged away from the base, and the sliding part slidably fits the sliding groove.

Through the foregoing technical solution, in this way, the first connection structure has a simple structure and occupies small space.

In some embodiments, the first swing arm and the second swing arm are arranged side by side in the length direction of the shaft cover.

Through the foregoing technical solution, it can be convenient to mount and disassemble the first swing arm and the second swing arm.

In some embodiments, the first swing arm is provided with an avoidance notch, and the second swing arm extends into the avoidance notch.

Through the foregoing technical solution, the second swing arm and the first swing arm can be designed more compactly, and the overall space occupied by the second swing arm and the first swing arm is reduced.

In some embodiments, the base is provided with a first arc-shaped groove, the first swing arm is provided with a first arc-shaped sheet, and the first arc-shaped sheet slidably fits the first arc-shaped groove, so that the first swing arm is rotatably connected to the base.

Through the foregoing technical solution, a contact area between the first arc-shaped sheet and the first arc-shaped groove can be larger, and the first arc-shaped sheet may not shake when the first arc-shaped sheet slides relative to the first arc-shaped groove.

In some embodiments, the rotating shaft mechanism includes a support member, where a front of the support member is configured for a display screen to be arranged, a back of the support member is rotatably connected to the swing arm, and the support member is rotatably connected to the base through a second connection structure, so that the support member is drivable by the swing arm to swing relative to the base.

Through the foregoing technical solution, a bent portion of the display screen can be desirably supported and protected.

In some embodiments, the second connection structure includes a third swing arm and a fitting groove, the third swing arm is rotatably connected to the base, the fitting groove is arranged on the support member, one end of the fitting groove is arranged close to the base, the other end of the fitting groove is arranged away from the base, and the third swing arm slidably fits the fitting groove.

Through the foregoing technical solution, the third swing arm and the support member can be connected more compactly, so that the space in a thickness direction of the support member is effectively utilized, and in the process of switching the two sub-bodies to the unfolded state, the gap between the support member and the base can be reduced, so that the support member and the base can better support the display screen. In the process of switching the two sub-bodies to the folded state, two support members may be arranged to be overall in a "splayed" shape to better accommodate the bent portion of the display screen.

In some embodiments, one of the support member and the swing arm is provided with a second arc-shaped groove, the other of the support member and the swing arm is provided with a second arc-shaped sheet, and the second arc-shaped sheet slidably fits the second arc-shaped groove, so that the support member and the swing arm are rotatably connected.

Through the foregoing technical solution, a contact area between the second arc-shaped sheet and the second arc-shaped groove can be larger, and the second arc-shaped sheet may not shake when the second arc-shaped sheet slides relative to the second arc-shaped groove.

According to a second aspect, an embodiment of this application provides a terminal device, including a display screen, at least two sub-bodies arranged adjacent to each other, and the rotating shaft mechanism in the first aspect, where the sub-bodies are configured to bear the display screen, and the rotating shaft mechanism is located at a joint between the sub-bodies.

The terminal device has the same technical effect as the rotating shaft mechanism in the first aspect, and details are not described herein again.

In some embodiments, swing arms of the rotating shaft mechanism are connected to the sub-bodies, the swing arms are at a folded position when the sub-bodies are in a folded state, and the swing arms are at an unfolded position when the sub-bodies are in an unfolded state.

Through the foregoing technical solution, the sub-bodies can drive the swing arms to swing in the process of folding or unfolding, thereby "lifting" the shaft cover, and another driving mechanism does not need to be arranged for the swing arm.

DESCRIPTION OF EMBODIMENTS

In embodiments of this application, terms "first" and "second" are used merely for the purpose of description, and shall not be construed as indicating or implying relative importance or implying a quantity of indicated technical features. Therefore, a feature limited by "first" or "second" may explicitly or implicitly include one or more of the features.

A terminal device in embodiments of this application may be a foldable terminal device such as a mobile phone, a tablet computer, and a notebook computer. A specific structure of a folding mechanism in the terminal device is described by using the mobile phone as an example below, another terminal device may be specifically set with reference to the folding mechanism in the embodiment of the mobile phone, and the details are not described herein again.

Figure 1:
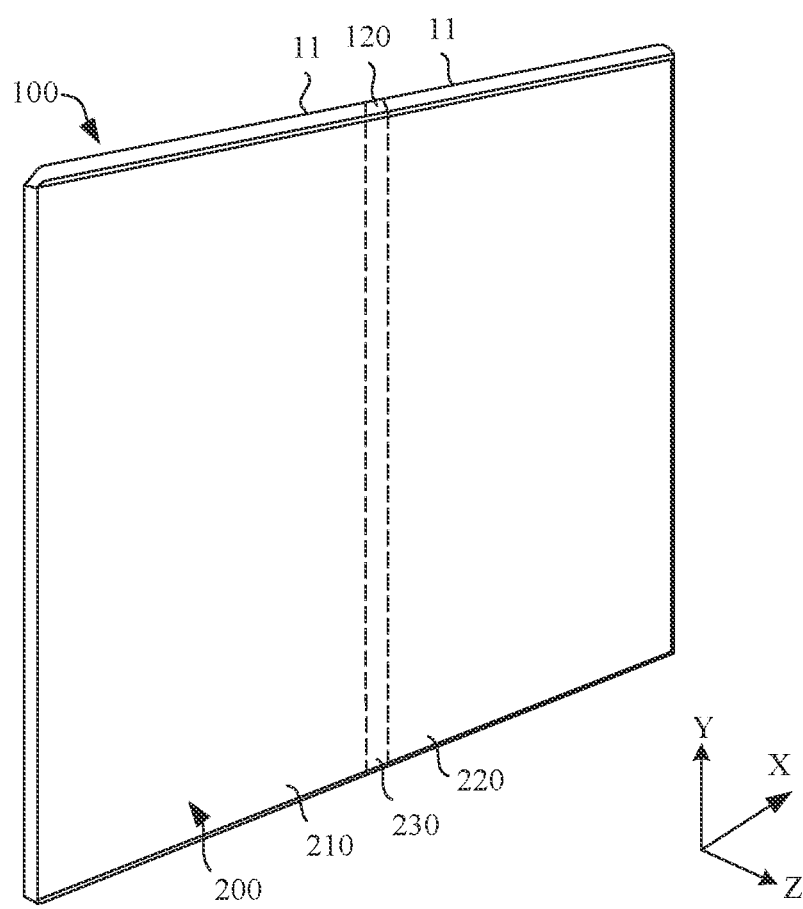
FIG. 1 is a schematic structural diagram of a terminal device in an unfolded state according to some embodiments of this application.
Figure 2:
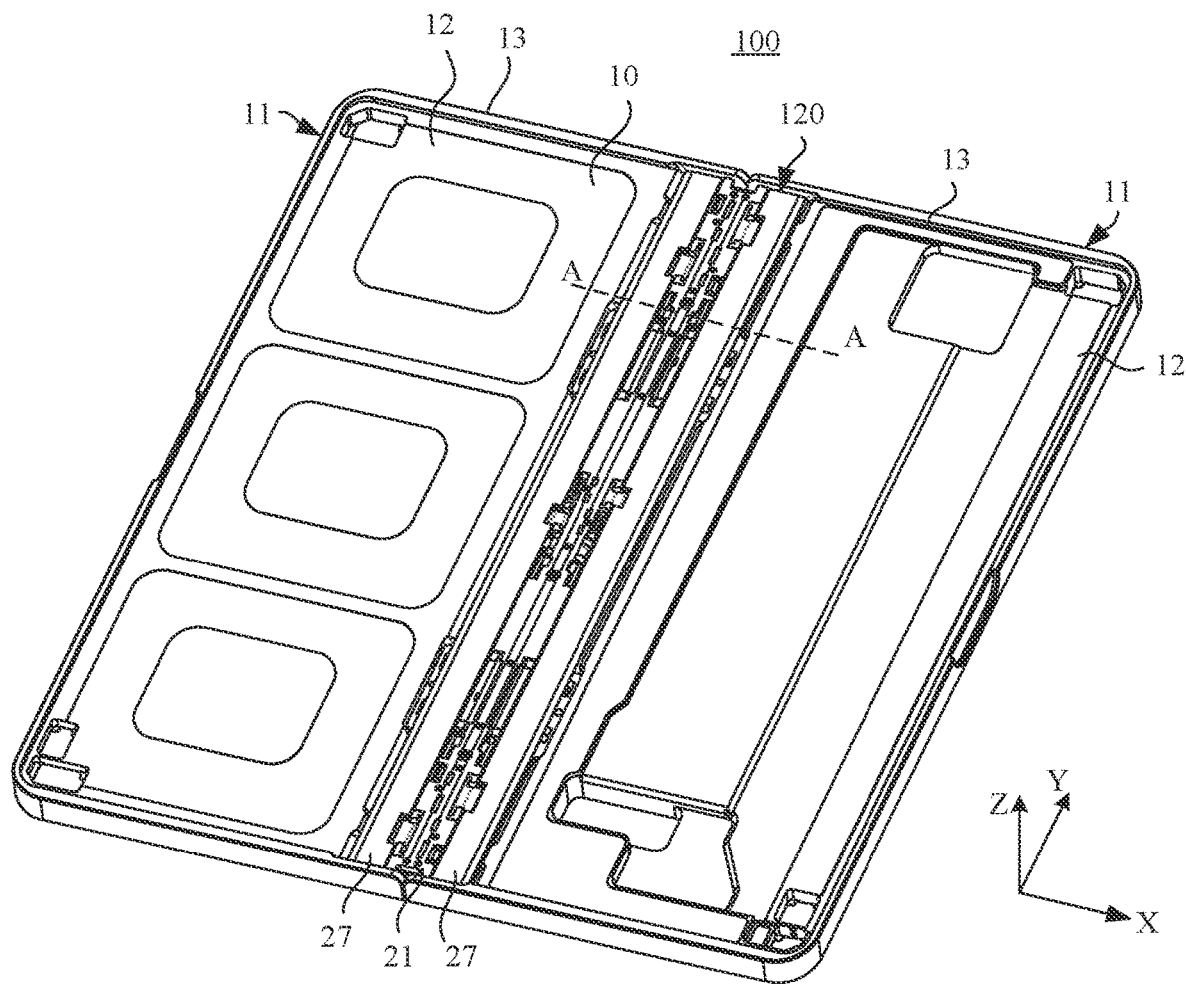
FIG. 2 is a schematic structural diagram of the terminal device in FIG. 1 with a display screen being removed.
Figure 3:
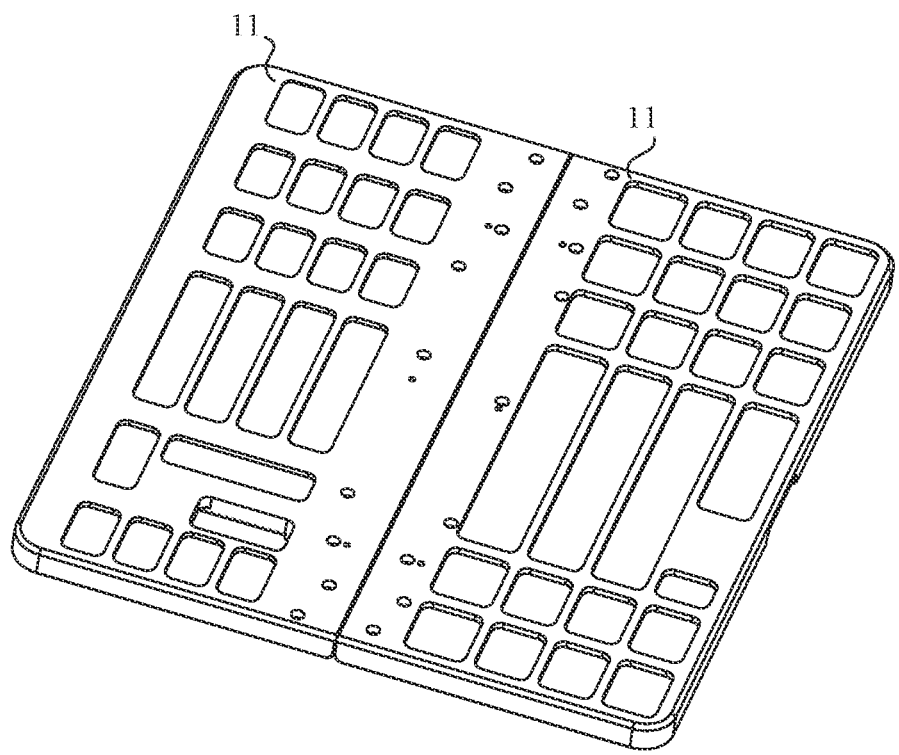
FIG. 3 is a schematic structural diagram of a back side of the terminal device in FIG. 2.
Figure 4:
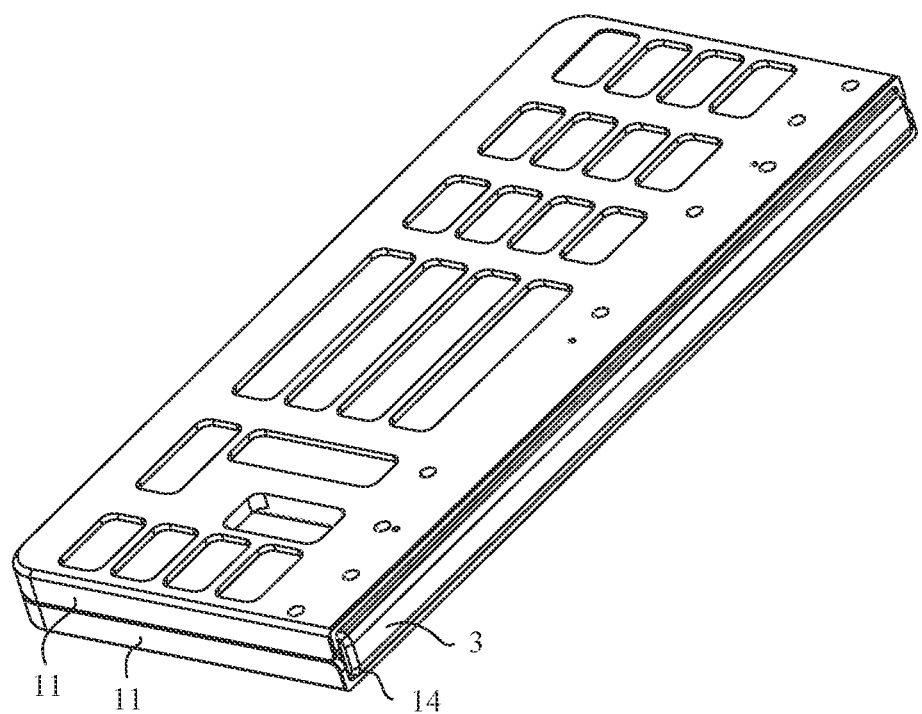
FIG. 4 is a schematic structural diagram of the terminal device in FIG. 2 in a folded state.
Figure 5A:
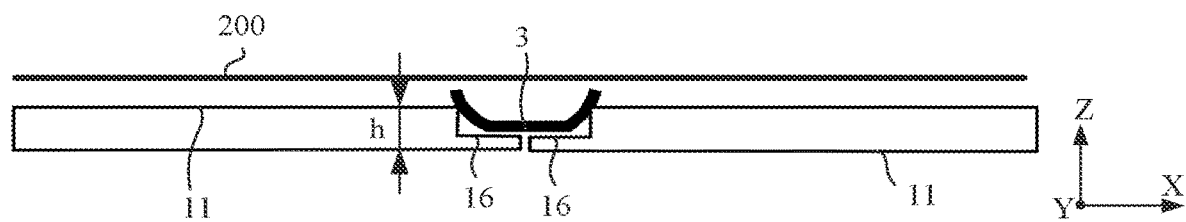
FIG. 5a is a structural diagram of two sub-bodies of a terminal device in an unfolded state according to some embodiments of this application.
Figure 5B:
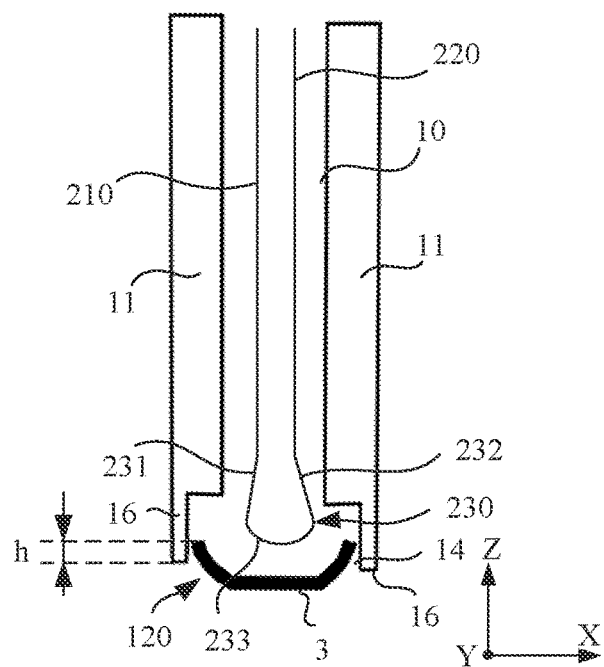
FIG. 5b is a structural diagram of two sub-bodies of a terminal device in a folded state according to some embodiments of this application.

As shown in FIG. 1 to FIG. 4, FIG. 5a, and FIG. 5b, FIG. 1 is a schematic structural diagram of a terminal device (a mobile phone) in an unfolded state according to some embodiments of this application, FIG. 2 is a schematic structural diagram of the terminal device in FIG. 1 with a display screen 200 being removed, FIG. 3 is a schematic structural diagram of a back side of the terminal device in FIG. 2, FIG. 4 is a schematic structural diagram of the terminal device in FIG. 2 in a folded state, FIG. 5a is a structural diagram of two sub-bodies 11 of a terminal device in an unfolded state according to some embodiments of this application, and FIG. 5b is a structural diagram of two sub-bodies 11 of a terminal device in a folded state according to some embodiments of this application.

The terminal device includes a rotating shaft mechanism 120, a body, and a display screen 200. The body includes at least two sub-bodies 11 arranged adjacent to each other, the sub-bodies 11 are configured to bear the display screen 200, and the rotating shaft mechanism 120 is arranged at a joint between the two sub-bodies 11, so that the two sub-bodies 11 can be switched between the unfolded state (as shown in FIG. 2) and the folded state (as shown in FIG. 4). In some terminal devices, the whole structure formed by the rotating shaft mechanism 120 and the sub-bodies 11 may also be referred to as a "folding mechanism 100". In other words, the terminal device includes the folding mechanism 100 and the display screen 200.

As shown in FIG. 1, when the two sub-bodies 11 are in the unfolded state, an external outline of the terminal device is substantially rectangular. For the convenience of the description of the following embodiments, an XYZ coordinate system is established for the terminal device with the two sub-bodies 11 in the unfolded state, a length direction of the terminal device is defined as an X-axis direction (which may also be referred to as "direction X" or "X direction"), a width direction of the terminal device is defined as a Y-axis direction (which may also be referred to as "direction Y" or "Y direction"), and a thickness direction of the terminal device is defined as a Z-axis direction (which may also be referred to as "direction Z" or "Z direction"). The foregoing X direction is not limited to a single direction indicated by the X-axis arrow in FIG. 1, but should be understood as positive and negative directions parallel to the X-axis, that is, including a positive direction of the X-axis and a negative direction of the X-axis. The same is true for the direction Y and the direction Z. It may be understood that the coordinate system of the terminal device may be flexibly set according to actual requirements. This is not specifically limited herein. Certainly, an outline shape of the terminal device is not limited to being a rectangle, and may be a square, a circle, an ellipse, and the like, which may be determined according to actual conditions. When the outline shape of the terminal device is not a rectangle, the Z direction is still the thickness direction of the terminal device, and a surface defined by the X direction and the Y direction is substantially parallel to a display surface of the display screen when the terminal device is in the unfolded state. As shown in FIG. 2, each of the sub-bodies 11 is a housing structure. For example, the sub-body 11 may be a middle frame, and the sub-body 11 includes a body bottom wall 12 (also referred to as a "cover plate") and a body side wall 13 arranged at an edge of the body bottom wall 12. The body bottom wall 12 and the body side wall 13 of the two sub-bodies 11 jointly define an arrangement space 10, and the display screen 200 is arranged in the arrangement space 10. The display screen 200 has bending performance and may be bent and deformed under the action of external force.

As shown in FIG. 1, FIG. 2, and FIG. 5a, when the two sub-bodies 11 are in the unfolded state, the display screen 200 is unfolded, and a display region of the display screen 200 is exposed for displaying image information to a user. The display screen 200 includes a first display region 210, a second display region 220, and a third display region 230. The first display region 210 covers the body bottom wall 12 of one of the sub-bodies 11, the second display region 220 covers the body bottom wall 12 of the other of the sub-bodies 11, and the third display region 230 covers the rotating shaft mechanism 120.

The foregoing display screen 200 may be all flexible screen structures, for example, the first display region 210, the second display region 220, and the third display region 230 of the display screen 200 are all flexible screen structures. The display screen 200 may be a flexible screen structure in a middle folded part and have a hard screen structure on both sides. For example, the first display region 210 and the second display region 220 of the display screen 200 are hard screen structures, and the third display region 230 is a flexible screen structure.

As shown in FIG. 4 and FIG. 5b, when the two sub-bodies 11 are in the folded state, the two sub-bodies 11 are stacked, and the display screen 200 is folded between the two sub-bodies 11 in this case, which can facilitate carrying of the terminal device. The first display region 210 and the second display region 220 of the display screen 200 are stacked, and "stacked" herein means that the thickness directions of the first display region 210 and the second display region 220 are parallel or approximately parallel (for example, a deviation is within 30 degrees). The first display region 210 and the second display region 220 may be pasted together, or a gap is defined between the first display region 210 and the second display region 220, which is not specifically limited herein.

When the two sub-bodies 11 are in the folded state, the third display region 230 is folded into a water drop shape. In this form, the third display region 230 includes an arc section 233, a first transition section 231, and a second transition section 232. The first transition section 231 is connected between the arc section 133 and the first display region 210. The second transition section 232 is connected between the arc section 233 and the second display region 220. As shown in FIG. 5b, the first transition section 231 and the second transition section 232 are arranged to be in a "splayed" shape. To be specific, a distance between an end of the first transition section 231 connected to the first display region 210 and an end of the second transition section 232 connected to the second display region 220 is a third distance, and a distance between an end of the first transition section 231 connected to the arc section 233 and an end of the second transition section 232 connected to the arc section 233 is a fourth distance, where the fourth distance is greater than the third distance. It may be understood that when the two sub-bodies 11 are in the folded state, the third display region 230 of the display screen 200 may also be folded into other shapes according to actual requirements, which is not limited in this application.

As shown in FIG. 5a and FIG. 5b, the rotating shaft mechanism 120 includes a shaft cover 3, and the shaft cover 3 is used as an exterior part (that is, an externally visible component) of the rotating shaft mechanism 120 to cover a movable component (not shown in the figure) in the rotating shaft mechanism 120, so as to ensure the appearance of the foldable screen device and prevent the movement of the movable component in the rotating shaft mechanism 120 from being disturbed by the outside world. To ensure the appearance of the foldable screen device during the movement between the unfolded state and the folded state, as shown in FIG. 5a and FIG. 5b, the two sub-bodies 11 both have lapping portions 16. As shown in FIG. 5a, the lapping portions 16 may be steps formed on the body bottom walls 12 of the two sub-bodies 11. A specific amount h of overlap (which may also be referred to as an amount of lap) exists between the lapping portion 16 and the shaft cover 3. When the two sub-bodies 11 move from the unfolded state to the folded state, the amount h of overlap gradually decreases; and when the two sub-bodies 11 move from the folded state to the unfolded state, the amount h of overlap gradually increases. During the movement of the two sub-bodies 11 between the unfolded state and the folded state, the minimum amount of overlap is an amount of overlap when the two sub-bodies 11 are in the folded state, and the minimum amount of overlap should be greater than or equal to 0 millimeter (mm). If the amount h of overlap between the lapping portion 16 and the shaft cover 3 is insufficient, the lapping portion 16 may be separated from the shaft cover 3 when the two sub-bodies 11 are in the folded state. In other words, the shaft cover 3 is located outside a gap 14 formed by the two lapping portions 16, the movable component inside the shaft cover 3 is exposed, and external dust and the like may fall on the movable component inside the shaft cover 3 to affect the normal operation.

Figure 6A:
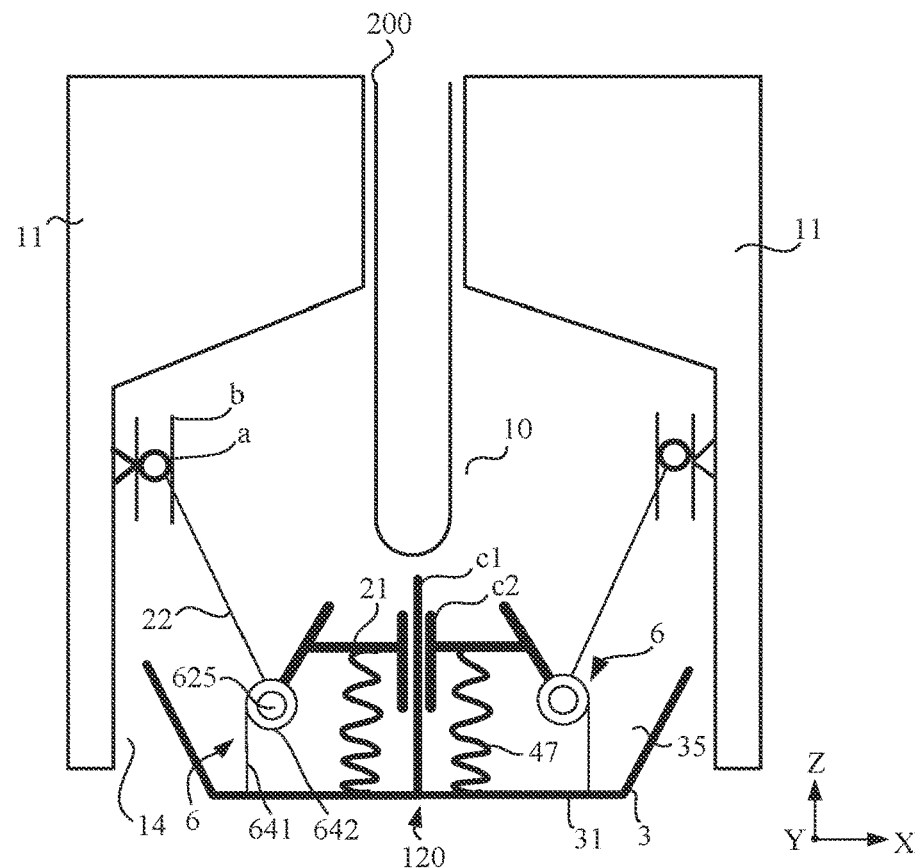
FIG. 6a is a schematic diagram of a terminal device according to a first embodiment of this application.

Therefore, an embodiment of this application provides a rotating shaft mechanism to resolve the foregoing problems. FIG. 6a is a schematic diagram of a terminal device according to a first embodiment of this application. The rotating shaft mechanism 120 includes a shaft cover 3, a base 21 (also referred to as a "rotating shaft base"), a swing arm 22, and a connection assembly 6 (also referred to as a "connection mechanism" and "transmission mechanism"). The shaft cover 3 has an accommodating space 35, at least part of the base 21 is arranged in the accommodating space 35, and the connection assembly 6 is connected between the swing arm 22 and the shaft cover 3. The swing arm 22 drives the shaft cover 3 to move toward the base 21 through the connection assembly 6 during rotation of the swing arm 22 from an unfolded position to a folded position. Through this arrangement, during the folding, the swing arm 22 of the rotating shaft mechanism 120 drives the shaft cover 3 to move relative to the base 21 through the connection assembly 6 to "lift" the shaft cover 3, so as to increase the amount of overlap between the shaft cover 3 and the sub-body 11 when the terminal device is in the folded state, thereby reducing the gap between the shaft cover 3 and the sub-body 11, so that the shaft cover 3 can effectively prevent external water, dust, and the like from entering the inside of the terminal device.

In some embodiments, the shaft cover 3 includes a shaft cover wall 31 and the accommodating space 35 defined by the shaft cover wall 31. Exemplarily, as shown in FIG. 6a, the shaft cover wall 31 includes a shaft cover bottom wall and a shaft cover side wall arranged on a periphery of the shaft cover bottom wall. The shaft cover bottom wall and the shaft cover side wall define the accommodating space 35, and the accommodating space 35 is a trapezoidal groove. In addition to the foregoing structure, a cross section of the shaft cover wall 31 may also be U-shaped, semi-circular, arc-shaped, and the like, which may be arranged according to the actual situation.

The base 21 is configured to support a part of the display screen 200. Specifically, the base 21 is configured to support the third display region 230 of the display screen 200 of the terminal device shown in FIG. 1 To be specific, a side of the base 21 (an upper side of the base 21 in FIG. 6*a*) has an arrangement space 10 for accommodating the display screen 200.

A part (or an entirety) of the base 21 is arranged in the accommodating space 35, the swing arm 22 is rotatably connected to the base 21, and the swing arm 22 is also movably connected to the sub-bodies 11 directly or indirectly. In this way, when the display screen 200 is folded or unfolded, the swing arm 22 can rotate relative to the base with the rotation of the sub-body 11, and may also drive the shaft cover 3 to "lift" toward the base 21 during the rotation.

In some embodiments, the swing arm 22 is slidably connected to the sub-body 11. For example, the swing arm 22 is provided with a slide-fit portion b, and each of the sub-bodies 11 is provided with a groove a. The slide-fit portion b slidably fits the groove a. The slide-fit portion b may be in the shape of a plate, a column, a ball, and the like, which is not specifically limited herein. The sliding connection between the swing arm 22 and the sub-bodies 11 is to cause the degree of freedom of the mechanism formed by the sub-bodies 11, the base 21, and the swing arm 22 equal to be 1, that is, rotation in a plane defined by the X direction and the Z direction, so as to ensure that the two sub-bodies 11 can be unfolded and folded smoothly, and to avoid a problem such as skew of the display screen during folding and unfolding.

In some embodiments, two swing arms 22 are arranged. In a width direction of the shaft cover 3 (X-axis direction in the figure), the two swing arms 22 are symmetrically arranged on two opposite sides of the base 21. The two swing arms 22 are slidably connected to the two sub-bodies 11 respectively, and the two swing arms 22 are both rotatably connected to the base 21.

When the two sub-bodies 11 are in the unfolded state, the two swing arms 22 are both at the unfolded position. As shown in FIG. 6*a*, when the two sub-bodies 11 are in the folded state, the two swing arms 22 are both at the folded position. When the two sub-bodies 11 are switched to the folded state, the swing arm 22 correspondingly rotates toward the folded position relative to the base 21, and when the two sub-bodies 11 are switched to the unfolded state, the swing arm 22 correspondingly rotates toward the unfolded position relative to the base 21.

The connection assembly 6 is connected between the swing arm 22 and the shaft cover 3, and is a main component for the swing arm 22 to drive the shaft cover 3 to move. FIG. 6*a* shows the first embodiment (also referred to as "a first structure") of the terminal device, and the connection assembly 6 includes a winding roller 642, a connection line 641, and a rotating shaft 625. The swing arm 22 is rotatably connected to the base 21 through the rotating shaft 625, and the winding roller 642 is sleeved on the rotating shaft 625. An end of the connection line 641 close to the base 21 is wound on the winding roller 642, and an end of the connection line 641 away from the base 21 is connected to the shaft cover 3.

Further referring to FIG. 6*a*, when the connection assembly 6 in the figure is adopted, a restoring member 47 is arranged between the base 4 and the shaft cover 3, and the restoring member 47 is configured to apply a restoring force to the shaft cover 3 to move the shaft cover 3 away from the base 21 (in a downward direction in the figure) relative to the base 4. Exemplarily, the restoring member 47 is a spring, the spring is in a compressed state, one end of the spring abuts against the base 21, and the other end of the spring abuts against the shaft cover 3. "Abutting" herein means that there is point contact, line contact, or surface contact between two components. For example, point contact, line contact, or surface contact exists between the spring and the base 21 and the shaft cover 3.

One or more restoring members 47 may be arranged, which is not specifically limited herein.

It may be understood that the restoring member 47 is also suitable for use with the connection assembly 6 of another structure. When the shaft cover 3 needs to be equipped with an additional restoring mechanism, the restoring member 47 in FIG. 6*a* can be used.

The process of folding and unfolding the terminal device of this application is described by using the swing arm 22 and the sub-bodies 11 located on the left in FIG. 6*a* as examples below.

In the process of switching the two sub-bodies 11 to the folded state, the swing arm 22 rotates clockwise with the sub-bodies 11 (that is, rotates toward the folded position relative to the base 21), and the rotating shaft 625 drives the winding roller 642 to rotate clockwise, so that the connection line 641 is gradually wound around the winding roller 642, so as to drive the shaft cover 3 to move toward the base 21 (an upward direction in the figure, which is also the positive direction of the Z axis), so as to "lift" the shaft cover 3. In the process of switching the two sub-bodies 11 to the unfolded state, the swing arm 22 swings counterclockwise with the sub-bodies 11 (that is, rotates toward the unfolded position relative to the base 21), and the winding roller 642 is driven to rotate counterclockwise through the rotating shaft 625 to loosen the connection line 641 wound on the winding roller 642. In this case, the shaft cover 3 moves away from the base 21 (in the downward direction in the figure, which is also the negative direction of the Z axis) under the action of the restoring force of the restoring member 47, so as to "lower" the shaft cover 3.

The movement of the shaft cover 3 toward the base 21 means that the movement of the shaft cover 3 causes the base 21 to extend into the accommodating space 35 relative to the shaft cover 3. The movement of the shaft cover 3 away from the base 21 means that the movement of the shaft cover 3 causes the base 21 to extend out of the accommodating space 35 relative to the shaft cover 3. The base 21 is used as a position reference. Based on the orientation relationship shown in FIG. 6*a*, the shaft cover 3 moves toward the base 21, that is, moves upward. The shaft cover 3 moves away from the base 21, that is, moves downward. The upward movement and downward movement of the shaft cover 3 may be in a first direction (the Z-axis direction in the figure), the first direction is perpendicular to both the width direction (the X-axis direction in the figure) of the shaft cover 3 and a length direction (the Y-axis direction in the figure) of the shaft cover 3, and the Z-direction may also be regarded as a depth direction of the accommodating space, that is, a direction perpendicular to a display surface of the display screen 200 when the display screen 200 is unfolded into a plane.

Certainly, a trajectory of the upward movement or downward movement of the shaft cover 3 is not limited to being parallel to the first direction, or may be inclined at a specific angle relative to the first direction, for example, inclined at an angle of within 10°. It should be noted that, when the trajectory of the upward movement or downward movement of the shaft cover 3 is inclined at an angle less than 5° relative to the first direction, it may be considered that the shaft cover 3 moves in the first direction.

In some embodiments, as shown in FIG. 6a, two connection assemblies 6 are arranged, and each swing arm 22 is connected to the shaft cover 3 through one of the connection assemblies 6, thereby increasing a quantity of connecting points between the shaft cover 3 and the swing arms 22. During the switching of the two sub-bodies 11 to the folded state, the two swing arms 22 are respectively connected to the shaft cover 3 through the connection assemblies 6, so as to drive the shaft cover 3 to move upward. In this way, the stress of the shaft cover 3 during movement is relatively balanced, so that the upward movement of the shaft cover 3 is relatively stable. In addition, in some other embodiments, one connection assembly 6 may alternatively be arranged. The connection assembly 6 is connected between a swing arm 22 and the shaft cover 3, so that the shaft cover 3 may also be driven to move upward through the connection assembly 6 during rotation of the swing arm 22 from the unfolded position to the folded position.

In some embodiments, to cause the shaft cover 3 to move more stably driven by the connection assembly 6, the shaft cover 3 is slidably connected to the base 3 in the Z-axis direction (that is, a sliding constraint exists between the shaft cover 3 and the base 21 in the Z-axis direction). As an implementation of the sliding connection, as shown in FIG. 6a, for example, the shaft cover 3 is provided with a sliding rod (denoted by c1 in the figure), the base 21 is provided with a sliding hole (denoted by c2 in the figure), and the sliding rod slidably fits the sliding hole. Such design can prevent the swing arm 22 from shaking when driving the shaft cover 3 to move toward the base 21, so that the movement of the shaft cover 3 can be more stable.

Figure 6B:
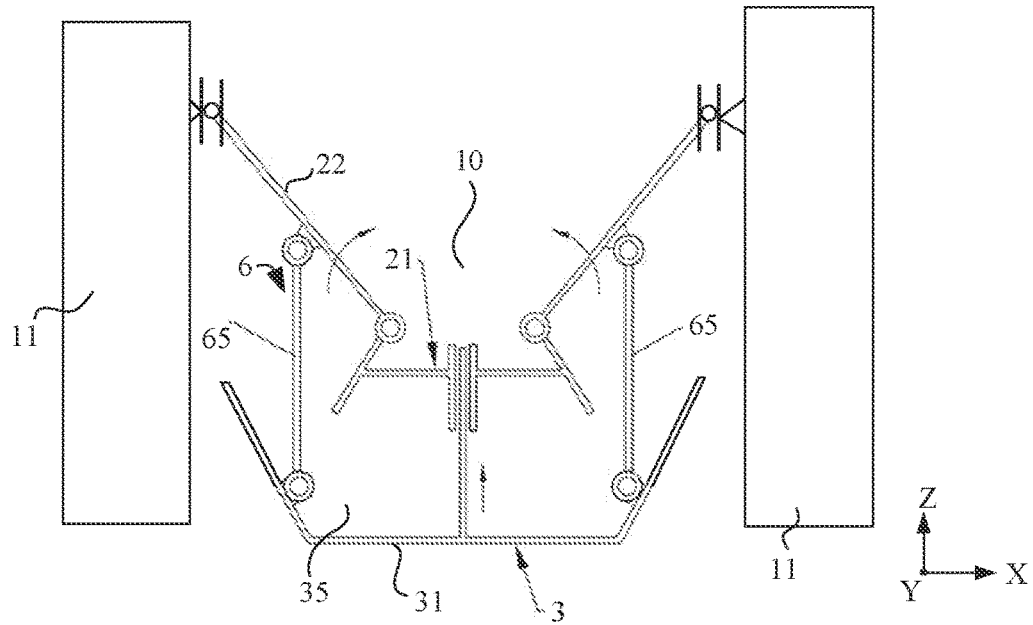
FIG. 6b is a schematic diagram of a terminal device according to a second embodiment of this application.

FIG. 6b is a schematic diagram of a terminal device according to a second embodiment of this application. The main difference between the embodiment shown in FIG. 6b and the embodiment shown in FIG. 6a is that the structure of the connection assembly 6 is different. In the embodiment shown in FIG. 6b, the connection assembly 6 includes a connecting rod 65. One end of the connecting rod 65 is rotatably connected to the swing arm 22, and the other end of the connecting rod 65 is rotatably connected to the shaft cover 3.

The process of folding and unfolding the terminal device in this embodiment of this application is described by using the swing arm 22, the connecting rod 65, and the sub-bodies 11 on the left as examples. In the process of switching the two sub-bodies 11 to the folded state, the swing arm 22 rotates counterclockwise relative to the base 21, and drives the shaft cover 3 to move toward the base 21 (in the upward direction in the figure) through the connecting rod 65, so as to "lift" the shaft cover 3. In the process of switching the two sub-bodies 11 to the unfolded state, the swing arm 22 rotates clockwise relative to the base 21. While the swing arm 22 rotates clockwise, the connecting rod 65 drives the shaft cover 3 to move away from the base 21 (in the downward direction in the figure), so as to "lower" the shaft cover 3.

Figure 6C:
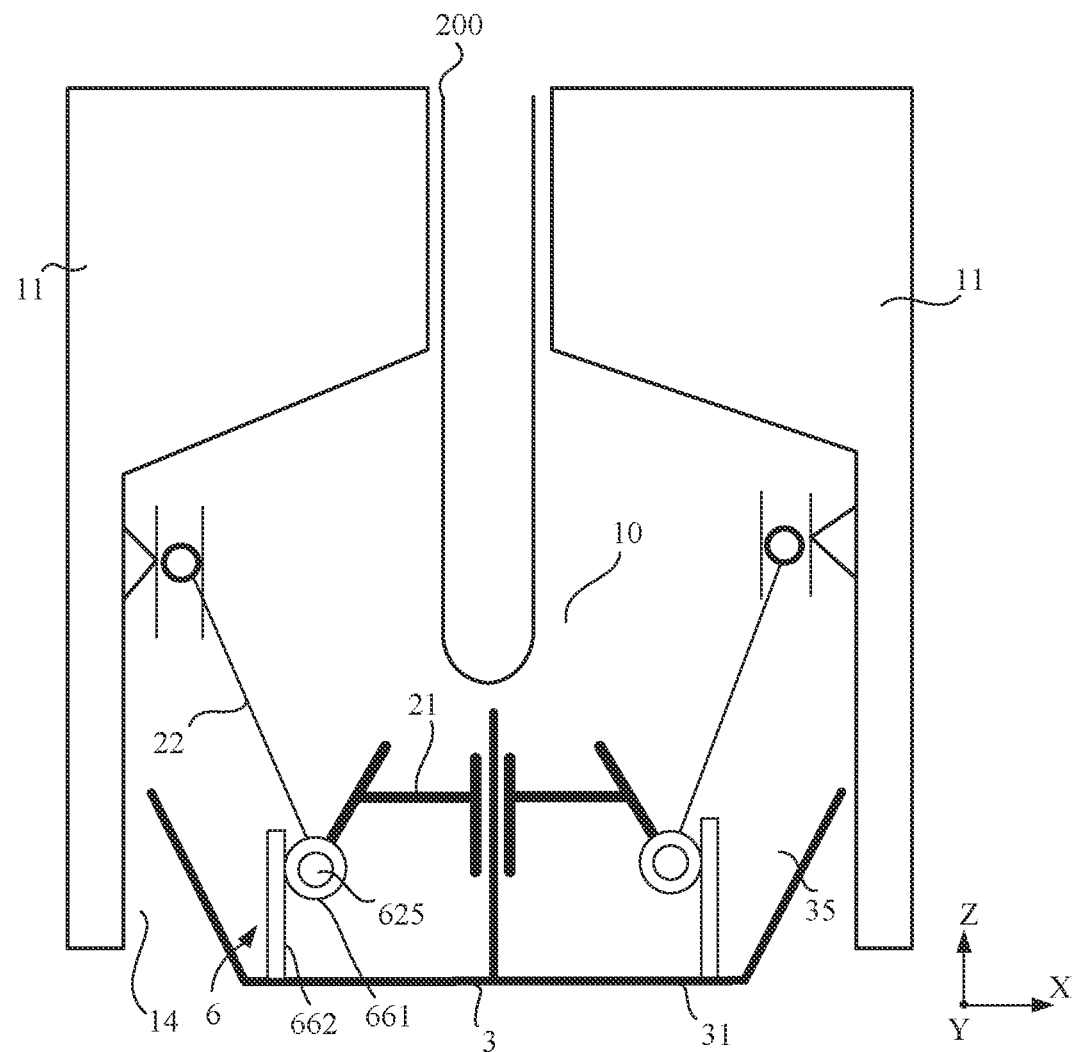
FIG. 6c is a schematic diagram of a terminal device according to a third embodiment of this application.

FIG. 6c is a schematic diagram of a terminal device according to a third embodiment of this application. The main difference between the embodiment shown in FIG. 6c and the embodiment shown in FIG. 6a is that the structure of the connection assembly 6 is different. In the embodiment shown in FIG. 6c, the connection assembly 6 includes a rotating shaft 625, a gear 661, and a rack 662.

The swing arm 22 is rotatably connected to the base 21 through the rotating shaft 625, and the swing arm 22 is fixed relative to the rotating shaft 625 in a circumferential direction of the rotating shaft 625. The gear 661 is sleeved on the rotating shaft 625, and the rack 662 is fixedly connected to the shaft cover 3. One end of the rack 662 is arranged close to the base 21, the other end of the rack 662 is arranged away from the base 21, and the gear 661 is meshed with the rack 662. Exemplarily, the rack 662 extends in a Z-axis direction.

The process of folding and unfolding the terminal device in this embodiment of this application is described by using the swing arm 22 and the sub-bodies 11 on the left in FIG. 6c as examples.

In the process of switching the two sub-bodies 11 to the folded state, the swing arm 22 swings clockwise with the sub-bodies 11, and drives the gear 661 to rotate clockwise through the rotating shaft 625, and then the gear 661 drives the shaft cover 3 to move toward the base 21 (in the upward direction in the figure) through the rack 662, so as to "lift" the shaft cover 3. In the process of switching the two sub-bodies 11 to the unfolded state, the swing arm 22 swings counterclockwise with the sub-bodies 11, and drives the gear 661 to rotate counterclockwise through the rotating shaft 625, and then the gear 661 drives the shaft cover 3 to move away from the base 21 (in the downward direction in the figure) through the rack 662, so as to "lower" the shaft cover 3.

Figure 6D:
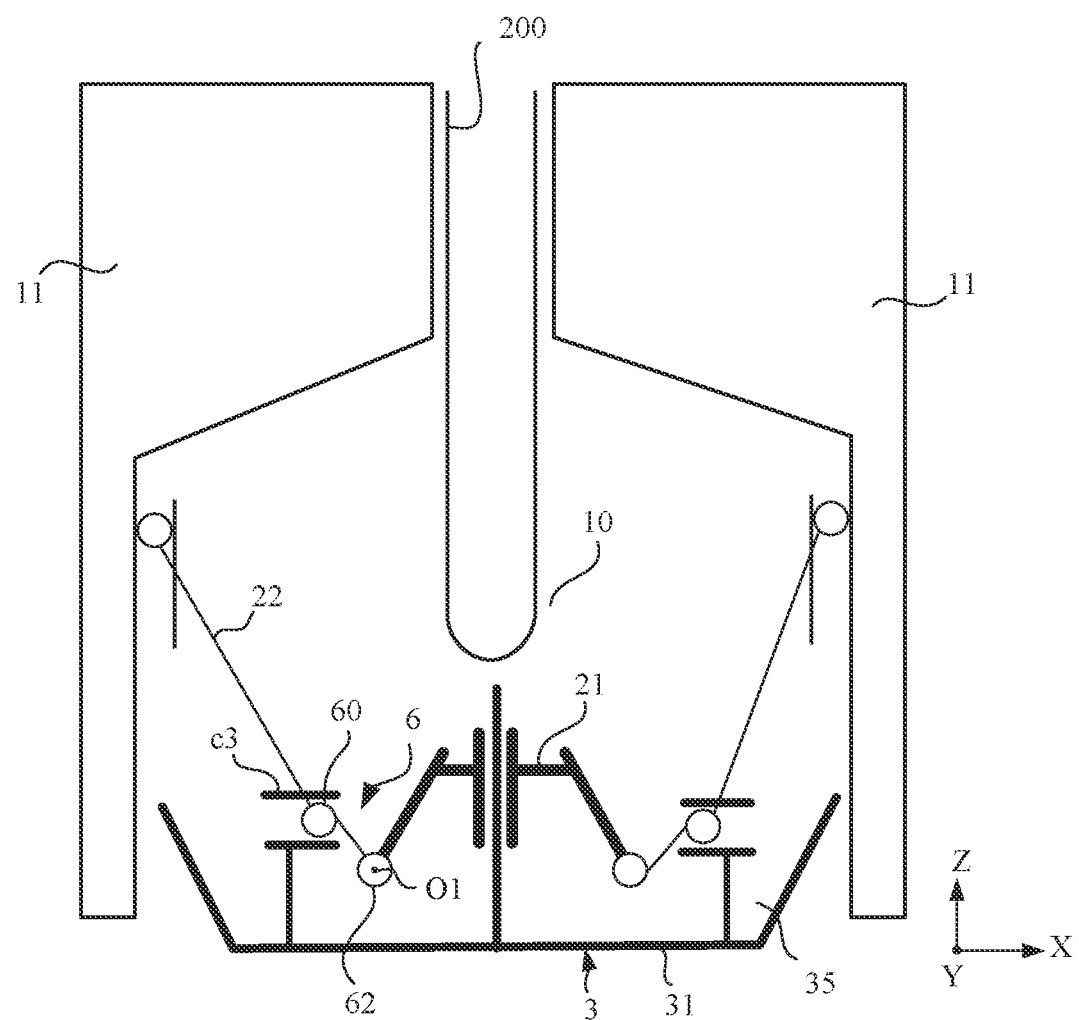
FIG. 6d is a schematic diagram of a terminal device according to a fourth embodiment of this application.

FIG. 6d is a schematic diagram of a terminal device according to a fourth embodiment of this application. The main difference between the embodiment shown in FIG. 6d and the embodiment shown in FIG. 6a is that the structure of the connection assembly 6 is different. In the embodiment shown in FIG. 6d, a swing arm 22 is rotatably connected to a base 21 through a rotating shaft 625, and a connection assembly 6 includes a toggle member 60. The toggle member 60 rotates with the swing arm 22 to drive a shaft cover 3 to move toward the base 21 during rotation of the swing arm 22 from an unfolded position to a folded position. The toggle member 60 is connected to a position where the swing arm 22 deviates from an axis O1 of the rotating shaft 625, and the toggle member 60 is in a limited connection to the shaft cover 3 in a Z-axis direction (that is, the first direction). In other words, the toggle member 60 can drive the shaft cover 3 to move in the Z-axis direction.

It may be understood that one part of the toggle member 60 is connected to the swing arm 22, and the other part is connected to the shaft cover 3. The swing arm 22 drives the toggle member 60 into rotation during the rotation, and a joint between the toggle member 60 and the shaft cover 3 can realize the transformation of rotation and translation, so that the swing arm can directly or indirectly drive the shaft cover 3 to move in the Z direction during the rotation.

Exemplarily, the toggle member 60 is a protruding structure, and the toggle member 60 is columnar and parallel or approximately parallel to the rotating shaft 625 (the deviation is within 5°). The shaft cover 3 is provided with a groove c3, the groove c3 extends in the X-axis direction (that is, the width direction of the shaft cover 3), and the toggle member 60 extends into the groove c3, so that the toggle member 60 can slide relative to the groove c3 in the X-axis direction.

Figure 6E:
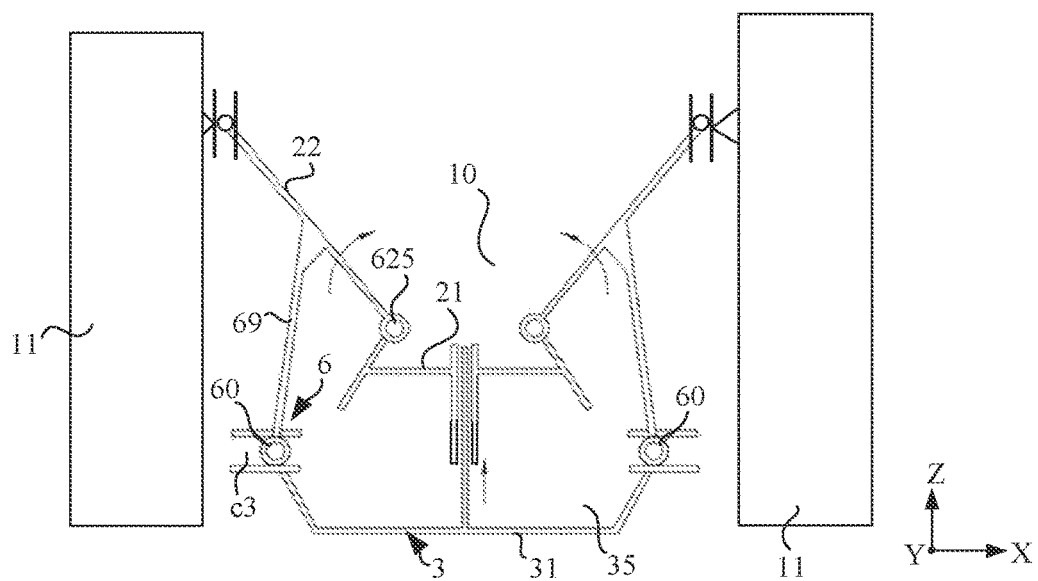
FIG. 6e is a schematic diagram of a terminal device according to a fifth embodiment of this application.

As shown in FIG. 6d, the toggle member 60 may be directly connected to the swing arm 22, and the toggle member 60 is connected to the swing arm 22 through engagement, screwed connection, bonding, insertion, and the like. In addition, the toggle member 60 may also be indirectly connected to the swing arm 22. For example, FIG. 6e is a schematic diagram of a terminal device according to a fifth embodiment of this application. The toggle member 60 is connected to the swing arm 22 through a swing arm connecting rod 69. One end of the swing arm connecting rod 69 is fixedly connected to the swing arm 22, and the other end of the swing arm connecting rod 69 is connected to the toggle member 60. The toggle member 60 may be connected to the end of the swing arm connecting rod 69 through engagement, screwed connection, bonding, insertion, and the like.

As shown in FIG. 6e, the swing arm connecting rod 69 and the swing arm 22 are integrally formed, but not limited thereto. The swing arm connecting rod 69 and the swing arm 22 may be separately arranged and fixedly connected by fasteners such as screws.

The movement process of folding and unfolding the terminal device in this embodiment of this application is described by using the swing arm 22 and the sub-bodies 11 on the left in FIG. 6d and FIG. 6e as examples.

As shown in FIG. 6d and FIG. 6e, in the process of switching the two sub-bodies 11 to the folded state, the swing arm 22 swings clockwise with the sub-bodies 11, and the toggle member 60 connected to the swing arm 22 moves to the upper right at this point and abuts against the shaft cover 3. For example, the swing arm 22 abuts against an upper groove wall of the groove c3 in the shaft cover 3, and an upward movement component of the toggle member 60 drives the shaft cover 3 to move toward the base 21 (in the upward direction in the figure) through the limit constraint between the toggle member 60 and the shaft cover 3, so as to "lift" the shaft cover 3. In the process of switching the two sub-bodies 11 to the unfolded state, the swing arm 22 swings counterclockwise with the sub-bodies 11, and the toggle member 60 connected to the swing arm 22 moves to the lower left at this point and abuts against the shaft cover 3. For example, the swing arm 22 abuts against a lower groove wall of the groove c3 in the shaft cover 3, and a downward movement component of the toggle member 60 drives the shaft cover 3 to move away from the base 21 (in the downward direction in the figure) through the limit restriction between the toggle member 60 and the shaft cover 3, so as to "lower" the shaft cover 3.

Figure 6F:
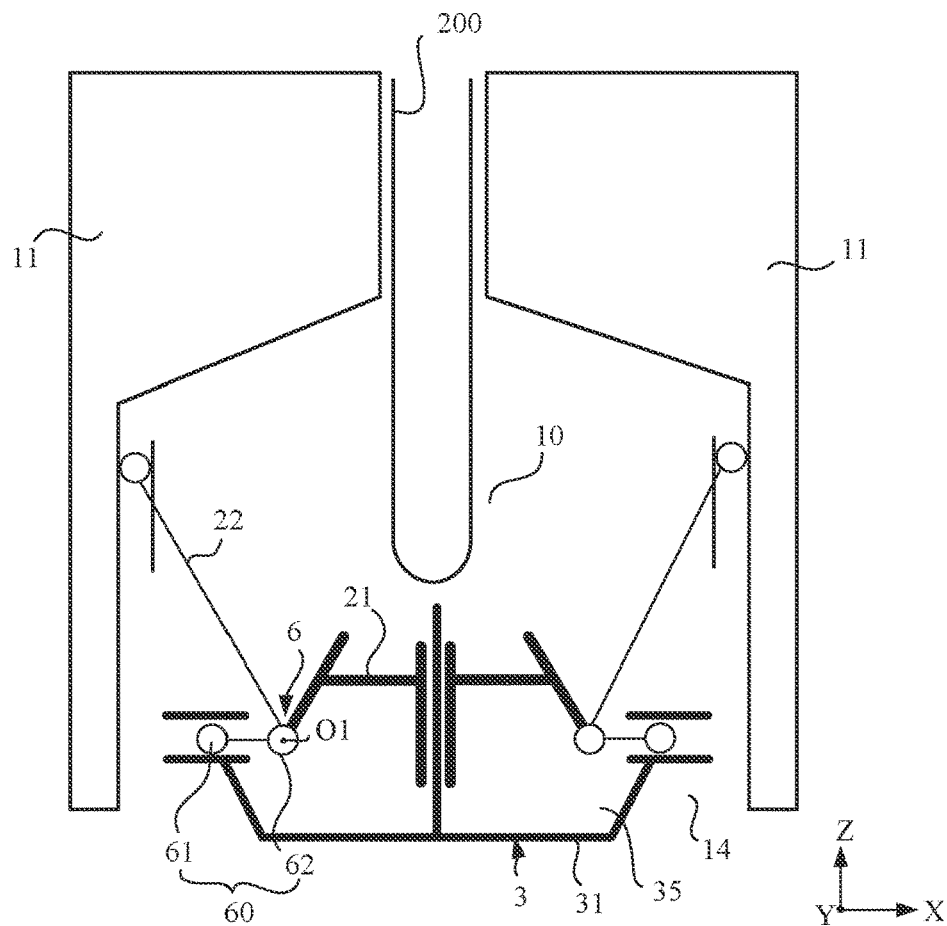
FIG. 6f is a schematic diagram of a terminal device according to a sixth embodiment of this application.

FIG. 6f is a schematic diagram of a terminal device according to a sixth embodiment of this application. The main difference between the embodiment and embodiments shown in FIG. 6d and FIG. 6e is that the structure of the toggle member 60 is different.

In the embodiment shown in FIG. 6f, the toggle member 60 includes a rotating shaft 62 and an eccentric portion 61 eccentrically arranged relative to the rotating shaft 62. For example, the eccentric portion 61 is cylindrical, and a central axis of the eccentric portion 61 is different from a central axis of the rotating shaft 62.

The eccentric portion 61 may be an eccentric block, an eccentric column, an eccentric wheel, and the like, which is not specifically limited herein.

The process of folding and unfolding the terminal device of this application is described by using the swing arm 22 and the sub-bodies 11 located on the left in FIG. 6f as examples below. In the process of switching the two sub-bodies 11 to the folded state, the sub-bodies 11 rotate clockwise relative to the base 4, thereby driving the swing arm 22 to rotate clockwise, and the rotating shaft 62 also rotates clockwise to drive the eccentric portion 61 to move to the upper right. Through the limit constraint between the eccentric portion 61 and the shaft cover 3, an upward movement component of the eccentric portion 61 drives the shaft cover 3 to move toward the base 21 (that is, in the upward direction in the figure), so as to "lift" the shaft cover 3. In the process of switching the two sub-bodies 11 to the unfolded state, the sub-bodies 11 rotate counterclockwise relative to the base 4, thereby driving the swing arm 22 to rotate counterclockwise, and the rotating shaft 62 also rotates counterclockwise to drive the eccentric portion 61 to move to the lower left. Through the limit constraint between the eccentric portion 61 and the shaft cover 3, a downward movement component of the eccentric portion 61 drives the shaft cover 3 to move away from the base 21 (that is, in the downward direction in the figure), so as to "lower" the shaft cover 3.

Therefore, the toggle member 60 rotates with the swing arm 22 to drive a shaft cover 3 to move toward the base 21 during rotation of the swing arm 22 from an unfolded position to a folded position.

In the connection assembly 6, the eccentric portion 61 is eccentrically arranged with the rotating shaft 62, so that when the swing arm 22 drives the rotating shaft 62 to rotate, a movement trajectory of the eccentric portion 61 occupies a relatively small space and may not interfere with another component.

Figure 6G:
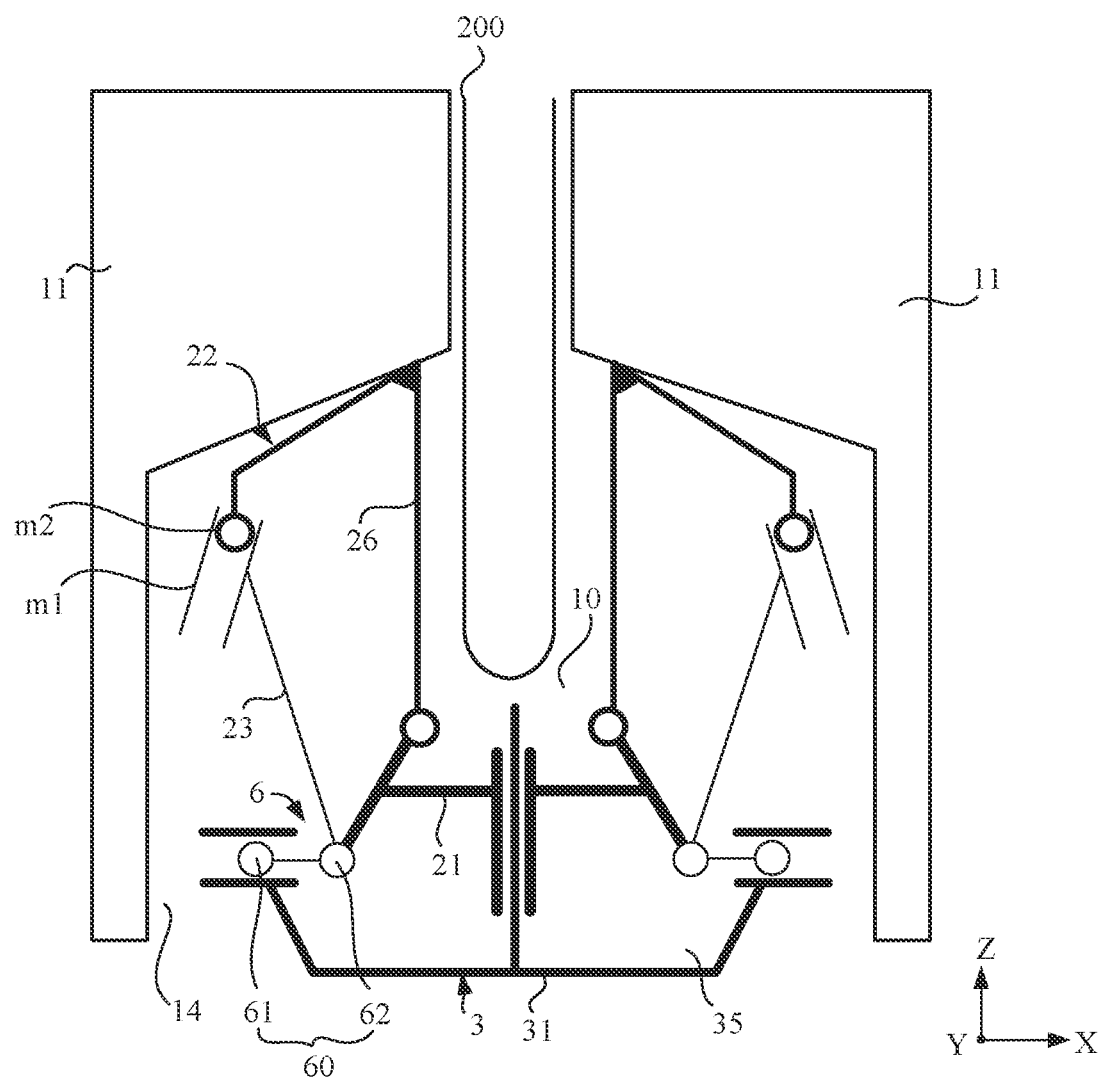
FIG. 6g is a schematic diagram of a terminal device according to a seventh embodiment of this application.

FIG. 6g is a schematic diagram of a terminal device according to a seventh embodiment of this application. The main difference between the embodiment shown in FIG. 6g and the embodiment shown in FIG. 6f is that the structure of the swing arm 22 is different.

In the embodiment shown in FIG. 6g, the swing arm 22 includes a first swing arm 26 (which may also be referred to as a master swing arm) and a second swing arm 23 (which may also be referred to as a slave swing arm) which are both rotatably connected to the base 21. The first swing arm 26 is fixedly connected to the sub-body 11, and the first swing arm 26 is further slidably connected to the second swing arm 23. For example, the second swing arm 23 is provided with a groove m1, the first swing arm 26 is provided with a slide-fit portion m2, and the slide-fit portion m2 slidably fits the groove m1.

The second swing arm 23 is connected to the shaft cover 3 through the connection assembly 6. The second swing arm 23 has an unfolded position and a folded position, and the first swing arm 26 may drive the second swing arm 23 to rotate relative to the base 21 between the unfolded position and the folded position. When the second swing arm 23 is at the unfolded position, the two sub-bodies 11 are in the unfolded state, and when the second swing arm 23 is at the folded position, the two sub-bodies 11 are in the folded state (as shown in FIG. 6g).

The process of folding and unfolding the terminal device in this embodiment of this application is described by using the second swing arm 23, the first swing arm 26, and the sub-bodies 11 on the left in FIG. 6g as examples. In the process of switching the two sub-bodies 11 to the folded state, the first swing arm 26 swings clockwise with the sub-bodies 11. Through the sliding constraint between the first swing arm 26 and the second swing arm 23, the first swing arm 26 drives the second swing arm 23 to swing clockwise while swinging, and then the shaft cover 3 is driven to move toward the base 21 through the toggle member 60, so as to "lift" the shaft cover 3. In the process of switching the two sub-bodies 11 to the unfolded state, the first swing arm 26 swings anticlockwise with the sub-bodies 11. Through the sliding constraint between the first swing arm 26 and the second swing arm 23, the first swing arm 26 drives the second swing arm 23 to swing anticlockwise while swinging, and then the shaft cover 3 is driven to move relative to the base 21 away from the base 21 through the toggle member 60, so as to "lower" the shaft cover 3.

By arranging the swing arm 22 as the first swing arm 26 and the second swing arm 23, the first swing arm 26 is fixedly connected to the sub-body 11, and the first swing arm 26 and the second swing arm 23 are slidably connected. In this way, the degree of freedom of a mechanism formed by the sub-body 11, the first swing arm 26, the second swing arm 23, and the base 21 can be 1, thereby ensuring that the two sub-bodies 11 can be unfolded and folded smoothly, realizing the relative movement of the base and the shaft cover in the first direction, and preventing the shaft cover from shaking relative to the base. In addition, through this design, a sliding connection structure connected to the swing arm 22 does not need to be arranged on the sub-body 11, thereby simplifying the connection between the swing arm 22 and the sub-body 11, and improving the connection reliability between the swing arm 22 and the sub-body 11.

Figure 6H:
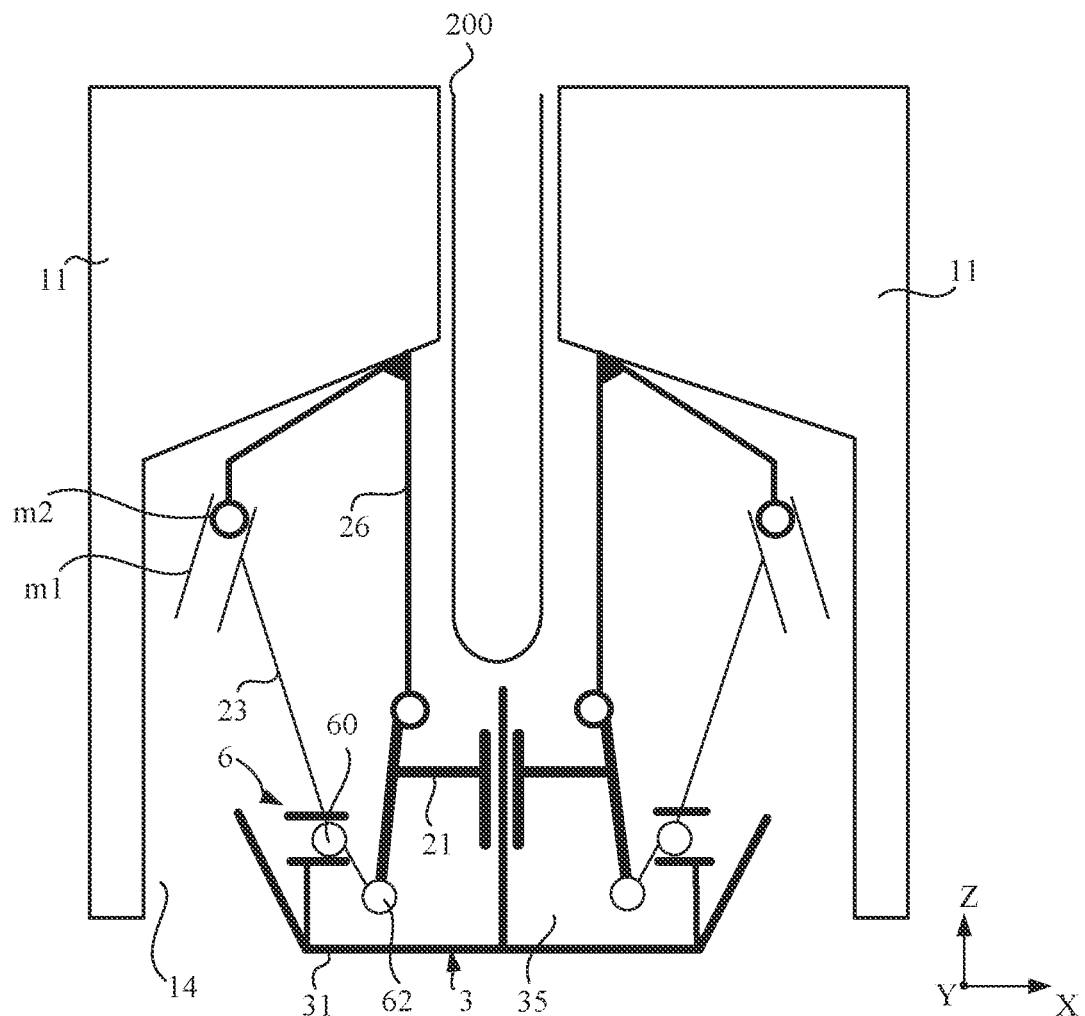
FIG. 6h is a schematic diagram of a terminal device according to an eighth embodiment of this application.

Certainly, the swing arm 22 in FIG. 6d may also be arranged as the first swing arm 26 and the second swing arm 23, as specifically shown in FIG. 6h. FIG. 6h is a schematic diagram of a terminal device according to an eighth embodiment of this application. For details of the connection relationship between the first swing arm 26, the base 21, and the second swing arm 23, reference may be made to the manner in FIG. 6g for arrangement, and the details are not described herein again.

In the foregoing embodiments shown in FIG. 6d to FIG. 6h, the swing arm 22 drives the toggle member 60 to move, so that the toggle member 60 drives the shaft cover 3 to "lift". In this way, the connection structure between the connection assembly 6 and the shaft cover 3 can be simpler, and a number of components of the connection assembly 6 can be relatively small, which is not only beneficial to reducing the cost, but also beneficial to improving the connection reliability between the connection assembly 6 and the shaft cover 3.

In the foregoing embodiments shown in FIG. 6b to FIG. 6h, the connection assembly 6 not only can drive the shaft cover 3 to move toward the base 21 relative to the base 21 to "lift" the shaft cover 3, but also can drive the shaft cover 3 to move away from the base 21 relative to the base 21 to "lower" the shaft cover 3. In this way, the movement of the shaft cover 3 can be better controlled, and there is no need to additionally arrange a restoring member to restore the shaft cover 3, thereby facilitating the improvement in the reliability of the movement of the shaft cover 3.

As shown in FIG. 6a to FIG. 6h, by restraining the shaft cover 3 from sliding relative to the base 21 in the Z-axis direction, the shaft cover 3 can respectively drive the swing arms 22 on two sides to realize synchronous movement through the connection assembly 6 during movement in the Z-axis direction, so that the sub-bodies 11 on two sides can realize synchronous movement.

It may be understood that due to manufacturing or assembly tolerances, the swing arms 22 on two sides (either the first swing arm 26 or the second swing arm 23) may have a specific angular deviation during the rotation. Generally, the angular deviation may be in a range of 0-20 degrees, and the movement within the angular deviation range may still be regarded as synchronous movement. Optionally, in practical use, another synchronization mechanism can be arranged to achieve the corresponding synchronization effect.

Figure 6I:
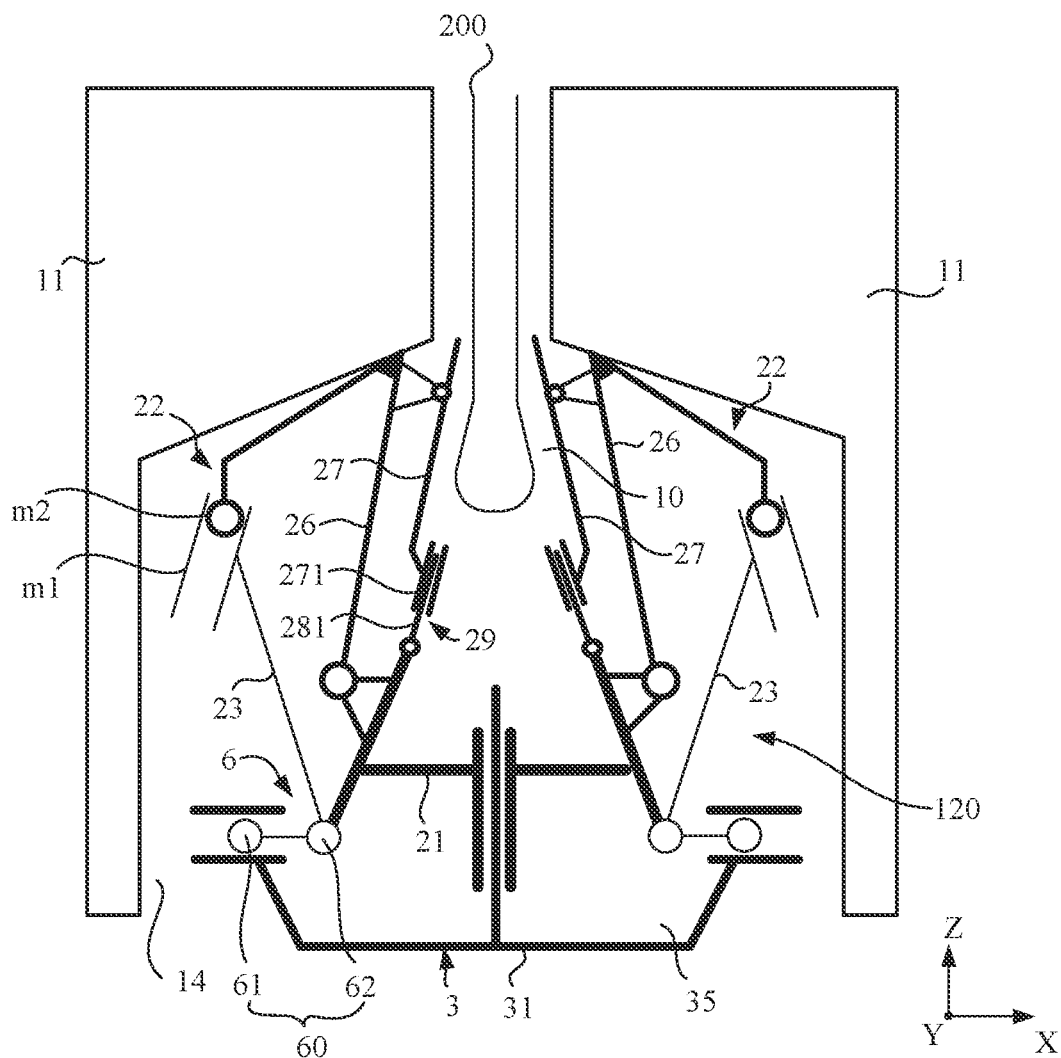
FIG. 6i is a schematic diagram of a terminal device according to a ninth embodiment of this application.
Figure 7:
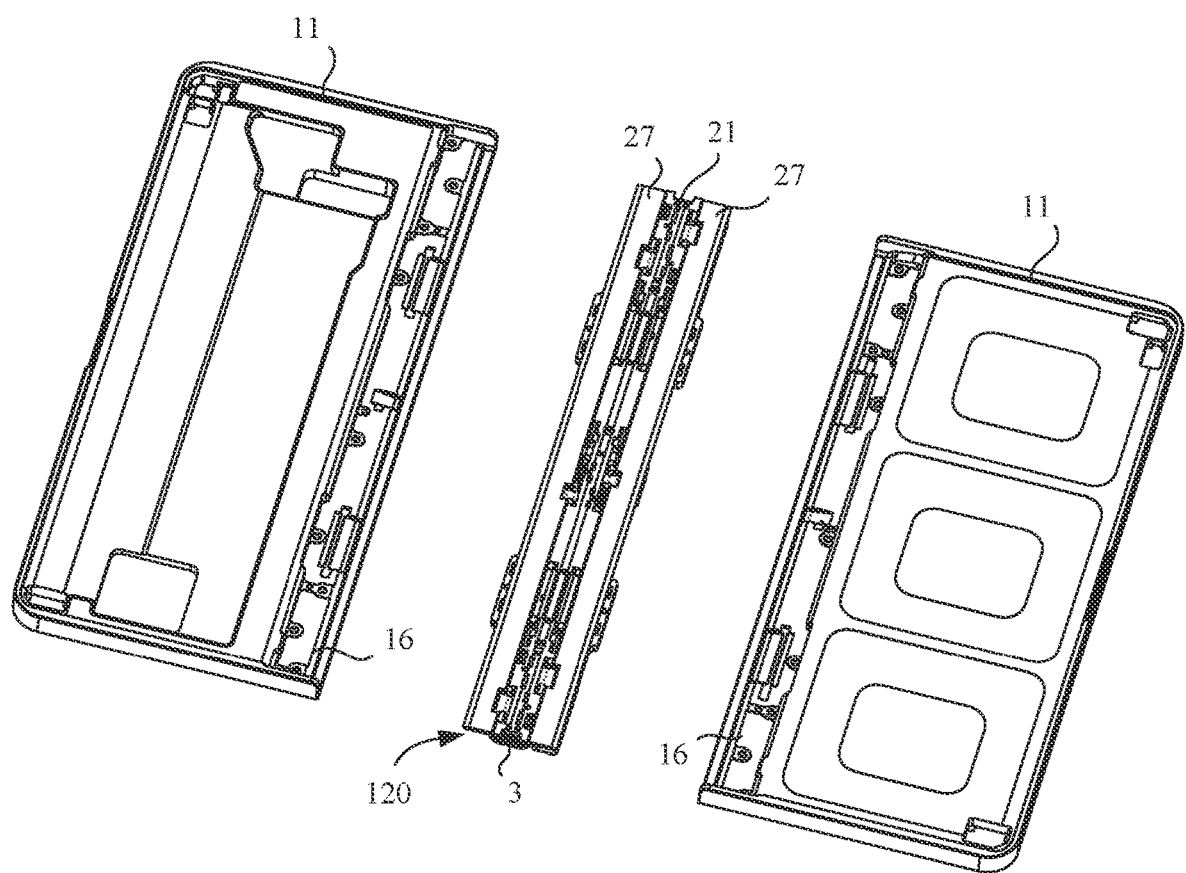
FIG. 7 is an exploded view of the terminal device shown in FIG. 2 from a perspective (observed from a side where the display screen is arranged)

FIG. 6i is a schematic diagram of a terminal device according to a ninth embodiment of this application. A support member 27 and a third swing arm 281 are added, based on the rotating shaft mechanism 120 shown in FIG. 6g, to a rotating shaft mechanism 120 shown in FIG. 6i.

In the embodiment shown in FIG. 6i, the rotating shaft mechanism 120 further includes a support member 27 and a third swing arm 281. A side of the support member 27 is provided with an arrangement space 10 for a display screen 200 to be arranged, the swing arm 22 is arranged on a side of the support member 27 away from the arrangement space 10, and the support member 27 is rotatably connected to the swing arm 22. Specifically, the support member 27 is rotatably connected to the first swing arm 26.

The third swing arm 281 is rotatably connected to the base 21, and the third swing arm 281 is further slidably connected to the support member 27. For example, the support member 27 is provided with a fitting groove 271, and the third swing arm 281 slidably fits the fitting groove 271.

In the process of switching the two sub-bodies 11 to the folded state, the first swing arm 26 may drive the support member 27 to swing relative to the base 21, so that the support member 27 can well support and protect a bent portion of the display screen 200 (the third display region 230 in FIG. 1).

The support member 27 is slidably connected to the third swing arm 281 and rotatably connected to the first swing arm 26, so that the degree of freedom of the mechanism formed by the sub-body 11, the first swing arm 26, the support member 27, the third swing arm 281, and the base 21 can be 1, thereby ensuring that the first swing arm 26 can smoothly drive the support member 27 to swing during the switching of the two sub-bodies 11 to the folded state.

The shape of the support member 27 may be a plate-like structure, a frame structure, or the like, which is not specifically limited herein. When the support member 27 is a plate-like structure, the support member 27 may also be referred to as a door panel, and correspondingly, the third swing arm 281 may also be referred to as a door panel swing arm.

Through the foregoing embodiments shown in FIG. 6a to FIG. 6i, the connection assembly 6 is connected between the swing arm 22 and the shaft cover 3. During rotation of the swing arm 22 from the unfolded position to the folded position, the swing arm 22 may drive the shaft cover 3 to move toward the base 21 through the connection assembly 6 to "lift" the shaft cover 3, so as to increase an amount of overlap between the shaft cover 3 and the sub-body 11 when the two sub-bodies 11 are in the folded state, thereby reducing the gap between the shaft cover 3 and the sub-body 11, so that the shaft cover 3 can effectively prevent external water, dust, and the like from entering the inside of the terminal device.

The schematic diagram of the rotating shaft mechanism 120 shown in FIG. 6d to FIG. 6i is described in detail below with reference to the product structure diagram of the terminal device.

Figure 8:
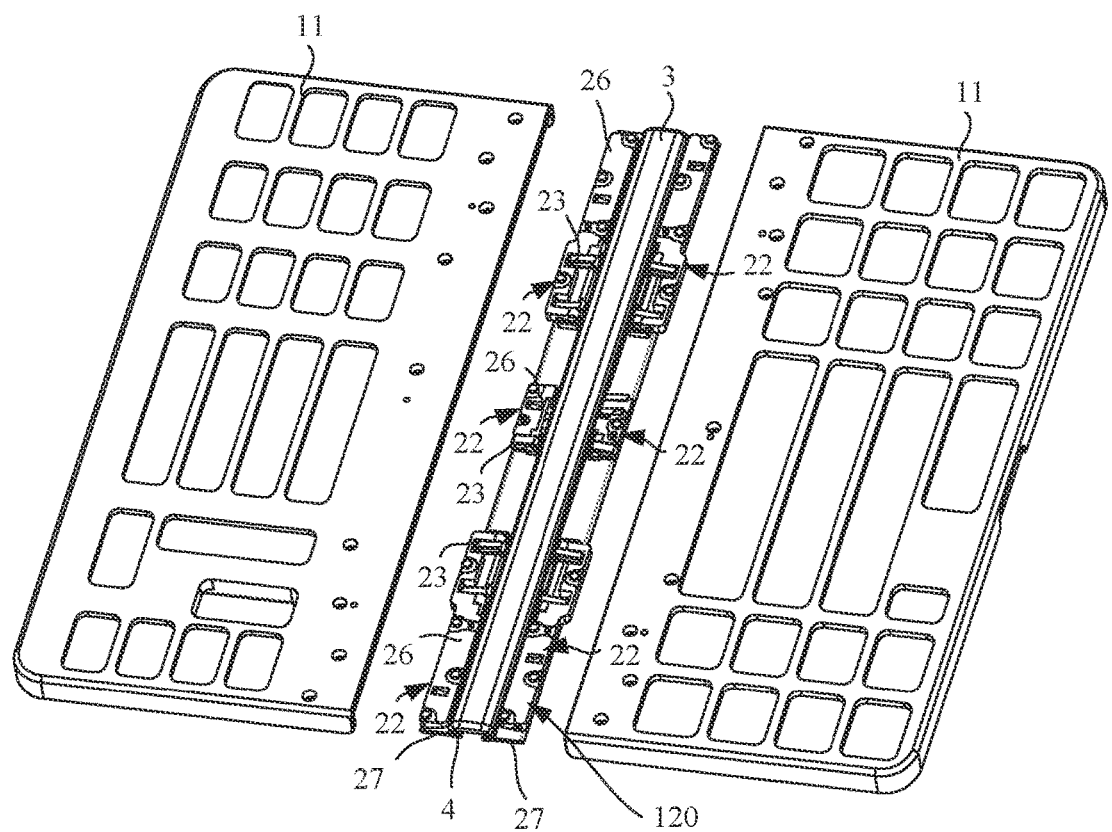
FIG. 8 is an exploded view of the terminal device shown in FIG. 2 from another perspective (observed from a side where a shaft cover is arranged)
Figure 9:
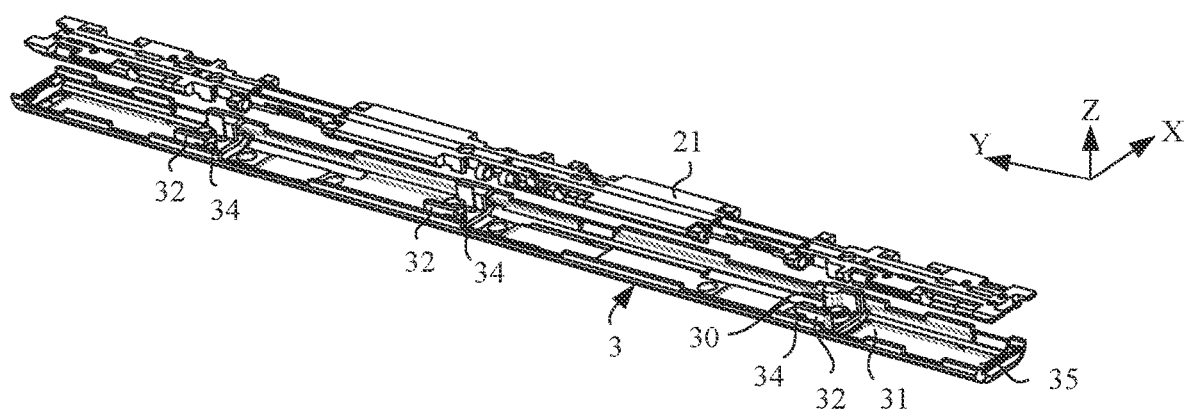
FIG. 9 is an exploded view of a base and a shaft cover according to some embodiments of this application.
Figure 10:
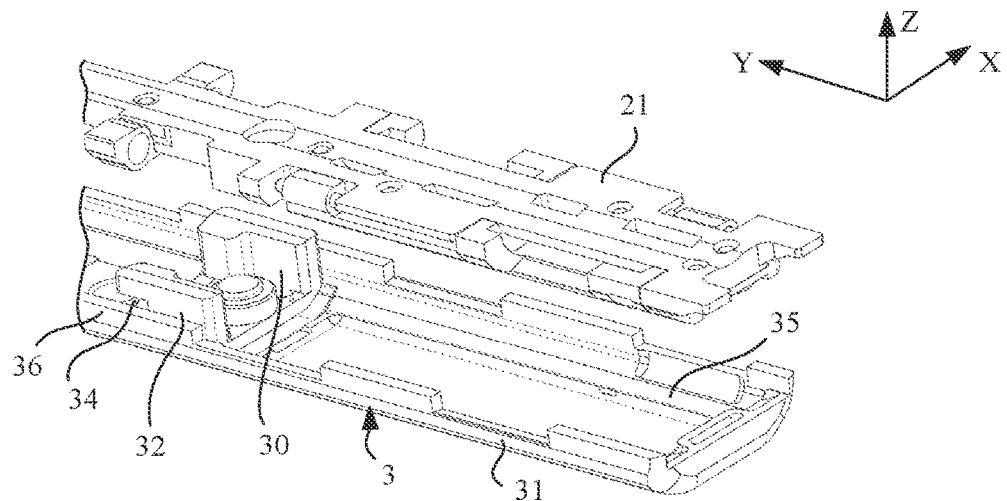
FIG. 10 is a partial view of the base and the shaft cover shown in FIG. 9.
Figure 11:
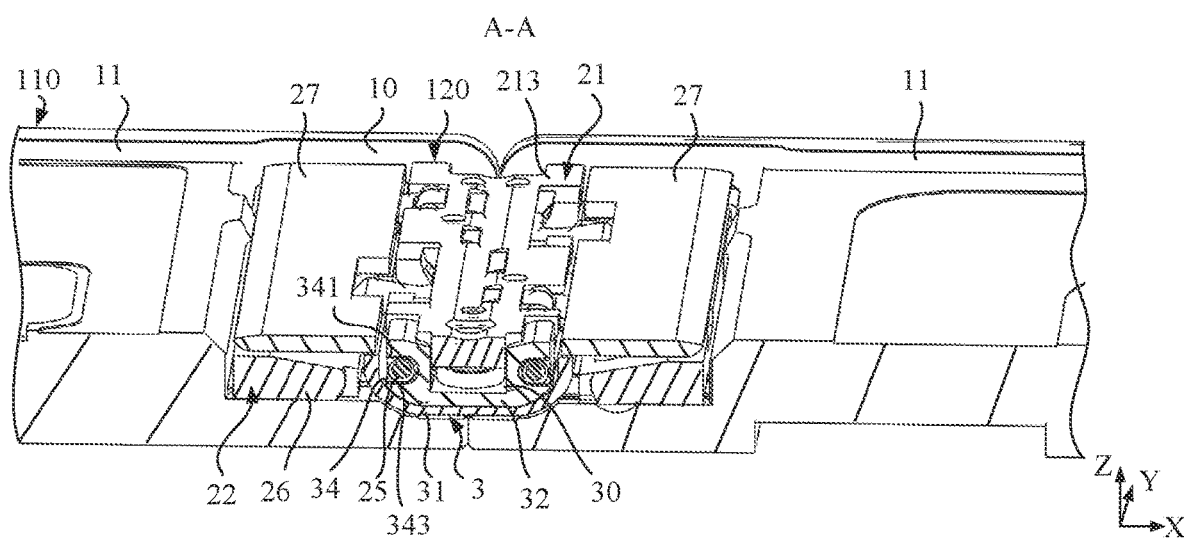
FIG. 11 is a cross-sectional view of the terminal device in FIG. 2 taken along A-A.
Figure 12:
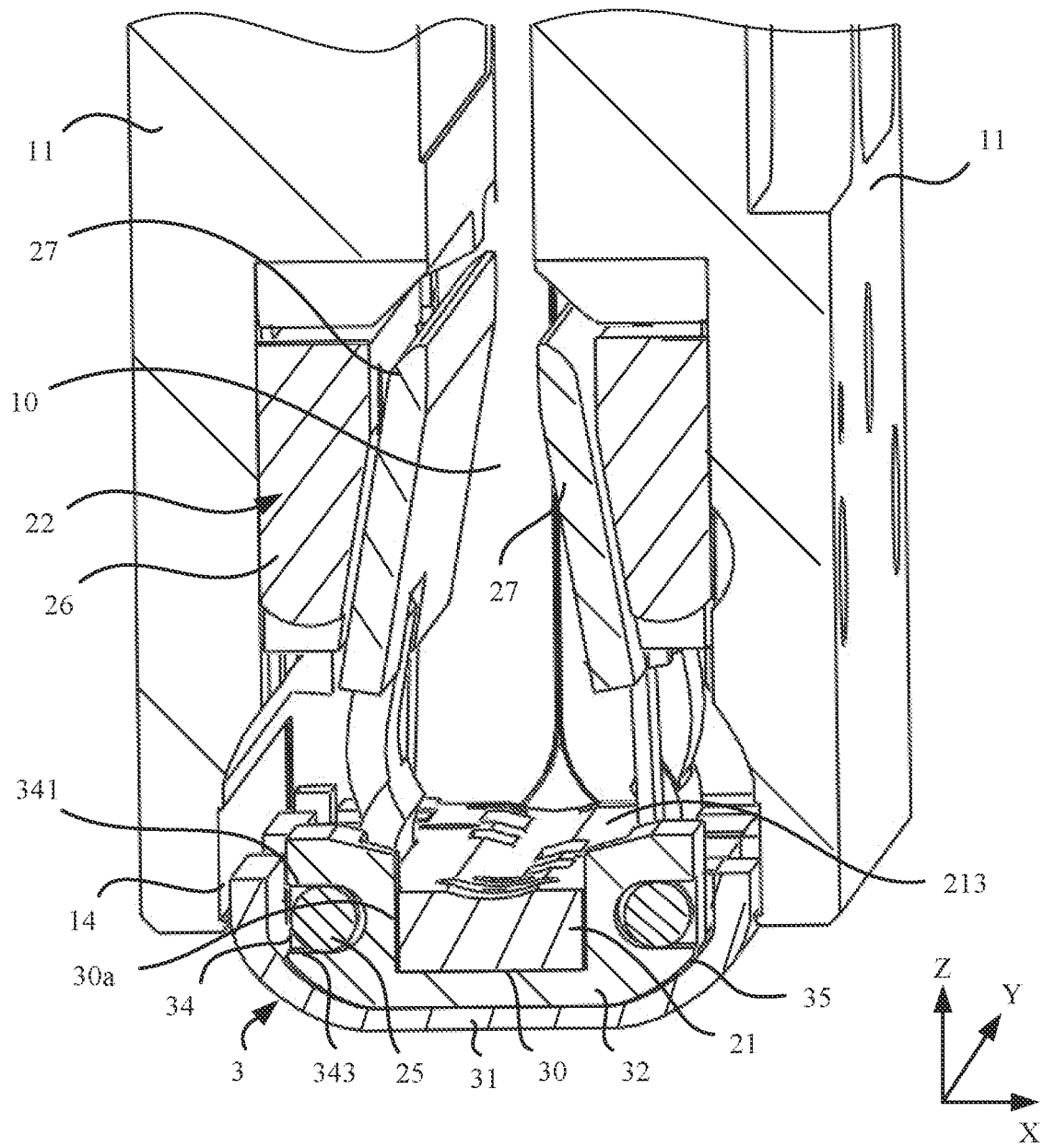
FIG. 12 is a cross-sectional view of the terminal device in FIG. 2 in a folded state taken along A-A.

As shown in FIG. 7 to FIG. 12, FIG. 7 is an exploded view of the terminal device shown in FIG. 2, FIG. 8 is an exploded view of the terminal device shown in FIG. 2 from another perspective (back perspective), FIG. 9 is an exploded view of a base 21 and a shaft cover 3 according to some embodiments of this application, FIG. 10 is a partial view of the base 21 and the shaft cover 3 shown in FIG. 9, FIG. 11 is a cross-sectional view of the terminal device shown in FIG. 2 taken along A-A, and FIG. 12 is a cross-sectional view of the terminal device in FIG. 2 in a folded state taken along A-A.

As shown in FIG. 11 and FIG. 12, the shaft cover 3 is slidably connected to the base 21 in a first direction (the Z-axis direction in the figure). The first direction is perpendicular to both a length direction (the Y-axis direction in the figure) of the shaft cover 3 and a width direction (the X-axis direction in the figure) of the shaft cover 3. Through this design, the shaft cover 3 is subjected to a relatively balanced force during movement driven by the connection assembly 6, and may not skew, so as to prevent a problem such as jamming.

The first direction may be absolutely or approximately perpendicular to the length direction of the shaft cover 3 and the width direction of the shaft cover 3. For example, the deviation is within plus or minus 5 degrees.

For convenience of description, the first direction is represented by the Z-axis direction, the width direction of the shaft cover 3 is represented by the X-axis direction, and the length direction of the shaft cover 3 is represented by the Y-axis direction.

A plurality of manners of realizing the sliding connection between the shaft cover 3 and the base 21 in the Z-axis direction are provided. In some embodiments, the shaft cover 3 is provided with a limiting groove 30 slidably fitting the base 21, and a groove depth direction of the limiting groove 30 is parallel to the Z-axis direction, so that the base 21 and the limiting groove 30 are slidable relative to each other in the groove depth direction of the limiting groove 30, thereby realizing the sliding connection between the shaft cover 3 and the base 21 in the Z-axis direction in FIG. 6*i*.

With reference to FIG. 12, the groove depth direction of the limiting groove 30 being parallel to the Z-axis direction may mean that a groove wall 30*a* on a side of the limiting groove 30 in a groove width direction is parallel to the Z-axis direction, and the groove wall 30*a* and the Z-axis direction may be absolutely parallel or approximately parallel. For example, the deviation is within plus or minus 5 degrees.

By arranging the limiting groove 30 to fit the base 21, the limiting groove 30 can better guide the shaft cover 3 during the movement of the shaft cover 3, so that the shaft cover 3 can move more stably in the Z-axis direction. In addition, since the structure of the limiting groove 30 is relatively firm, the structure of the limiting groove 30 of the shaft cover 3 is not easy to be damaged under the action of external force, which is beneficial to improving the connection reliability between the shaft cover 3 and the base 21.

Certainly, the sliding connection between the shaft cover 3 and the base 21 can be realized through the limiting groove 30 or through hole shaft fit. For example, when the base 21 is provided with a sliding hole, the sliding hole extends in the Z-axis direction, and when the shaft cover connector 32 is provided with a sliding column, the sliding column slidably fits the sliding hole.

In some embodiments, as shown in FIG. 9 and FIG. 10, the shaft cover 3 includes a shaft cover wall 31 and a shaft cover connector 32, the shaft cover wall 31 defines an accommodating space 35, a part (or all) of the shaft cover connector 32 is arranged in the accommodating space 35, the shaft cover connector 32 is detachably connected to the shaft cover wall 31, and the shaft cover connector 32 is slidably connected to the base 21 in the Z-axis direction. For example, the limiting groove 30 is arranged on the shaft cover connector 32, and the base 21 slidably fits the limiting groove 30. Through this design, when the sliding connection structure between the shaft cover 3 and the base 21 is damaged, the sliding connection structure can be repaired by disassembling and replacing the shaft cover connector 32, and it is not necessary to replace the whole shaft cover 3, which is beneficial to reducing the maintenance cost. In addition, the shaft cover connector 32 is arranged in the accommodating space 35, so that the occupation of other spaces by the cover connector 32 can be reduced.

As shown in FIG. 10, the shaft cover connector 32 may be detachably connected to the shaft cover wall 31 through fasteners (such as screws), which is not limited thereto, and the shaft cover connector 32 may also be detachably connected to the shaft cover wall 31 through engagement, insertion, and the like. As shown in FIG. 10, a cross section of the shaft cover wall 31 is U-shaped, which is not limited thereto, and the cross section of the shaft cover wall 31 may alternatively be in another shape such as an arc.

In some embodiments, as shown in FIG. 9, a plurality of shaft cover connectors 32 are arranged, for example, three shaft cover connectors. The plurality of shaft cover connectors 32 are spaced apart from each other in the Y-axis direction. Through this design, a plurality of connecting points are formed between the shaft cover 3 and the base 21. When the shaft cover 3 slides relative to the base 21 in the Z-axis direction, it is beneficial to balancing stress on the shaft cover 3 in the length direction Y, so that the shaft cover 3 can move more stably.

Figure 13:
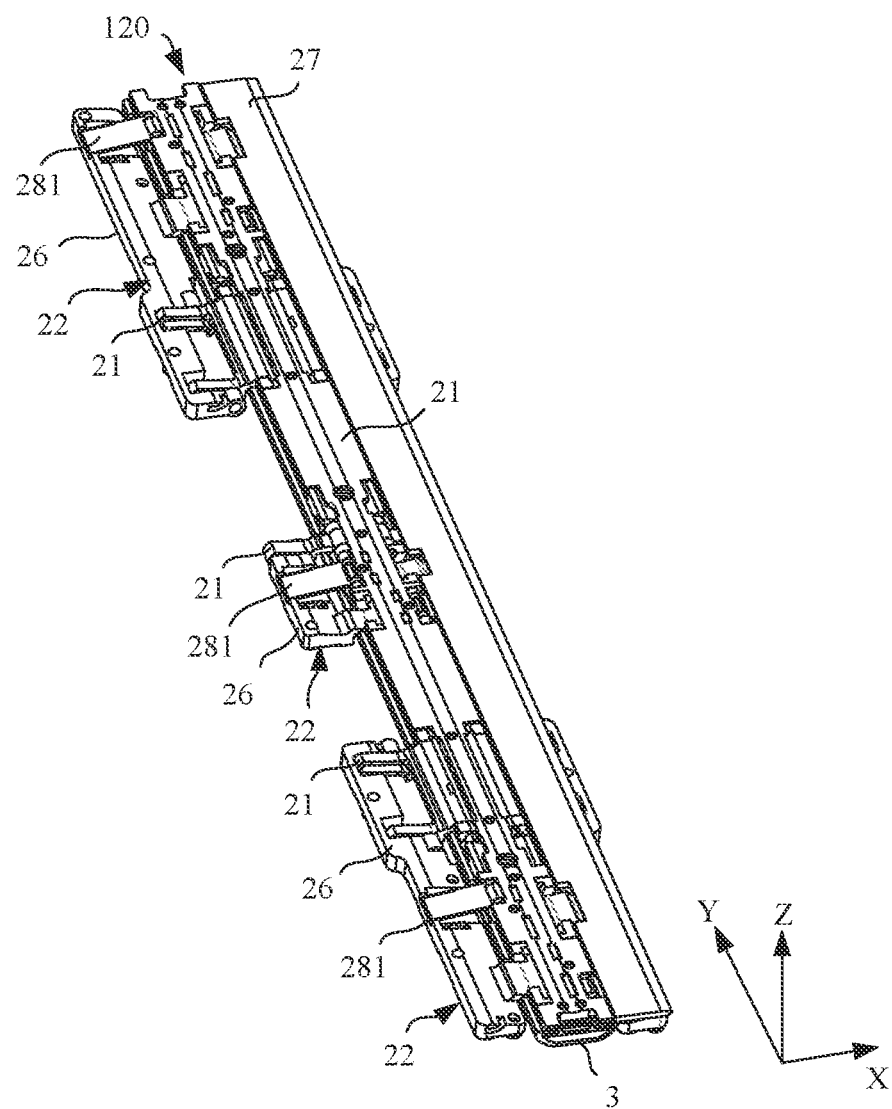
FIG. 13 is a schematic structural diagram of a rotating shaft mechanism in an unfolded state from a perspective (observed from a side where a display screen is arranged) according to some embodiments of this application.
Figure 14:
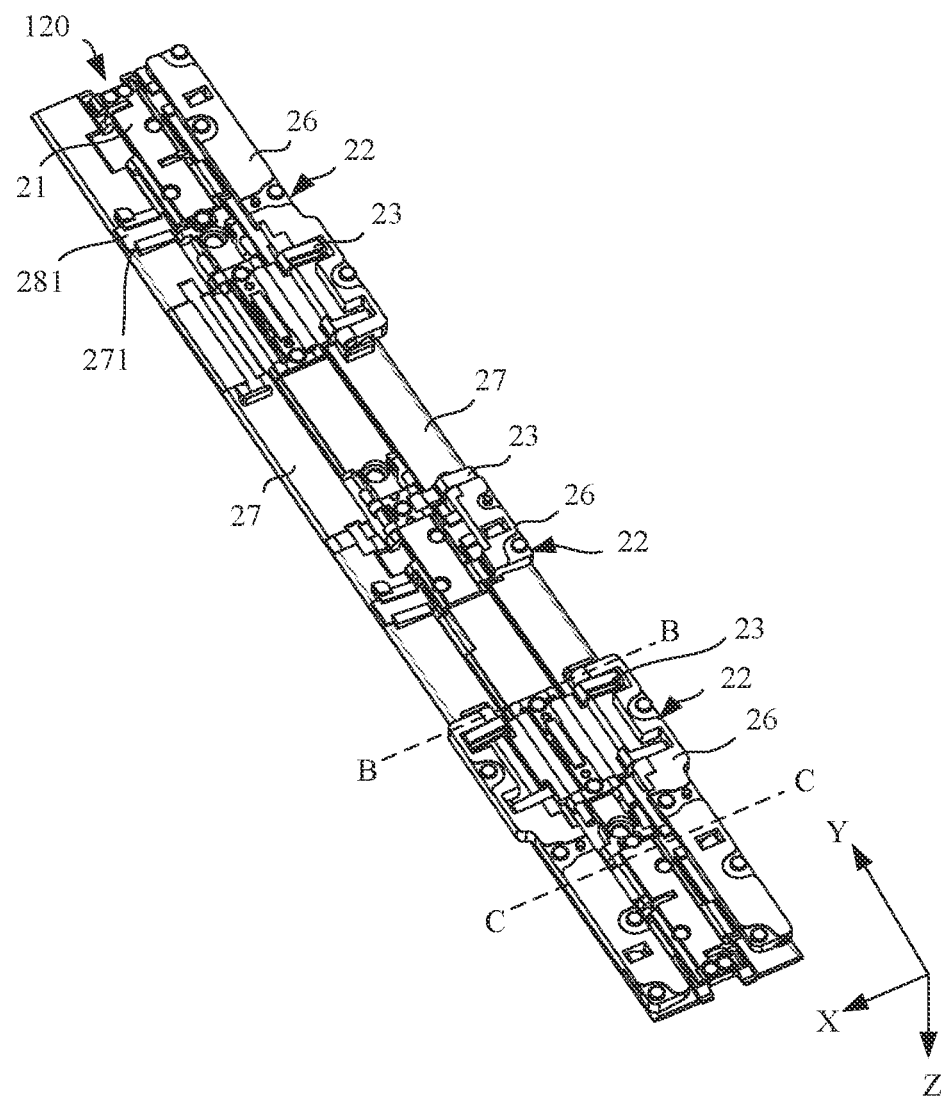
FIG. 14 is a schematic structural diagram of a rotating shaft mechanism in an unfolded state from another perspective (observed from a side where a shaft cover is arranged) according to some embodiments of this application.
Figure 15:
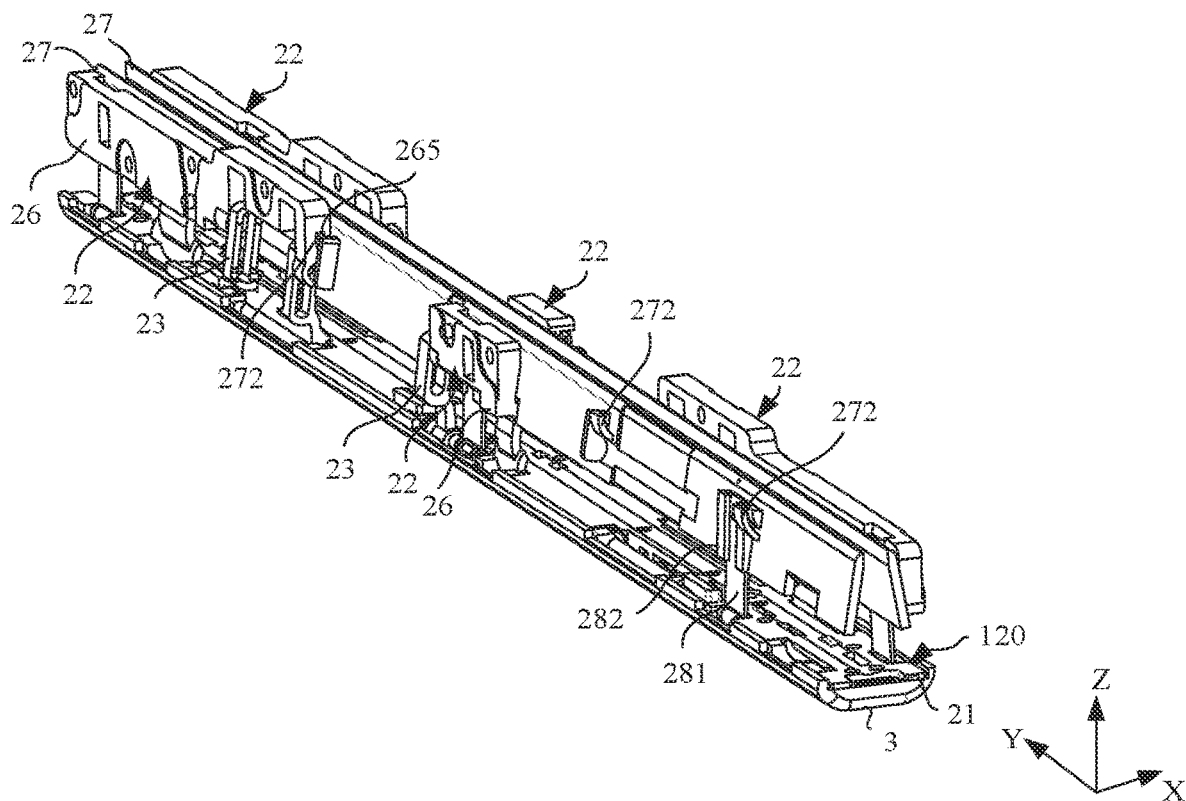
FIG. 15 is a schematic structural diagram of a rotating shaft mechanism in a folded state (with a pair of first swing arm and second swing arm being removed) according to some embodiments of this application.
Figure 16A:
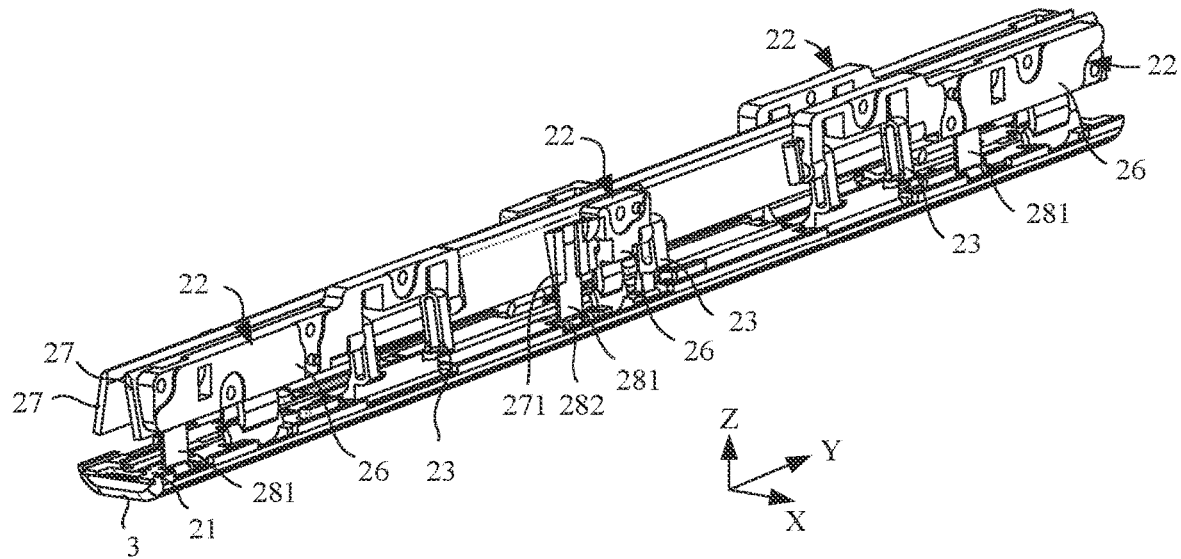
FIG. 16a is a schematic structural diagram of the rotating shaft mechanism in FIG. 15 from another perspective.
Figure 16B:
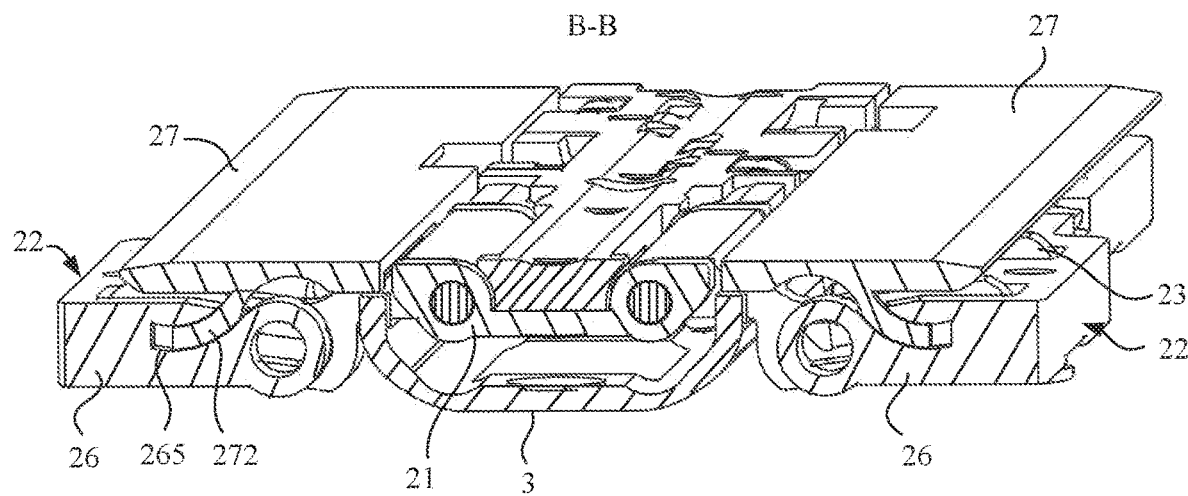
FIG. 16b is a cross-sectional view of the rotating shaft mechanism in FIG. 14 with the shaft cover being not removed taken along B-B.

As shown in FIG. 13 to FIG. 15 and FIG. 16*a*, FIG. 13 is a schematic structural diagram of a rotating shaft mechanism 120 (with a support member 27 on a side being removed) in an unfolded state from a perspective (observed from a side where a display screen 200 is arranged) according to some embodiments of this application, FIG. 14 is a schematic structural diagram of a rotating shaft mechanism 120 in an unfolded state from another perspective (observed from a side where a shaft cover 3 is arranged) according to some embodiments of this application, FIG. 15 is a schematic structural diagram of a rotating shaft mechanism 120 (with a pair of second swing arm 23 and first swing arm 26 being removed) in a folded state according to some embodiments of this application, and FIG. 16*a* is a schematic structural diagram of the rotating shaft mechanism 120 in FIG. 15 from another perspective.

In a width direction X of the shaft cover 3, a swing arm 22 is arranged at each of two side edges of the shaft cover 3. In this way, a quantity of connecting points between the shaft cover 3 and the connection assembly 6 in the width direction X can be increased, so that the stress on the shaft cover 3 in the width direction X is more balanced, and the movement of the shaft cover 3 driven by the connection assembly 6 is more stable.

In some embodiments, the swing arm 22 includes a first swing arm 26 and a second swing arm 23. Both the first swing arm 26 and the second swing arm 23 are rotatably connected to the base 21. The first swing arm 26 is configured to be fixedly connected to the sub-body 11, for example, the first swing arm 26 may be fixedly connected to the sub-body 11 through fasteners such as screws.

In some embodiments, as shown in FIG. 15 and FIG. 16*a*, a plurality of swing arms 22 are arranged at the same side edge of the shaft cover 3, and the plurality of swing arms 22 are arranged in the Y-axis direction. Through this design, a plurality of connecting points may be formed between the shaft cover 3 and the connection assembly 6 in the length direction Y, so that the shaft cover 3 is stressed uniformly in the length direction Y, and the shaft cover 3 can be driven by the connection assembly 6 to move more stably.

Exemplarily, as shown in FIG. 15 and FIG. 16a, three swing arms 22 are arranged at the same side edge of the shaft cover 3, and the three swing arms 22 are correspondingly arranged on two ends and in the middle of the shaft cover 3 respectively.

Certainly, in some embodiments, one swing arm 22 may alternatively be arranged at the same side edge of the shaft cover 3, and the swing arm 22 is arranged at a middle position of the shaft cover 3 in the length direction Y.

Figure 17:
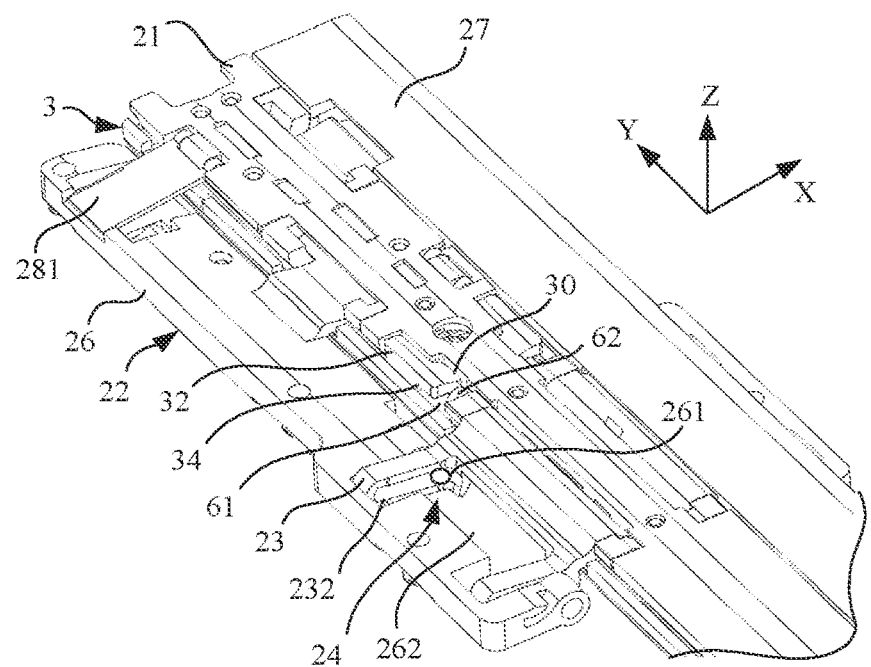
FIG. 17 is a partial view of an end (an upper left end) of the rotating shaft mechanism in FIG. 13.
Figure 18:
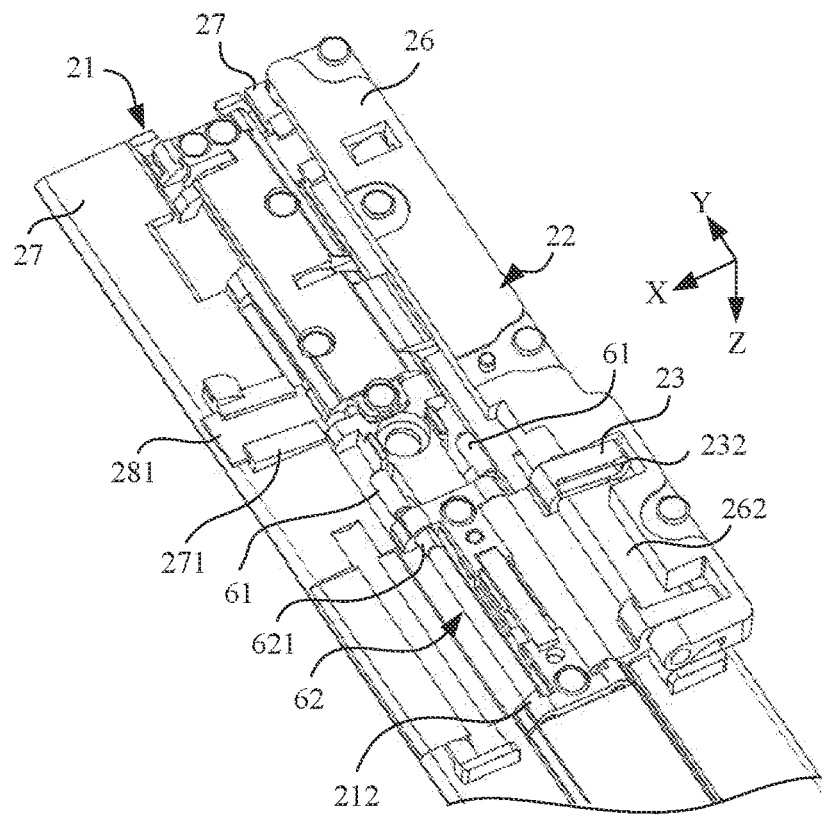
FIG. 18 is a partial view of an end (an upper left end) of the rotating shaft mechanism in FIG. 14.
Figure 19:
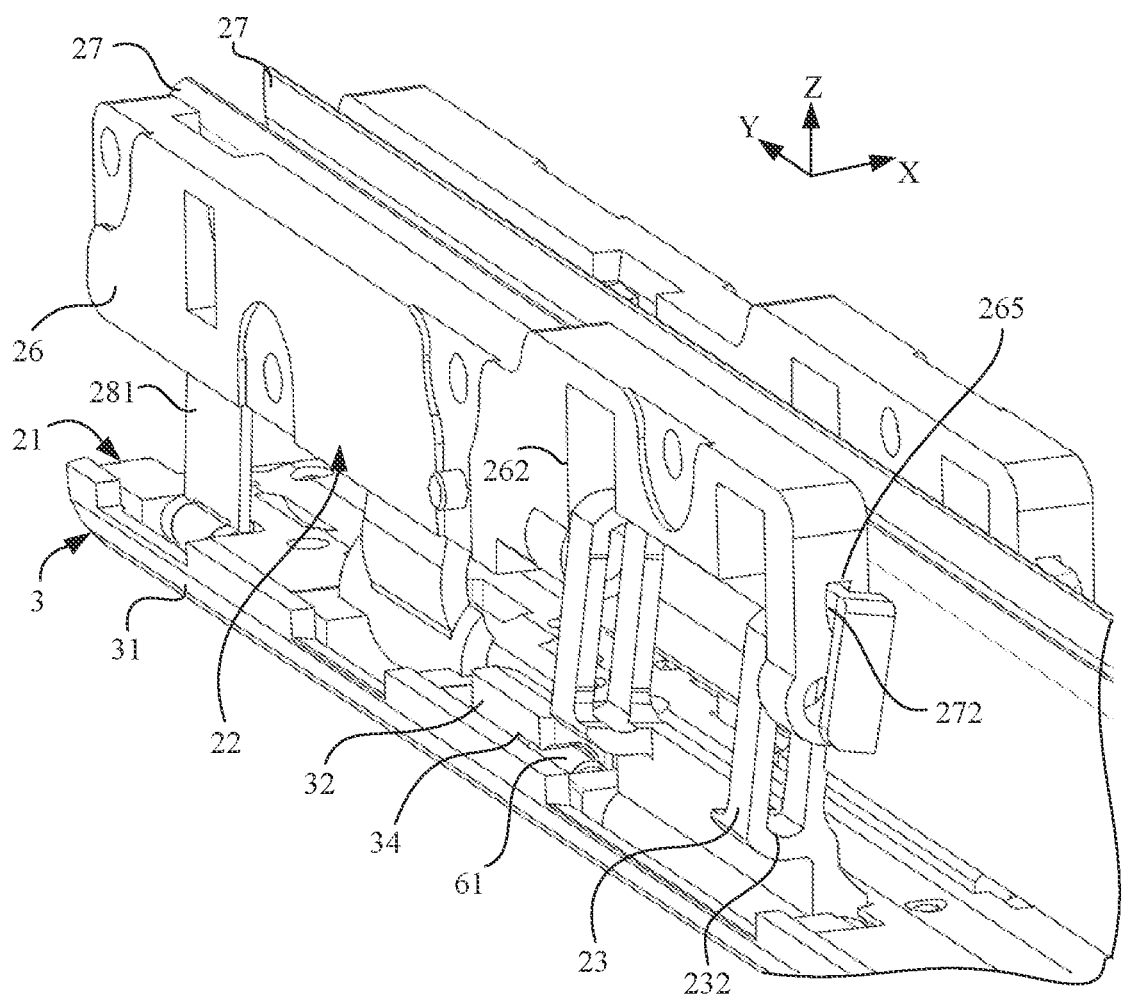
FIG. 19 is a partial view of an end (an upper left end) of the rotating shaft mechanism in FIG. 15.
Figure 20A:
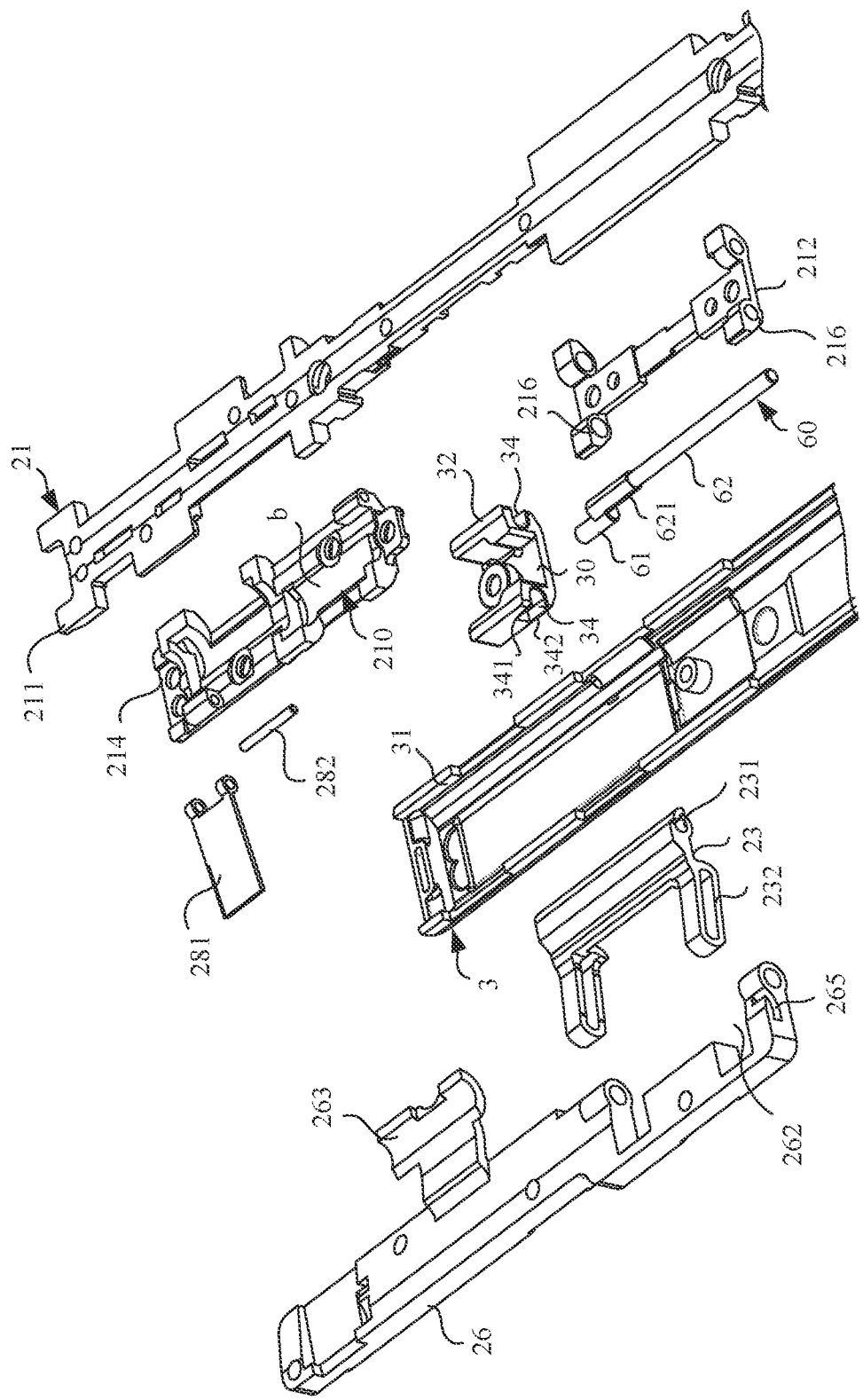
FIG. 20a is an exploded view of a first swing arm, a second swing arm, a base, and a shaft cover in FIG. 17.
Figure 20B:
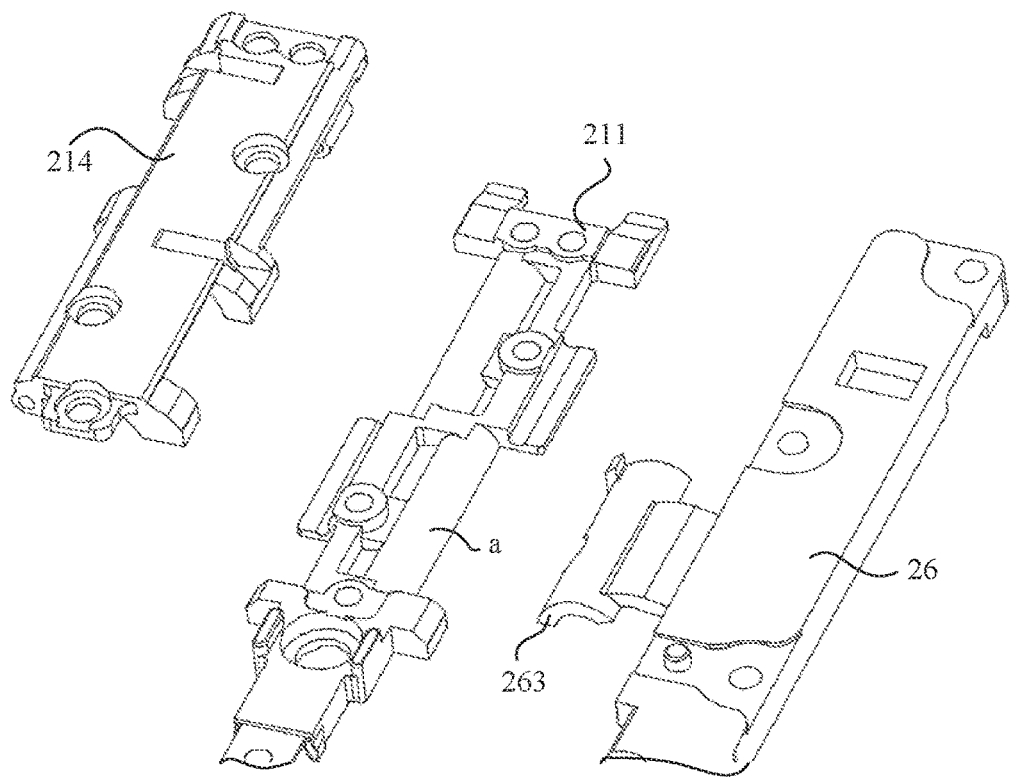
FIG. 20b is an exploded view of the second swing arm and the base in FIG. 17.
Figure 20C:
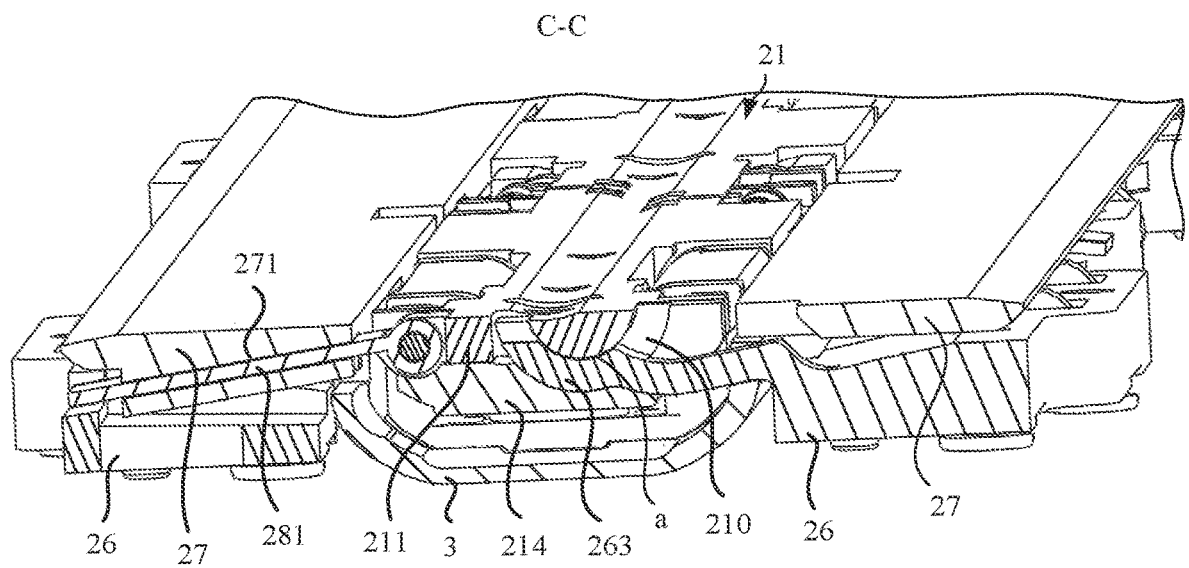
FIG. 20c is a cross-sectional view of the rotating shaft mechanism in FIG. 14 with the shaft cover being not removed taken along C-C.
Figure 20D:
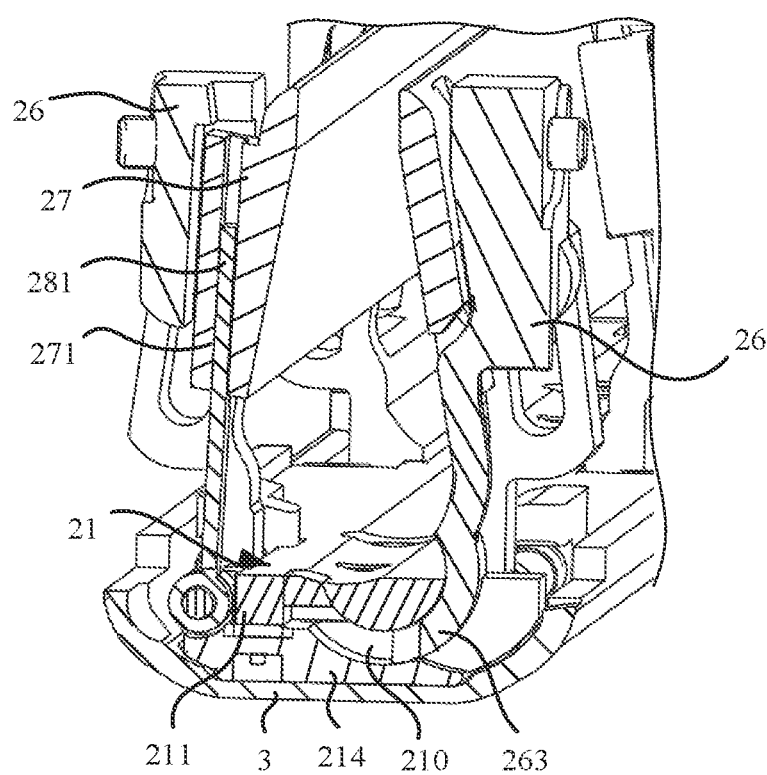
FIG. 20d is a cross-sectional view of the rotating shaft mechanism in FIG. 14 in a folded state and with the shaft cover being not removed taken along C-C.
Figure 21:
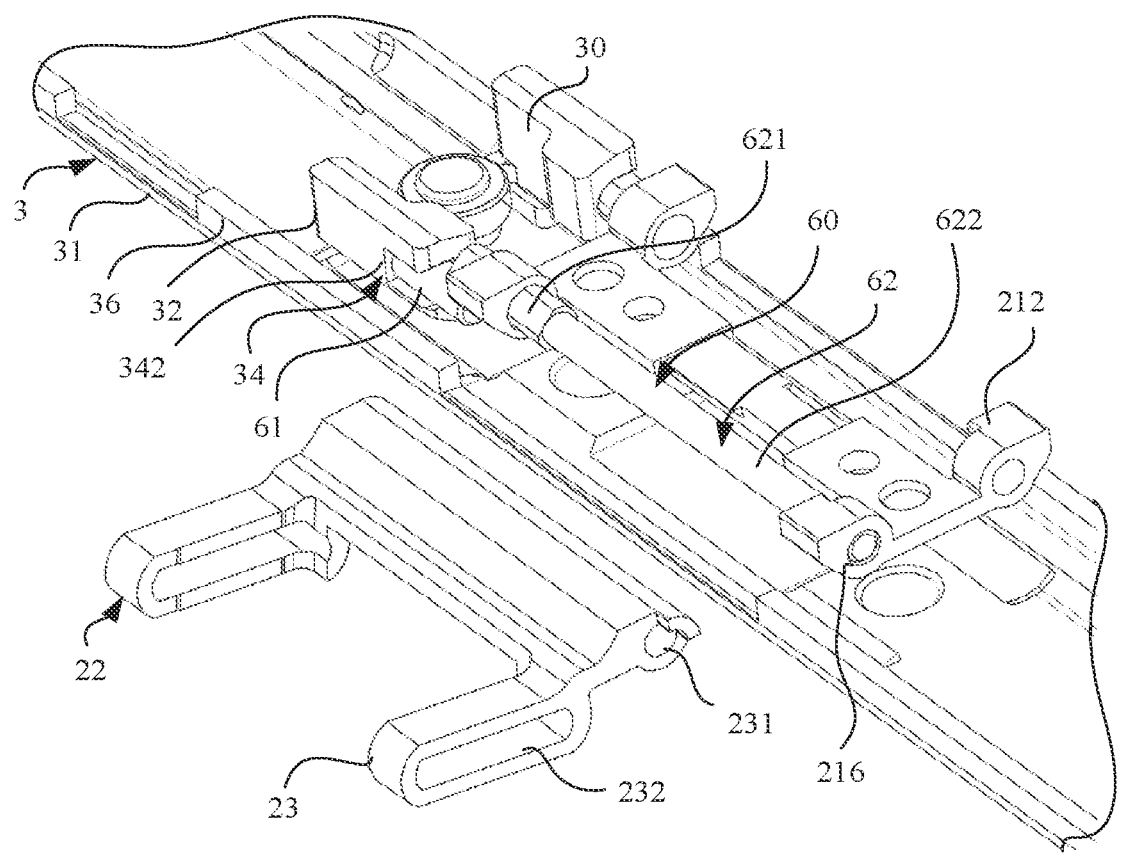
FIG. 21 is a schematic diagram of connection between a toggle member and a shaft cover according to some embodiments of this application.
Figure 22:
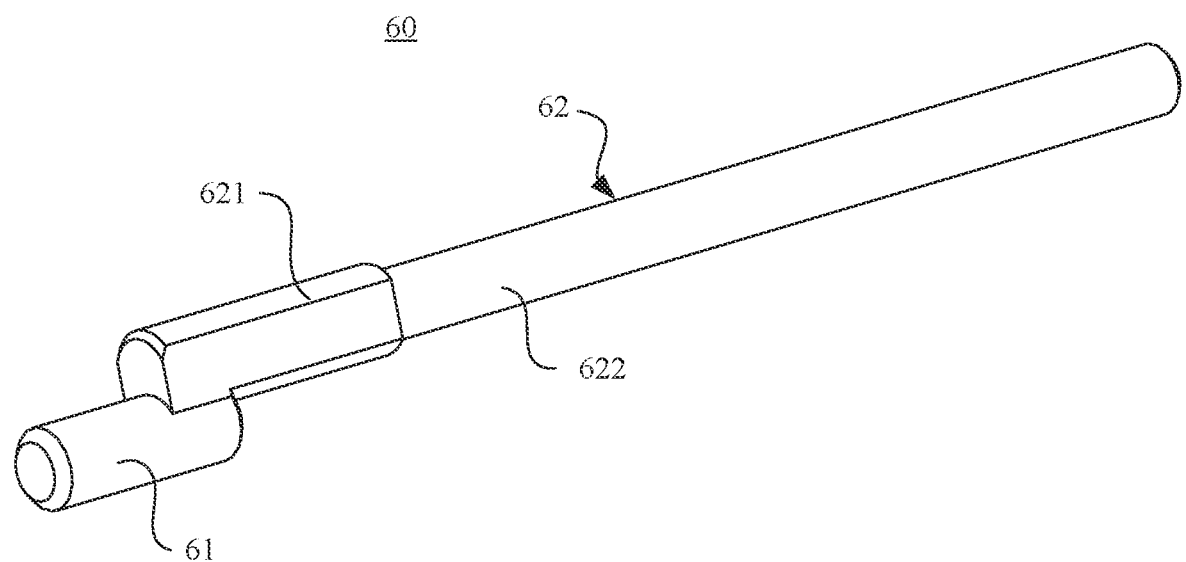
FIG. 22 is a schematic structural diagram of connection between a toggle member and a rotating shaft according to some embodiments of this application.
Figure 23:
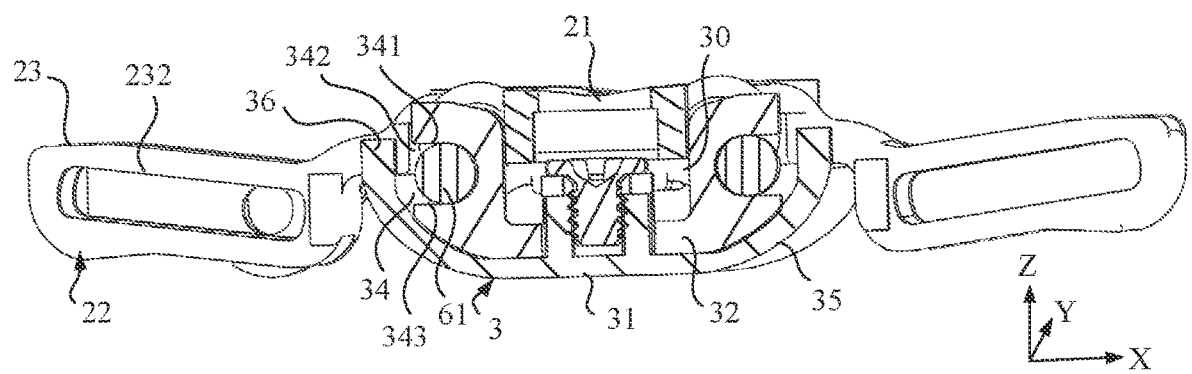
FIG. 23 is a cross-sectional view of a connection relationship among a base, a shaft cover, and a toggle member according to some embodiments of this application.

The structure and the mounting manner of the swing arm 22 arranged at one end of the shaft cover 3 in FIG. 13 to FIG. 15 and FIG. 16a are specifically described below:

As shown in FIG. 17 to FIG. 23, FIG. 17 is a partial view of an end (an upper left end) of the rotating shaft mechanism 120 in FIG. 13, FIG. 18 is a partial view of an end (an upper left end) of the rotating shaft mechanism 120 in FIG. 14, FIG. 19 is a partial view of an end (an upper left end) of the rotating shaft mechanism 120 in FIG. 15, FIG. 20a is an exploded view of a second swing arm 23, a first swing arm 26, a base 21, and a shaft cover 3 in FIG. 17, FIG. 20b is an exploded view of the first swing arm 26 and the base 21 in FIG. 17, FIG. 21 is a schematic diagram of connection between a toggle member 61 and a shaft cover 3 according to some embodiments of this application, FIG. 22 is a schematic structural diagram of connection between a toggle member 60 according to some embodiments of this application, and FIG. 23 is a cross-sectional view of a connection relationship among a base 21, a shaft cover 3, and a toggle member 60 according to some embodiments of this application.

As shown in FIG. 17, FIG. 18, and FIG. 19, the swing arm 22 includes a first swing arm 26 and a second swing arm 23. The first swing arm 26 is fixedly connected to the sub-body 11, and the first swing arm 26 and the second swing arm 23 are both rotatably connected to the base 21. The second swing arm 23 has an unfolded position and a folded position. The first swing arm 26 is connected to the second swing arm 23 through a first connection structure 24, so that the first swing arm 26 drives the second swing arm 23 to rotate relative to the base 21 at the unfolded position (as shown in FIG. 17 and FIG. 18) and the folded position (as shown in FIG. 19).

The first swing arm 26 may be fixedly connected to the sub-body 11 through fasteners (such as screws), which is not limited thereto, and the first swing arm 26 may also be fixedly connected to the sub-body 11 through engagement, insertion, and the like.

The first swing arm 26 may be rotatably connected to the base 21 through the following structure. In some embodiments, as shown in FIG. 20b, FIG. 20c, and FIG. 20d, FIG. 20c is a cross-sectional view of the rotating shaft mechanism 120 in FIG. 14 with the shaft cover 3 not being removed taken along C-C, and FIG. 20d is a cross-sectional view of the rotating shaft mechanism 120 in FIG. 14 in a folded state and with the shaft cover 3 not being removed taken along C-C. The base 21 is provided with a first arc-shaped groove 210, the first swing arm 26 is provided with a first arc-shaped sheet 263, and the first arc-shaped sheet 263 slidably fits the first arc-shaped groove 210, so that the first swing arm 26 is rotatably connected to the base 21. Due to the sliding fit between the first arc-shaped sheet 263 and the first arc-shaped groove 210, a contact area between the first arc-shaped sheet 263 and the first arc-shaped groove 210 can be larger, and the first arc-shaped sheet 263 may not shake when the first arc-shaped sheet 263 slides relative to the first arc-shaped groove 210, so that the first swing arm 26 rotates more smoothly relative to the base 21.

In some embodiments, as shown in FIG. 20a and FIG. 20b, the base 21 includes a base body 211 and a base connector 214 detachably connected to the base body 211, and the base body 211 and the base connector 214 define the first arc-shaped groove 210.

Through this design, the first arc-shaped groove 210 can be easily disassembled, thereby facilitating the cleaning of inside of the first arc-shaped groove 210 and mounting and disassembly of the first swing arm 26.

The first arc-shaped groove 210 may be formed by the following structure. As shown in FIG. 20a and FIG. 20b, the base body 211 is provided with an arc-shaped protruding surface a, the base connector 214 is provided with a cavity, and the cavity has an arc-shaped wall B. When the base 21 connector is mounted to the base body 211, the first arc-shaped groove 210 is formed between the arc-shaped protruding surface a and the arc-shaped wall b of the cavity.

As shown in FIG. 18 and FIG. 20a, the base body 211 may be detachably connected to the base connector 214 through fasteners (such as screws), which is not limited thereto, and the base body 211 may alternatively be detachably connected to the base connector 214 through engagement, insertion, and the like.

The first connection structure 24 is not unique. In some embodiments, as shown in FIG. 17 and FIG. 18, the first connection structure 24 includes a sliding groove 232 and a sliding part 261. The sliding groove 232 is arranged on the second swing arm 23, and the sliding part 261 is arranged on the first swing arm 26. One end of the sliding groove 232 is arranged close to the base 21, the other end of the sliding groove 232 is arranged away from the base 21, and the sliding part 261 slidably fits the sliding groove 232, so that the first swing arm 26 is slidably connected to the second swing arm 23. The first connection structure 24 is arranged as a structure in which the sliding part 261 fits the sliding groove 232, so that the structure of the first connection structure 24 is simple and the occupied space is small.

The sliding part 261 may be columnar or blocky, which is not specifically limited herein. When the sliding part 261 is columnar, the sliding part 261 may be arranged on the first swing arm 26 through a mounting hole.

The arrangement positions of the sliding groove 232 and the sliding part 261 may also be mutually swapped. To be specific, the second swing arm 23 is provided with the sliding part 261, and the first swing arm 26 is provided with the sliding groove 232. This design can also realize the sliding connection between the second swing arm 23 and the first swing arm 26.

Certainly, the first connection structure 24 is not limited to the sliding groove 232 and the sliding part 261, or may be a transmission link. One end of the transmission link is hinged to the first swing arm 26, and the other end of the transmission link is hinged to the second swing arm 23, so that the first swing arm 26 can also drive the second swing arm 23 to rotate relative to the base 21 at the unfolded position and the folded position.

In some embodiments, as shown in FIG. 18 and FIG. 19, the first swing arm 26 is provided with an avoidance opening 262, and the second swing arm 23 extends into the avoidance opening 262. Through this design, the second swing arm 23 and the first swing arm 26 can be designed more compactly, and the overall space occupied by the second swing arm 23 and the first swing arm 26 is reduced.

In some embodiments, as shown in FIG. 6f, FIG. 6g, FIG. 6i, and FIG. 21 to FIG. 23, the connection assembly 6 includes a toggle member 60. The toggle member 60 (which may also be referred to as a crank toggle member) includes a rotating shaft 62 and an eccentric portion 61 eccentrically arranged with the rotating shaft 62. The swing arm 22 is rotatably connected to the base 21 through the rotating shaft 62, the eccentric portion 61 is eccentrically arranged with respect to the rotating shaft 62, and the rotating shaft 62 is fixed relative to the swing arm 22 in a circumferential direction thereof. The shaft cover 3 is provided with a cavity 34, and the eccentric portion 61 extends into the cavity 34, so that the eccentric portion 61 is movable in the X-axis direction in the cavity 34. In addition, due to the limited connection between the shaft cover 3 and the base 21 in the X direction and Y direction, and the limiting effect of the cavity 34 on the eccentric portion 61 in the Z direction, the eccentric portion 61 can drive the shaft cover 3 to move in the Z direction during synchronous rotation with the rotating shaft 62, but not in the X direction and Y direction.

Specifically, in FIG. 21 to FIG. 23, the second swing arm 23 is connected to the rotating shaft 62.

In some embodiments, as shown in FIG. 23, in the Z-axis direction, the cavity 34 has a first inner wall 341 and a second inner wall 343 which are opposite to each other, and both the first inner wall 341 and the second inner wall 343 abut against the eccentric portion 61.

As shown in FIG. 6i and FIG. 23, the second swing arm 23 located on the left in 6i and FIG. 23 is used as an example to describe the movement process. Since the rotating shaft 62 is fixed relative to the second swing arm 23 in the circumferential direction thereof, when the second swing arm 23 on the left is driven by the first swing arm 26 to rotate clockwise (that is, rotate toward the folded position), the second swing arm 23 drives the rotating shaft 62 to rotate clockwise, and the eccentric portion 61 is driven by the rotating shaft 62 to move to the upper right, and is pressed against the first inner wall 341 on the upper side, so that the eccentric portion 61 drives the shaft cover 3 to move upward to move toward the base 21, so as to lift the shaft cover 3.

When the second swing arm 23 on the left rotates counterclockwise (that is, rotates toward the unfolded position), the second swing arm 23 drives the rotating shaft 62 to rotate counterclockwise, and the eccentric portion 61 is driven by the rotating shaft 62 to move to the lower left, and is pressed against the second inner wall 343 on the lower side, so that the eccentric portion 61 drives the shaft cover 3 to move downward to move away from the base 21, so as to "lower" the shaft cover 3.

It should be noted that, the first inner wall 341 and the second inner wall 343 of the cavity 34 are arranged opposite to each other. The first inner wall 341 and the second inner wall 343 may or may not be arranged in parallel. For example, if an included angle between the first inner wall 341 and the second inner wall 343 is within 20 degrees, it may be considered that the first inner wall 341 and the second inner wall 343 are arranged opposite to each other. In addition, the first inner wall 341 and the second inner wall 343 are not limited to flat surfaces. The first inner wall 341 and the second inner wall 343 abutting against the eccentric portion 61 specifically includes point contact, line contact, or surface contact between the first inner wall 341 or the second inner wall 343 and the eccentric portion 61. During the rotation of the eccentric portion 61 with the rotating shaft 61, an acting force may be generated between the eccentric portion 61 and the first inner wall 341 or the second inner wall 343. When the display screen does not rotate, no acting force may be generated between the eccentric portion 61 and the first inner wall 341 or the second inner wall 343. It may be understood that due to the manufacturing tolerance, a specific deviation exists between an actual size and an ideal size of the eccentric portion 61, which may cause at least one of the first inner wall 341 and the second inner wall 343 to be separated from (that is, not to contact) the eccentric portion 61.

The first inner wall 341 and the second inner wall 343 are caused to abut against the eccentric portion 61, so that the eccentric portion 61 not only can drive the shaft cover 3 to move toward the base 21 to "lift" the shaft cover, and but also can drive the shaft cover 3 to move away from the base 21 to "lower" the shaft cover 3 when the rotating shaft 61 drives the eccentric portion 61 into rotation. In other words, the eccentric portion 61 can apply a force to the shaft cover 3 in two directions, and then a restoring member such as a spring does not need to be arranged to restore the shaft cover 3, so that the structure of the connection assembly 6 is simpler and fewer components are required. The eccentric portion 61 is arranged to slide along the cavity 34 in the X-axis direction, so that the degree of freedom of the mechanism formed between the second swing arm 23, the toggle member 60, and the shaft cover 3 can be 1, and the toggle member 60 can drive the shaft cover 3 to "ascend or descend" during rotation. Moreover, during the rotation of the swing arm 22, the eccentric portion 61 can keep in contact with the first inner wall 341 and the second inner wall 342 of the cavity 34, so as to avoid shaking or noise of the shaft cover caused by a collision between the eccentric portion 61 and the first inner wall 341 or the second inner wall 342 at an initial stage or an end stage of the rotation of the swing arm 22 as much as possible, and also avoid lagging of the shaft cover 3 being lifted or lowered with the swing arm 33 as much as possible, so that the shaft cover 3 moves smoothly during the folding and unfolding the display screen.

In some embodiments, as shown in FIG. 21 and FIG. 22, the eccentric portion 61 is a columnar structure protruding relative to the rotating shaft 62, and a central axis of the eccentric portion 61 is parallel to and different from a central axis of the rotating shaft 62. Through this design, during rotation of the rotating shaft 62, a movement trajectory of the eccentric portion 61 occupies less space, so that the eccentric portion 61 is less likely to interfere with the movement of surrounding components.

As shown in FIG. 21 and FIG. 22, the eccentric portion 61 is a columnar protruding structure, which is not limited thereto. The eccentric portion 61 may also be designed as a conical protruding structure, a truncated cone protruding structure, a spherical protruding structure, and the like, which may be specifically determined based on an actual situation.

In some embodiments, as shown in FIG. 22, the eccentric portion 61 and the rotating shaft 62 are integrally formed. This design not only can improve the connection strength between the eccentric portion 61 and the rotating shaft 62, so that the eccentric portion 61 and the rotating shaft 62 may not break, but also can reduce the number of components of the rotating shaft mechanism 120, so as to facilitate the assembly of the rotating shaft mechanism 120.

Certainly, in some other embodiments, the eccentric portion 61 and the rotating shaft 62 may also be designed separately, and the eccentric portion 61 and the rotating shaft 62 are connected together through screwed connection, engagement, and the like.

Figure 25:
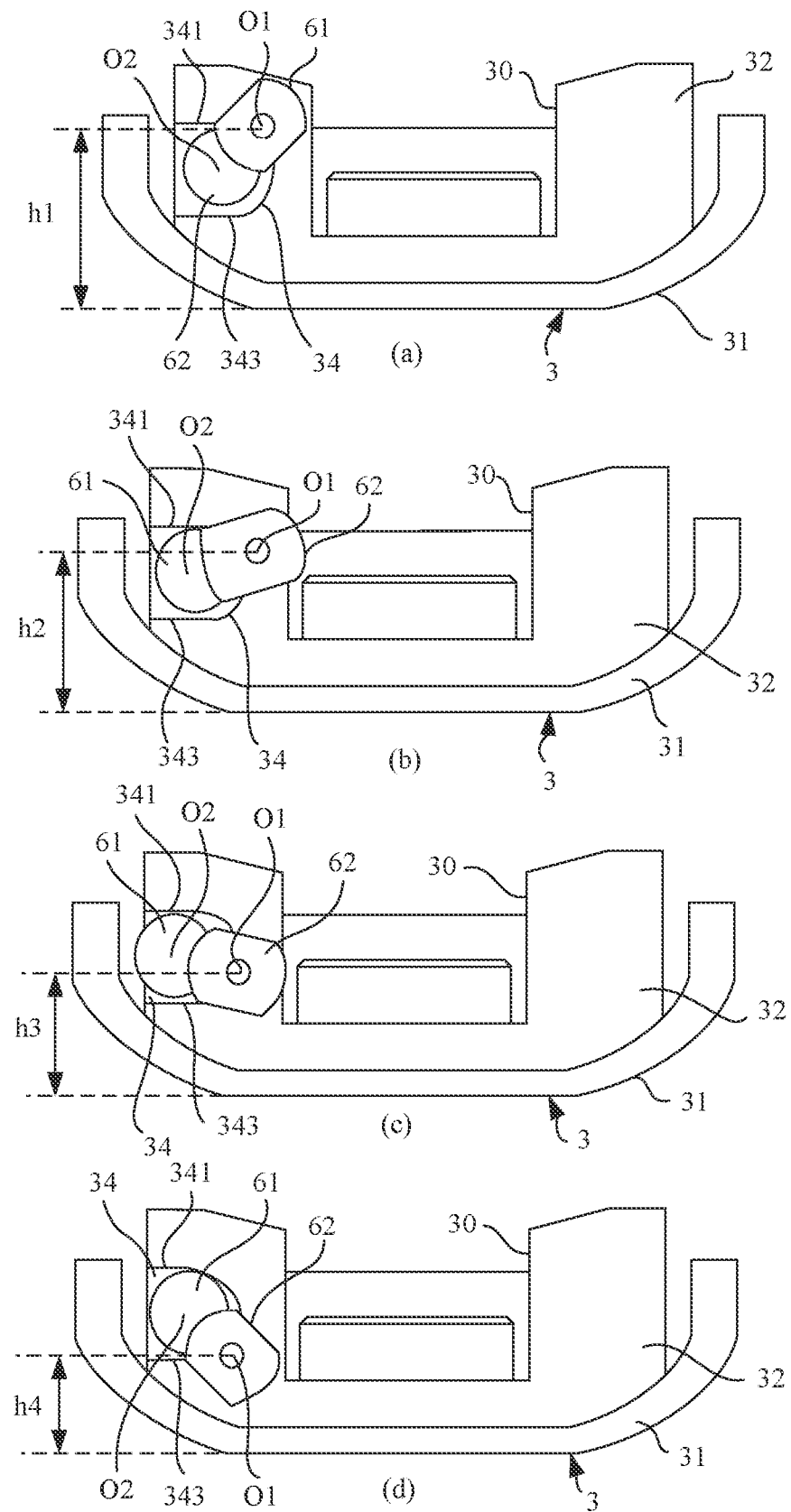
FIG. 25 is a schematic diagram of a change in a position relationship of the shaft cover driven by the toggle portion during rotation of the rotating shaft according to some embodiments of this application.

FIG. 25 is a schematic diagram of a change in a position relationship of the shaft cover 3 driven by the eccentric portion 61 during rotation of the rotating shaft 62 according to some embodiments of this application. It may be seen from (a) to (d) in FIG. 25, during the clockwise rotation of the rotating shaft 62, the position of the eccentric portion 61 relative to an axis O1 of the rotating shaft 62 is gradually lifted, and the eccentric portion 61 presses the inner wall of the cavity 34 during the gradual lifting, thereby lifting the position of the shaft cover 3. Changes of h1, h2, h3, and h4 in the figure reflect a change of a distance between the axis O of the rotating shaft 62 and a lower surface of the shaft cover 3, and h4 is obviously less than h1. Therefore, it may be seen that the distance by which the rotating shaft 62 lifts the shaft cover 3 during the rotation is relatively significant, and an amount of overlap of the shaft cover 3 and the sub-bodies 11 can be significantly increased when the two sub-bodies 11 are in the folded state.

Figure 26:
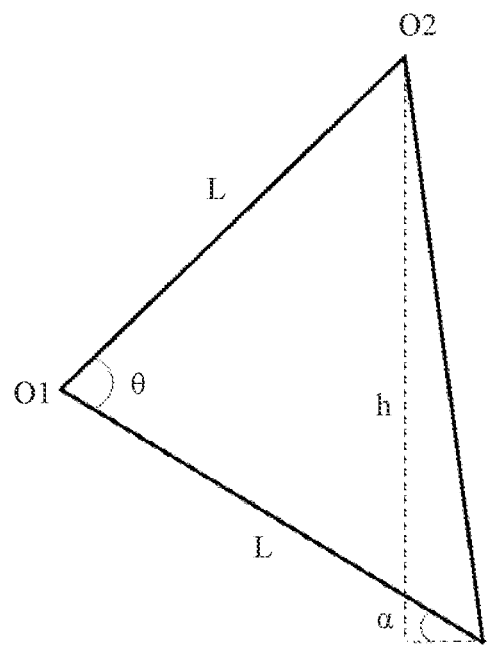
FIG. 26 is a schematic diagram of a relationship between a rotation angle of the first swing arm and a lifting amount of the shaft cover according to some embodiments of this application.

FIG. 26 shows a relationship between a rotation angle of the second swing arm 23 and a lifting amount of the shaft cover 3 according to some embodiments of this application. If the rotation angle of the second swing arm 23 is θ, an eccentric distance between the axis O1 of the rotating shaft 62 and the axis O2 of the eccentric portion 61 (the eccentric portion 61 is in the shape of a cylinder) is L, and an initial included angle between a line connecting the axis O1 of the rotating shaft 62 to the axis O2 of the eccentric portion 61 and the horizontal plane is α, so that it may be learned that the benefits of the amount h of overlap between the shaft cover 3 and the sub-bodies 11 brought by this mechanism are: $h=2L\sin(\theta/2)\cos(\alpha-\theta/2)$, where a lift value of the shaft cover 3 may be properly designed by properly designing the angle and a length parameter.

In some embodiments, as shown in FIG. 21 and FIG. 23, in the X-axis direction, an end of the shaft cover connector 32 is provided with an opening 342 in communication with the cavity 34, and the opening 342 is configured for the eccentric portion 61 to extend into the cavity 34. Through this design, the eccentric portion 61 may extend into the cavity 34 from a side of the cavity 34, so that the eccentric portion 61 can conveniently extend into the cavity 34, which is beneficial to improving the mounting efficiency of the toggle member 60.

In some embodiments, as shown in FIG. 21 and FIG. 23, a limiting flange 36 is arranged on the shaft cover wall 31, and the limiting flange 36 is arranged opposite to the opening 342. Through this design, the limiting flange 36 functions as a stop to partially or completely limit the eccentric portion 61 in the cavity 34, thereby preventing the eccentric portion 61 from completely moving out of the cavity 34 from the opening 342 during the rotation of the rotating shaft 62. Moreover, a specific gap exists between the limiting flange 36 and the opening of the cavity 34, which provides space for the movement of the eccentric portion 61. In this way, the size of the cavity in the X direction does not need to be excessively large to satisfy the movement space requirement of the eccentric portion in the X direction, which improves the structural compactness in the X direction.

One cavity 34 or a plurality of cavities 34 may be provided on the shaft cover connector 32, which may be determined based on the arrangement position of the second swing arm 23. Exemplarily, as shown in FIG. 21, two cavities 34 are provided on the shaft cover connector 32, and are respectively located on two ends of the shaft cover connector 32 in the width direction of the shaft cover 3.

Figure 24:
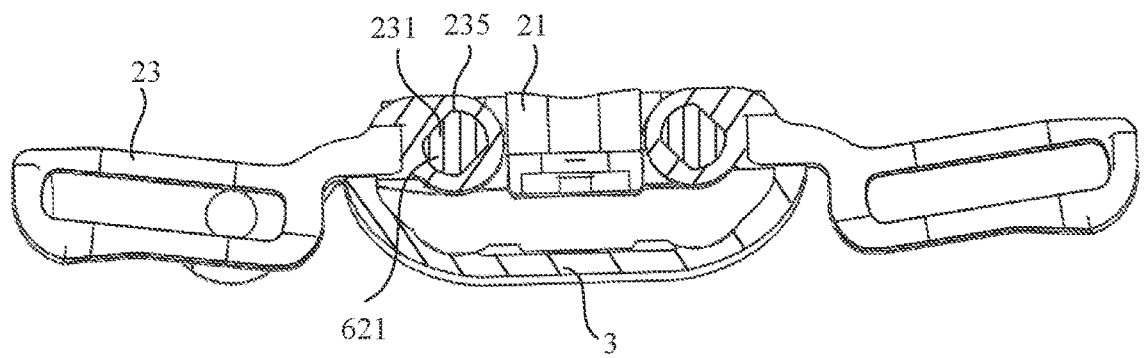
FIG. 24 is a cross-sectional view of connection between a rotating shaft and a first swing arm according to some embodiments of this application.

In some embodiments, as shown in FIG. 21, FIG. 22, and FIG. 24, FIG. 24 is a cross-sectional view of connection between a rotating shaft 62 and a second swing arm 23 according to some embodiments of this application. The rotating shaft 62 includes a flat section 621 and a cylindrical section 622. The eccentric portion 61, the flat section 621, and the cylindrical section 622 are connected in sequence, and the second swing arm 23 is provided with a flat hole 235 fitting the flat section 621, so that the rotating shaft 62 is fixed relative to the second swing arm 23 in a circumferential direction.

The second swing arm 23 is further provided with a swing arm hole 231 fitting the cylindrical section 622. The base 21 is provided with base holes 216 for the flat section 621 and the cylindrical section 622 to be inserted, and a shaft section of the flat section 621 exposed from the flat hole 235 and a shaft section of the cylindrical section 622 exposed from the swing armhole 231 are respectively inserted into the corresponding base hole 216. The base hole may be a circular hole, the two base holes are close to two sides of the second swing arm 23, and the base 21 protrudes from a position close to the two sides of the second swing arm 23 and is provided with the base hole.

Through this design, the structure of the toggle member 60 is simple and compact and occupies relatively small space, and the second swing arm 23 can also drive the rotating shaft 23 to rotate while realizing the rotatable connection between the second swing arm 23 and the base 21, so as to drive the eccentric portion 61 to rotate. Specifically, with reference to FIG. 21, due to the fitting of the flat section 621 and the flat hole 235, the second swing arm 23 drives the eccentric portion 61 to rotate. Due to the fitting of the cylindrical section 622 and the base hole 216, especially when the base hole 216 is circular, the swing arm 22 can rotate smoothly based on the base 21. Moreover, the base hole 216 fitting the flat section 621 does not interfere with the flat section, which may not restrict the rotation of the toggle member 60 or drive the base 21 to move.

A flat surface is provided on a side of the flat section 621. In some embodiments, as shown in FIG. 24, the flat surface is arranged on two opposite sides of the flat shaft section 621. In some other embodiments, the flat surface may alternatively be arranged on one side, three sides, or four sides of the flat shaft section 621 in the circumferential direction, which is not specifically limited herein.

Certainly, the rotating shaft 62 can be fixed relative to the second swing arm 23 in the circumferential direction through fitting of the flat section 621 and the flat hole 235, and the rotating shaft 62 may also be fixed relative to the second swing arm 23 in the circumferential direction of the rotating shaft 62 through key connection. The eccentric portion 61 may be connected to the rotating shaft 62, or may be connected to the position on the second swing arm 23 that is deviated from the axis of the rotating shaft 62 (as shown in FIG. 6d), so that the eccentric portion 61 can also drive the shaft cover 3 to move toward the base 21 during switching of the two sub-bodies 11 to the folded state.

In some embodiments, as shown in FIG. 18, FIG. 20a, and FIG. 21, the base 21 includes a base body 211 and a shaft seat 212 detachably arranged on the base body 211, and the rotating shaft 62 is rotatably arranged on the shaft seat 212. Specifically, the base hole 216 is arranged on the shaft seat 212.

Through this design, when the joint of the rotating shaft 62 is damaged, the damaged structure can be repaired only by disassembling and replacing the shaft seat 212, and it is not necessary to replace the entire base 21, which is beneficial to reducing the maintenance cost.

As shown in FIG. 18 and FIG. 20a, the shaft seat 212 may be detachably connected to the base body 211 through fasteners (such as screws), which is not limited thereto, and the shaft seat 212 may alternatively be detachably connected to the base body 211 through engagement, insertion, and the like.

In some embodiments, as shown in FIG. 20a and FIG. 21, the cavity 34 is provided on the shaft cover connector 32. Through this design, when the structure of the cavity 34 is damaged, the structure of the cavity 34 can be repaired only by disassembling and replacing the shaft cover connector 32, and it is not necessary to replace the entire shaft cover 3, which is beneficial to reducing the maintenance cost. On the other hand, when the position at which the base 21 is connected to the shaft cover 3 is also on the shaft cover connector 32, one object with multifunction may be realized, and components and design space can be saved.

Figure 27:
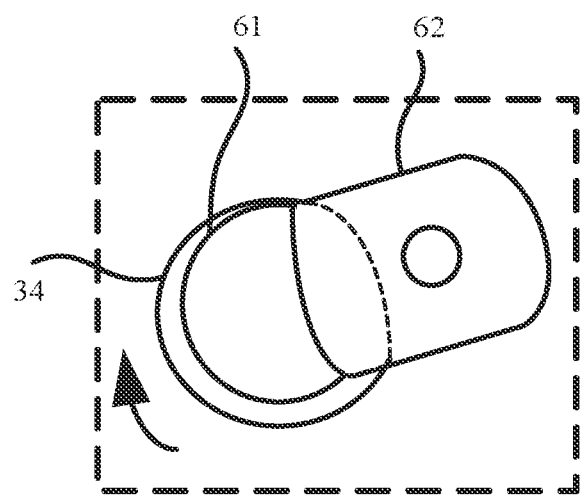
FIG. 27 is a schematic diagram in a case in which a cavity is a circular hole according to some embodiments of this application.

The cavity 34 may be a groove or a hole. The hole may be a round hole or a runway hole, which is not specifically limited herein. FIG. 27 is a schematic diagram of a cavity 34 according to some embodiments of this application that is a circular hole. In this embodiment, the shape of the cavity 34 in FIG. 23 and FIG. 25 is designed as a circle, and other structures remain unchanged. A movable gap is defined between the eccentric portion 61 and the inner wall of the cavity 34. When the second swing arm 23 rotates toward the folded position relative to the base, the rotating shaft 62 is driven by the second swing arm 23 to rotate clockwise, the eccentric portion 61 may abut against the inner wall of the cavity 34, and the eccentric portion 61 is pressed against the upper half of the inner wall of the cavity 34 to drive the shaft cover 3 to move toward the base 21, so as to "lift" the shaft cover 3. When the second swing arm 23 rotates toward the unfolded position relative to the base, the rotating shaft 62 is driven by the second swing arm 23 to rotate counterclockwise, and the eccentric portion 61 abuts and is pressed against the lower half of the inner wall of the cavity 34 to drive the shaft cover 3 to move away from the base 21, so as to "lower" the shaft cover 3.

Figure 28:
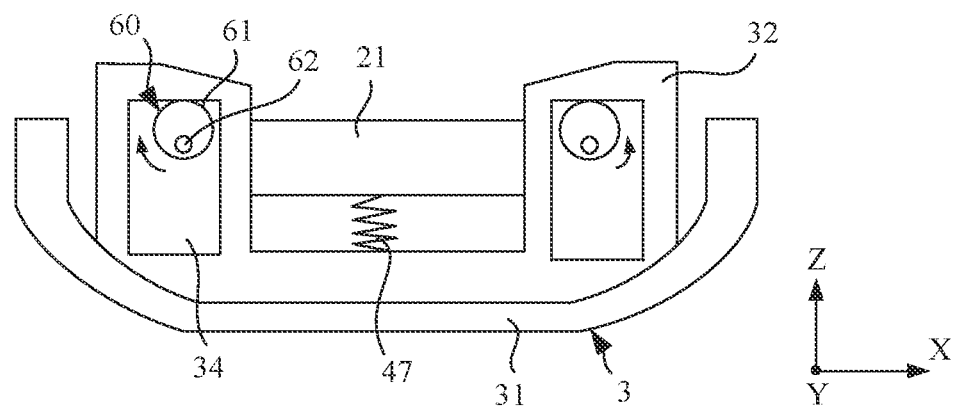
FIG. 28 is a schematic diagram of a mounting relationship between a toggle member and a shaft cover according to some embodiments of this application.

The eccentric portion 61 may be not only a protruding structure as described above, but also an eccentric wheel. As shown in FIG. 28, FIG. 26 is a schematic diagram of a mounting relationship between a toggle member 60 and a shaft cover 3 according to some embodiments of this application. In this embodiment, the eccentric portion 61 is an eccentric wheel, and the rotating shaft 62 is deviated from the center of the eccentric wheel, so that the eccentric wheel is eccentrically arranged relative to the rotating shaft 62, and the rotating shaft 62 is fixed relative to the second swing arm 23 in the circumferential direction. The cavity 34 is a groove, and the groove extends in the Z-axis direction. A restoring member 47 is arranged between the base 21 and the shaft cover connector 32. The restoring member 47 is configured to apply a restoring force to the shaft cover 3 to move the shaft cover 3 away from the base 21, so that the eccentric wheel abuts against an upper inner wall of the cavity 34. Exemplarily, the restoring member 47 is a spring, the spring is in a compressed state, one end of the spring abuts against the shaft cover connector 32, and the other end of the spring abuts against the base 21.

The toggle member 60 located on the left is used as an example to describe the process of movement. When the rotating shaft 62 rotates clockwise (that is, when the second swing arm 23 rotates toward the folded position), as a distance between the abutment point of the eccentric wheel and the upper inner wall of the cavity 34 and the axis of the rotating shaft 62 increases, the eccentric wheel is pressed against the upper inner wall of the cavity 34, and the eccentric wheel drives the shaft cover 3 to move toward the base 21 (in the upward direction in the figure), so as to "lift" the shaft cover 3. When the rotating shaft 62 rotates counterclockwise (that is, when the second swing arm 23 rotates toward the unfolded position), as the distance between the abutment point of the eccentric wheel and the upper inner wall of the cavity 34 and the axis of the rotating shaft 62 decreases, the eccentric wheel applies no squeezing force to the upper inner wall of the cavity 34 at this point, and the shaft cover 3 moves away from the base 21 (in the downward direction in the figure) under the action of the restoring force of the restoring member 47, so as to "lower" the shaft cover 3.

In the foregoing embodiments shown in FIG. 21 to FIG. 28, the eccentric portion 61 extends into the cavity 34 on the shaft cover 3. When the swing arm 22 rotates toward the folded position relative to the base 21, the eccentric portion 61 may move in the cavity 34 and abut against the inner wall of the cavity 34, so as to drive the shaft cover 3 to move toward the base 21 to "lift" the shaft cover 3. The eccentric portion 61 is arranged in the cavity 34. In this way, the cavity 34 can limit the eccentric portion 61, and the eccentric portion 61 may not be detached from the shaft cover 3, thereby improving the connection reliability between the toggle member 60 and the shaft cover 3.

Figure 29:
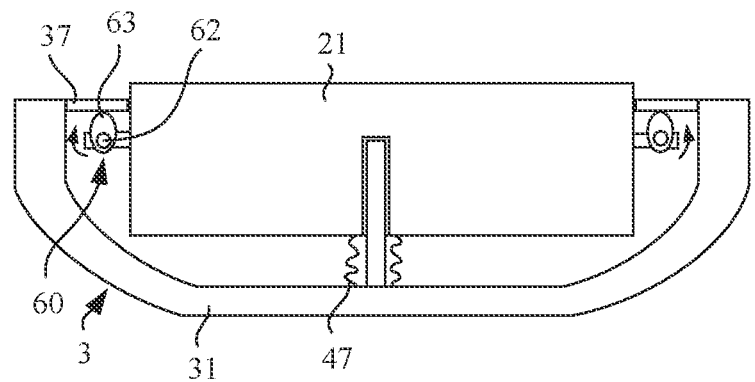
FIG. 29 is a schematic diagram of a mounting relationship between a toggle member and a shaft cover according to some other embodiments of this application.

In addition to the foregoing structure of the toggle member 60, the eccentric portion 61 of the toggle member 60 may alternatively be arranged as a cam. FIG. 29 is a schematic diagram of a mounting relationship between a toggle member 60 and a shaft cover 3 according to some other embodiments of this application. In this embodiment, the eccentric portion 61 is a cam, a rotating shaft 62 is fixed relative to the cam in the circumferential direction, the cam profile is in the shape of an oval, and the cam and the rotating shaft 61 are arranged eccentrically. In other words, a geometric central axis of the cam is different from the central axis of the rotating shaft 61. The shaft cover 3 further includes an abutment flange 37. The abutment flange 37 is arranged on a shaft cover wall 31 at a side edge of the shaft cover 3 in the width direction X of the shaft cover 3. A restoring member 47 is arranged between the base 21 and the shaft cover connector 32. The restoring member 47 is configured to apply a restoring force to the shaft cover 3 to move the shaft cover 3 away from the base 21, so that the cam abuts against the abutment flange 37. Exemplarily, the restoring member 47 is a spring, the spring is in a compressed state, one end of the spring abuts against the shaft cover wall 31, and the other end of the spring abuts against the base 21.

The toggle member 60 located on the left is used as an example to describe the process of movement. When the rotating shaft 62 rotates clockwise (that is, when the second swing arm 23 rotates toward the folded position), as a distance between the abutment point of the cam and the abutment flange 37 and the axis of the rotating shaft 62 increases, the cam and the abutment flange 37 are pressed against each other, and the cam drives the shaft cover 3 to move toward the base 21, so as to "lift" the shaft cover 3. When the rotating shaft 62 rotates counterclockwise (that is, when the second swing arm 23 rotates toward the unfolded position), as the distance between the abutment point of the cam and the abutment flange 37 and the axis of the rotating shaft 62 decreases, the cam applies no squeezing force to the abutment flange 37 at this point, and the shaft cover 3 moves away from the base 21 under the restoring force of the restoring member 47, so as to "lower" the shaft cover 3.

In embodiments shown in FIG. 21 to FIG. 29, the toggle member 60 includes a rotating shaft 62 and an eccentric portion 61 eccentrically arranged with respect to the rotating shaft 62. The swing arm 22 is rotatably connected to the base 21 through the rotating shaft 62, the rotating shaft 62 is fixed relative to the swing arm 22 in the circumferential direction, and the eccentric portion 61 abuts against the shaft cover 3. The eccentric portion 61 drives the shaft cover 3 to move toward the base 21 during rotation of the swing arm 22 from the unfolded position to the folded position. The eccentric portion 61 is arranged eccentrically relative to the rotating shaft 62, so that during rotation of the swing arm 22, a movement trajectory of the eccentric portion 61 occupies less space, and the eccentric portion may not interfere with surrounding components.

With the design of the toggle member 60 in any one of the foregoing embodiments, the toggle member 60 may rotate with the swing arm 22 to drive the shaft cover 3 to move toward the base 21 during rotation of the second swing arm 23 from the unfolded position to the folded position, so as to "lift" the shaft cover 3. In this way, the connection structure between the connection assembly 6 and the shaft cover 3 can be simpler, and a number of components of the connection assembly 6 can be relatively small, which is not only beneficial to reducing the cost, but also beneficial to improving the connection reliability between the connection assembly 6 and the shaft cover 3.

Figure 30:
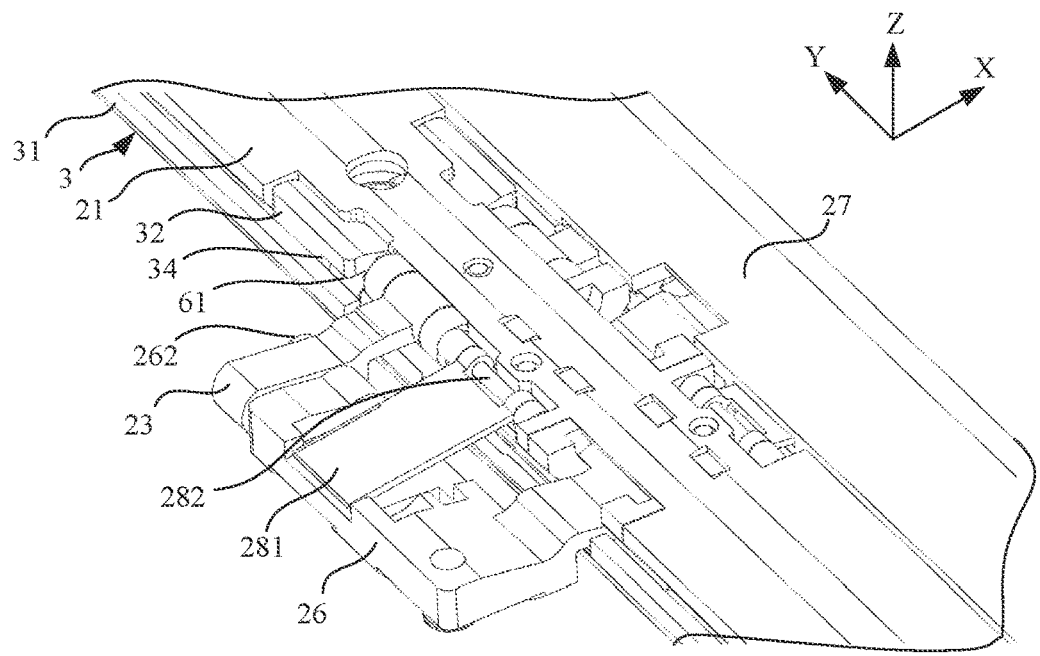
FIG. 30 is a partial view of a middle part of the rotating shaft mechanism in FIG. 13.
Figure 31:
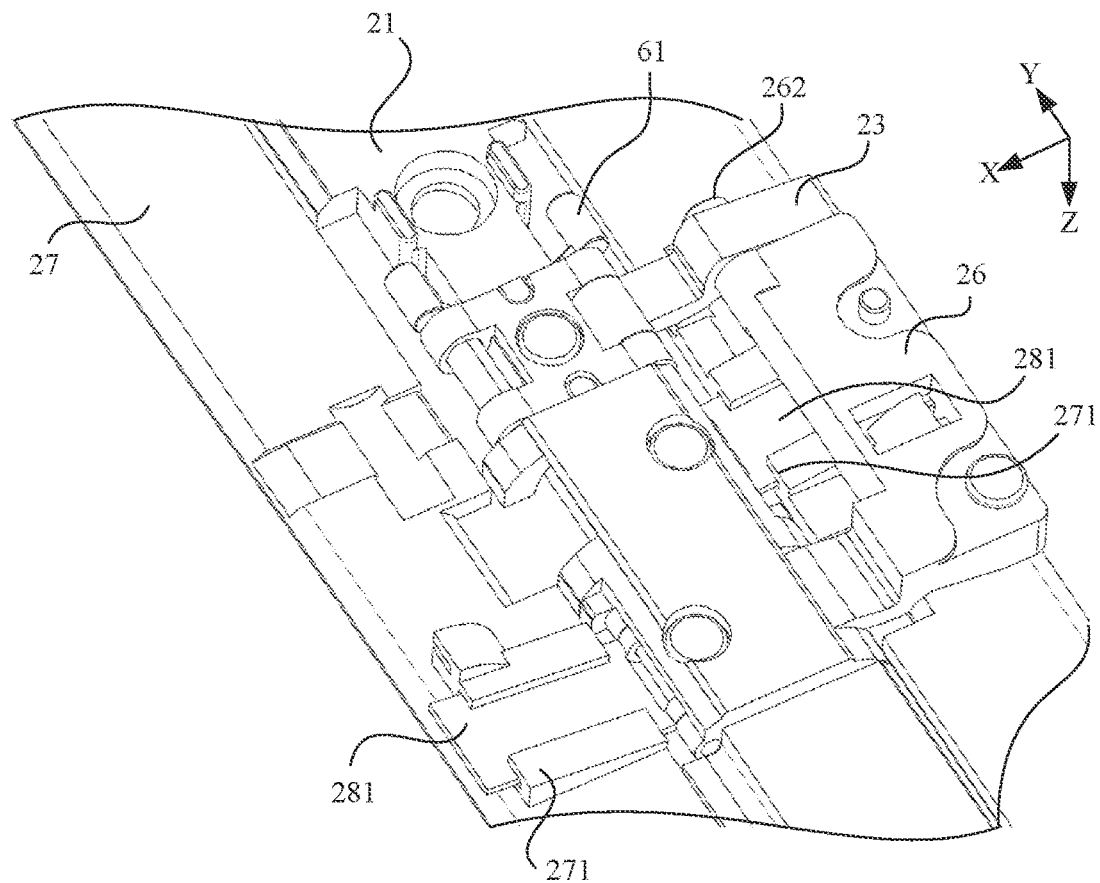
FIG. 31 is a partial view of a middle part of the rotating shaft mechanism in FIG. 14.
Figure 32:
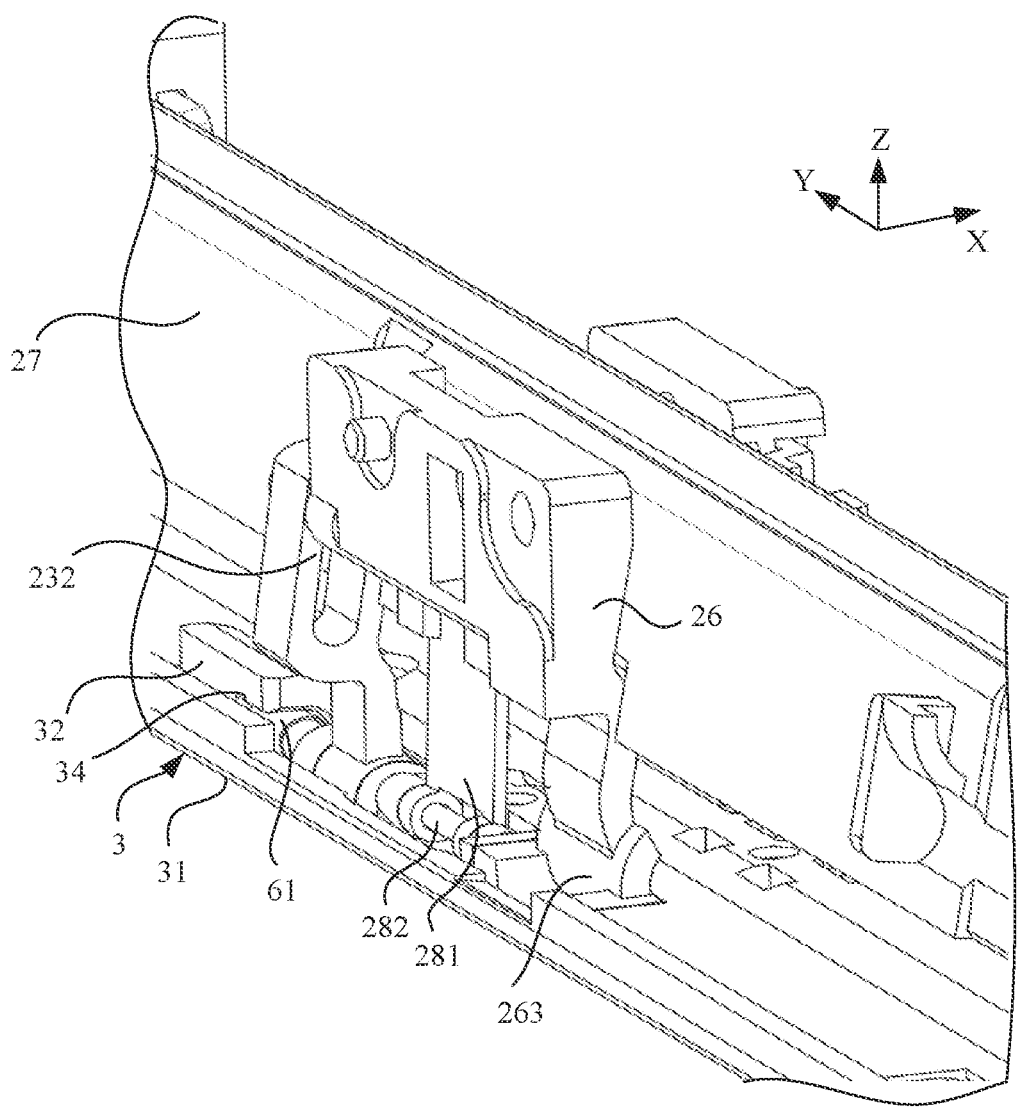
FIG. 32 is a partial view of a middle part of the rotating shaft mechanism in FIG. 15.
Figure 33:
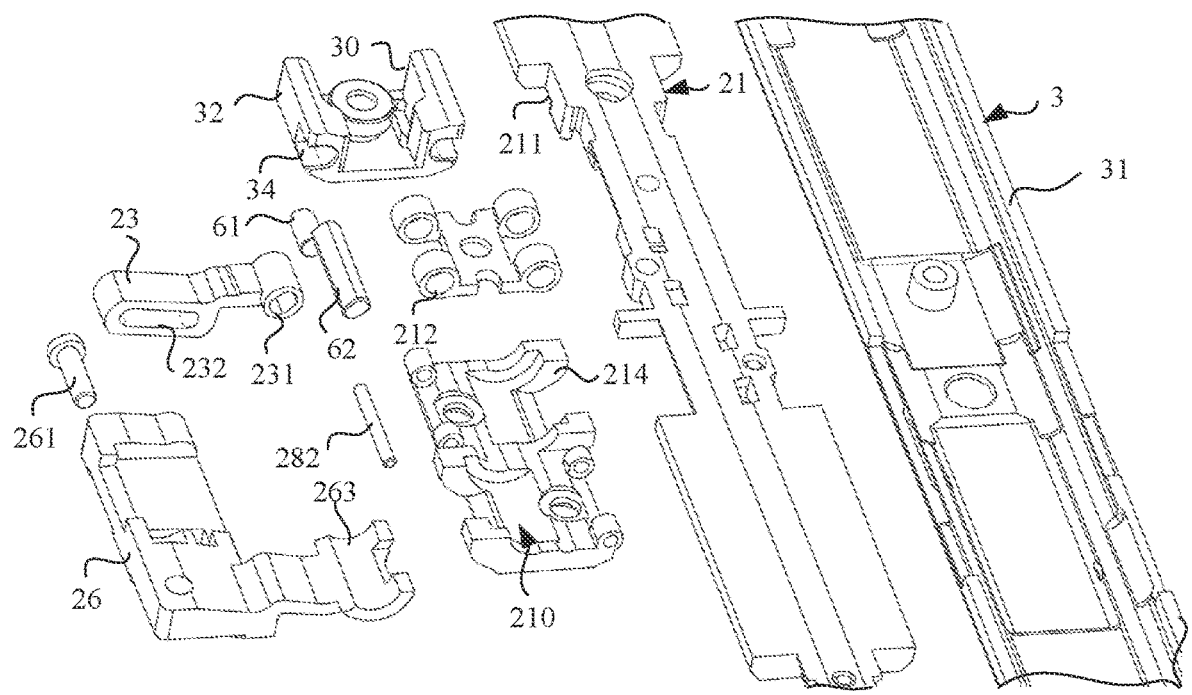
FIG. 33 is an exploded view of a first swing arm, a second swing arm, a base, and a shaft cover in FIG. 30.
Figure 34:
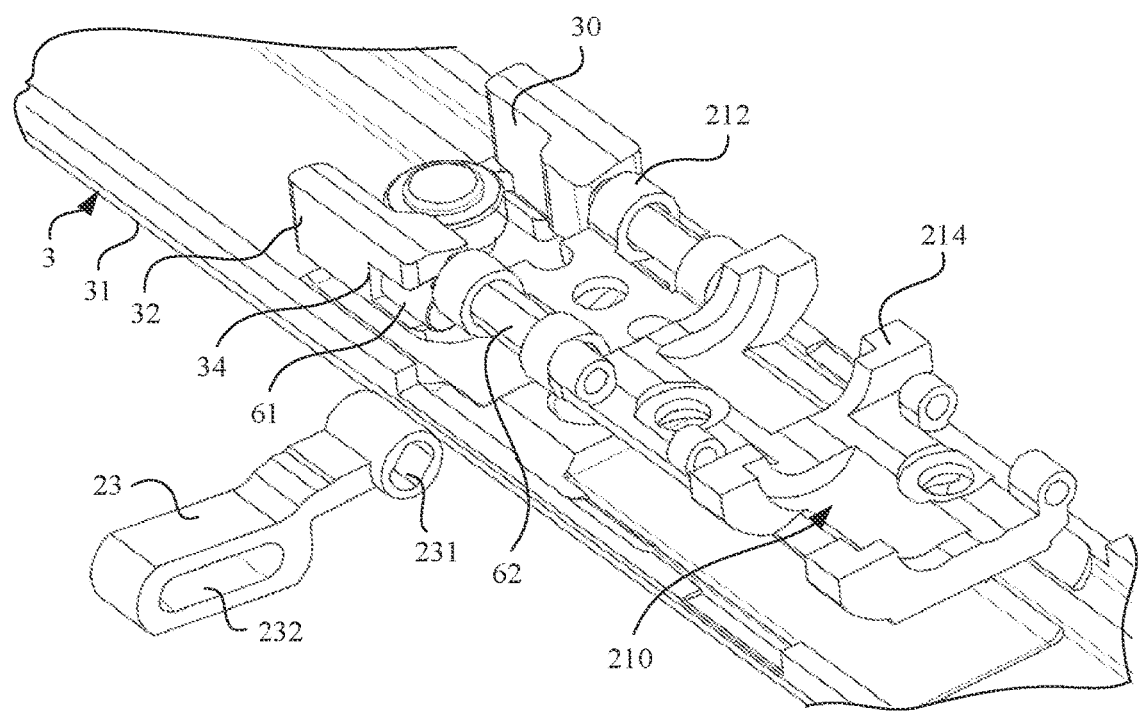
FIG. 34 is an exploded view of the second swing arm and the base in FIG. 17.
Figure 35:
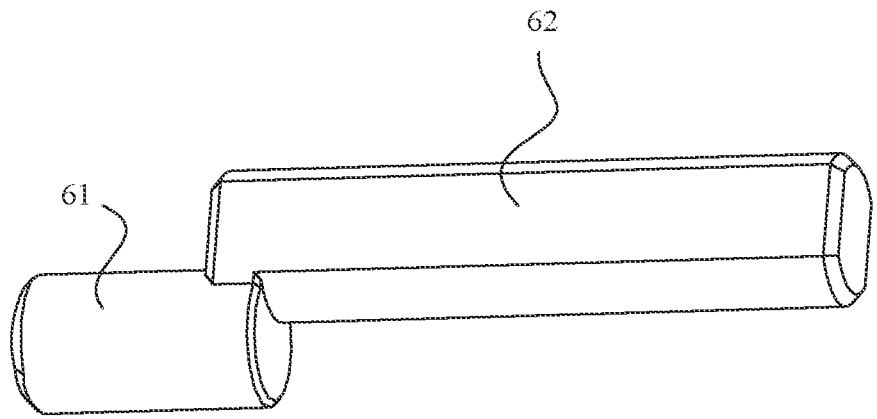
FIG. 35 is a schematic diagram of a toggle member according to some embodiments of this application.
Figure 36:
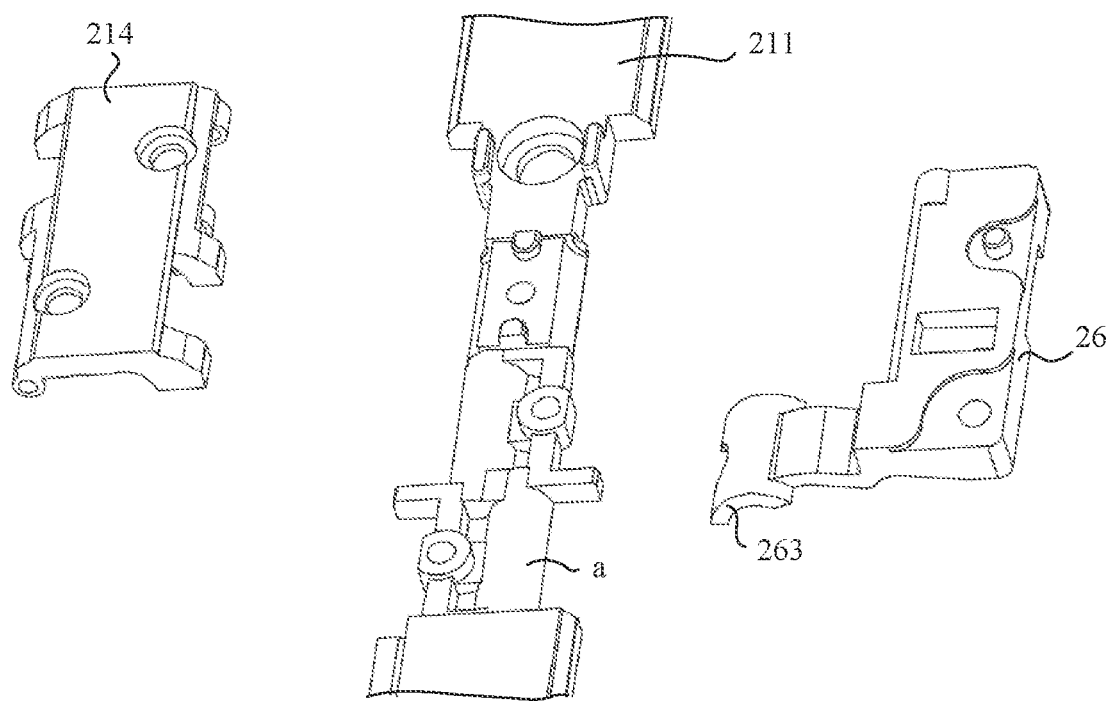
FIG. 36 is an exploded view of the first swing arm and the base in FIG. 30.

FIG. 30 to FIG. 36 are schematic diagrams showing a structure and a mounting manner of the swing arm 22 located in the middle of the shaft cover 3 in a length direction Y. FIG. 30 is a partial view of the middle of the rotating shaft mechanism 120 in FIG. 13, FIG. 31 is a partial view of the middle of the rotating shaft mechanism 120 in FIG. 14, FIG. 32 is a partial view of the middle of the rotating shaft mechanism 120 in FIG. 15, FIG. 33 is an exploded view of a second swing arm 23, a first swing arm 26, a base 21, and a shaft cover 3 in FIG. 30, FIG. 34 is an exploded view of the first swing arm 26 and the base 21 in FIG. 17, FIG. 35 is a schematic diagram of connection between an eccentric portion 61 and a shaft cover 3 according to some embodiments of this application, and FIG. 36 is an exploded view of the first swing arm 26 and the base 21 in FIG. 30.

The main difference between the structure of the swing arm 22 shown in FIG. 30 to FIG. 36 and the structure of the swing arm 22 shown in FIG. 17 to FIG. 23 is that: the positional relationship between the first swing arm 26 and the second swing arm 23 is different, and the structure of the rotating shaft 62 is different.

As shown in FIG. 31 and FIG. 32, in the Y-axis direction, the first swing arm 26 and the second swing arm 23 are arranged side by side. In other words, the first swing arm 26 is located on a side of the second swing arm 23. This design can facilitate the mounting and disassembly between the first swing arm 26 and the second swing arm 23, and an avoidance opening does not need to be provided on the first swing arm 26, so that the structure of the first swing arm 26 is simpler.

As shown in FIG. 33, FIG. 34, and FIG. 35, all parts of the rotating shaft 62 in the length direction Y are flat shafts (some shaft sections of the rotating shaft 62 shown in FIG. 22 are flat shafts). This design can simplify the structure of the rotating shaft 62 and facilitate the processing of the rotating shaft 62.

For the specific structure of the interconnection of the second swing arm 23, the first swing arm 26, the base 21, and the shaft cover 3 in this embodiment, reference may be made to the description of embodiments shown in FIG. 17 to FIG. 23, and the details are not described herein again.

In some embodiments, as shown in FIG. 6i, FIG. 11, and FIG. 12, the rotating shaft mechanism 120 further includes a support member 27, and a front of the support member 27 is configured for a display screen 200 to be arranged. A back of the support member 27 is rotatably connected to the swing arm 22, and the support member 27 is further rotatably connected to the base 21 through a second connection structure 29, so that the support member 27 is drivable by the swing arm 22 to swing relative to the base 21.

As shown in FIG. 11 and FIG. 12, two support members 27 are arranged, and the swing arm 22 is arranged on a side of each of the support members 27 facing away from an arrangement space 10.

The support member 27 is configured to support a part of the display screen 200. Specifically, the support member 27 is configured to support the third display region 230 of the display screen 200 shown in FIG. 1. When the two sub-bodies 11 of the terminal device are in the unfolded state, surfaces on the sub-bodies 11 for the display screen 200 to be arranged, a surface on the support member 27 for the display screen 200 to be arranged, and a surface on the base 21 for the display screen 200 to be arranged are approximately coplanar (as shown in FIG. 11).

In the process of switching the two sub-bodies 11 to the folded state, the first swing arm 26 may drive the support member 27 to swing relative to the base 21, so that the support member 27 can well support and protect a bent portion of the display screen 200 (the third display region 230 in FIG. 1). When the two sub-bodies 11 are in the folded state, as shown in FIG. 6i and FIG. 12, a rotation angle of the support member 27 relative to the base 21 is greater than a rotation angle of the sub-bodies 11 relative to the base 21. Since the first swing arm 26 is fixed to the sub-bodies 11, the rotation angle of the sub-bodies 11 relative to the base 21 is equal to the rotation angle of the first swing arm 26 relative to the base 21. In other words, the rotation angle of the support member 27 relative to the base 21 is greater than the rotation angle of the first swing arm 26 relative to the base 21. On the premise that the rotation angle of the first swing arm 26 is 90 degrees, the rotation angle of the support member 27 is greater than 90 degrees, such as 100 degrees or 110 degrees, which is not specifically limited herein. In this case, the two support members 27 are arranged to be overall in a "splayed" shape (as shown in FIG. 12) to better accommodate the bent portion of the display screen 200 (the third display region 230 in FIG. 1), so as to prevent excessive squeezing of the bent portion of the display screen 200 from affecting the normal operation of the display screen 200.

As shown in FIG. 11 and FIG. 12, the support member 27 is a plate-like structure, and in this case, the support member 27 may also be referred to as a "door panel". Through this design, a contact area between the support member 27 and the display screen 200 can be increased, so that the two support members 27 can support the display screen 200 more desirably. Certainly, the support member 27 may alternatively be arranged as a frame structure in addition to the plate-like structure.

The structure of the second connection structure 29 is not unique. In some embodiments, as shown in FIG. 14, FIG. 15, and FIG. 16a, the second connection structure 29 includes a third swing arm 281 and a fitting groove 271. The third swing arm 281 is rotatably connected to the base 21 through a rotating shaft 282, and the support member 27 is provided with the fitting groove 271. One end of the fitting groove 271 is arranged close to the rotating shaft 282, and the other end of the fitting groove 271 is arranged away from the rotating shaft 282 (as shown in FIG. 16a). The third swing arm 281 slidably fits the fitting groove 271. Through this design, when the two sub-bodies 11 are switched to the unfolded state (the process from FIG. 15 to FIG. 14), while the two support members 27 are driven by the first swing arm 26 to be unfolded, the third swing arm 281 and the support member 27 slide relative to each other, so that the support member 27 is close to the base 21, thereby reducing a gap between the support member 27 and the base 21, so that the support member 27 and the base 21 can better support the display screen 200.

In the process of switching the two sub-bodies 11 to the folded state (the process from FIG. 14 to FIG. 15), while the two support members 27 are driven by the first swing arm 26 to move closer, the third swing arm 281 and the support member 27 slide relative to each other, so that the support member 27 moves away from the base 21, and the two support members 27 may be arranged to be overall in a "splayed" shape to better accommodate the bent portion of the display screen 200, so as to prevent excessive squeezing of the bent portion of the display screen 200 from affecting the normal operation of the display screen 200. The second connection structure 29 is simple in structure, requires fewer components, and has relatively high connection reliability.

Certainly, in addition to the foregoing structure, the second connection structure 29 may alternatively be another structure, such as a structure that may be slidably fitted through a shaft hole. The third swing arm 281 is arranged in a rod shape, and the support member 27 is provided with a sliding hole. One end of the sliding hole is arranged close to the rotating shaft 282, and the other end thereof is arranged away from the rotating shaft 282. The third swing arm 281 slidably fits the sliding hole.

Figure 16C:
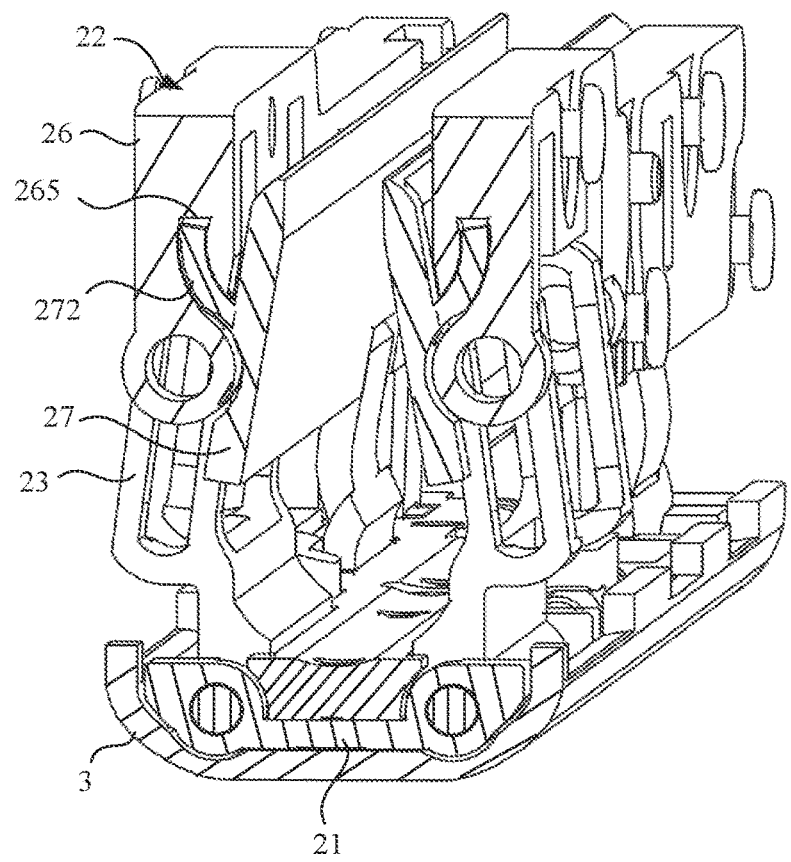
FIG. 16c is a cross-sectional view of the rotating shaft mechanism in FIG. 14 in a folded state and with the shaft cover being not removed taken along B-B.

The support member 27 may be rotatably connected to the first swing arm 26 through the following structure. In some embodiments, as shown in FIG. 16b, FIG. 16c, FIG. 19, and FIG. 20a, FIG. 16b is a cross-sectional view of the rotating shaft mechanism 120 in FIG. 14 with the shaft cover not being removed taken along B-B, and FIG. 16c is a cross-sectional view of the rotating shaft mechanism 120 in FIG. 14 in a folded state and with the shaft cover not being removed taken along B-B. The second swing arm 26 is provided with a second arc-shaped groove 265, the support member 27 is provided with a second arc-shaped sheet 272, and the second arc-shaped sheet 272 slidably fits the second arc-shaped groove 265, so that the support member 27 is rotatably connected to the second swing arm 26. In this way, a contact area between the second arc-shaped sheet 272 and the second arc-shaped groove 265 can be larger, and the second arc-shaped sheet 272 may not shake when the second arc-shaped sheet 272 slides relative to the second arc-shaped groove 265, so that the support member 27 rotates more stably relative to the second swing arm 26.

Certainly, the arrangement positions of the second arc-shaped groove 265 and the second arc-shaped sheet 272 may also be mutually swapped. In other words, the second arc-shaped groove 265 is provided on the support member 27, and the second arc-shaped sheet 272 is arranged on the second swing arm 26, so that the support member 27 can rotate more stably relative to the second swing arm 26.

In some embodiments, as shown in FIG. 11, the base 21 has a support surface 213 for supporting the display screen 200, and the shaft cover 3 does not protrude from the support surface 213 when the two sub-bodies 11 are in the unfolded state. This design can prevent the shaft cover 3 from pushing against the display screen 200 to cause damage to the display screen 200, thereby ensuring the normal operation of the display screen 200.

In some embodiments, as shown in FIG. 11 and FIG. 12, when the two sub-bodies 11 are in the folded state, the shaft cover 3 protrudes from the support surface 213, and a safety gap (not shown in the figure) is defined between the shaft cover 3 and the display screen 200. The shaft cover 3 is arranged to protrude from the support surface 213, it may be ensured that the shaft cover 3 has enough "lifting amount" relative to the base 21, which is beneficial to increasing the amount of overlap between the shaft cover 3 and the sub-bodies 11. In addition, the safety gap is defined between the shaft cover 3 and the display screen 200, which can prevent the shaft cover 3 from pushing against the display screen 200 to cause damage to the display screen 200, thereby ensuring the normal operation of the display screen 200.

The number of sub-bodies 11 in the terminal device in this embodiment of this application is not limited to two, or may be three or more, and two adjacent sub-bodies 11 are connected through the foregoing rotating shaft mechanism 120. In other words, the rotating shaft mechanism 120 is arranged at the joint between the sub-bodies 11. The terminal device may fold the display screen for more than 200 times, which is more conducive to reducing the volume of the terminal device and facilitating carrying.

In the descriptions of this specification, the specific features, structures, materials, or characteristics may be combined in a proper manner in any one or more of embodiments or examples.

Finally, it should be noted that: the foregoing embodiments are merely used for describing the technical solutions of this application, but are not intended to limit this application. Although this application is described in detail with reference to the foregoing embodiments, it should be appreciated by a person skilled in the art that, modifications may still be made to the technical solutions described in the foregoing embodiments, or equivalent replacements may be made to the part of the technical features; and these modifications or replacements do not cause the essence of corresponding technical solutions to depart from the spirit and scope of the technical solutions in embodiments of this application.

What is claimed is:

1. A rotating shaft mechanism, comprising a base, a swing arm, a connection assembly, and a shaft cover, wherein
the shaft cover is provided with an accommodating space, at least part of the base is arranged in the accommodating space, and the swing arm is rotatably connected to the base, so that the swing arm is rotatable between an unfolded position and a folded position relative to the base; and
the connection assembly is connected between the swing arm and the shaft cover, and the swing arm drives the shaft cover to move toward the base through the connection assembly during rotation of the swing arm from the unfolded position to the folded position.

2. The rotating shaft mechanism according to claim 1, wherein the connection assembly comprises a toggle member, and the toggle member rotates with the swing arm to drive the shaft cover to move toward the base during rotation of the swing arm from the unfolded position to the folded position.

3. The rotating shaft mechanism according to claim 2, wherein the toggle member comprises a rotating shaft and an eccentric portion eccentrically arranged relative to the rotating shaft, the swing arm is rotatably connected to the base through the rotating shaft, the rotating shaft is fixed relative to the swing arm in a circumferential direction, and the eccentric portion abuts against the shaft cover to drive the shaft cover to move toward the base during rotation of the swing arm from the unfolded position to the folded position.

4. The rotating shaft mechanism according to claim 3, wherein the shaft cover is provided with a cavity, the eccentric portion extends into the cavity, and the eccentric portion is movable in the cavity and abuts against an inner wall of the cavity to drive the shaft cover to move toward the base during rotation of the swing arm toward the folded position relative to the base.

5. The rotating shaft mechanism according to claim 4,
wherein the eccentric portion is movable in the cavity in a width direction of the shaft cover; and
wherein in a first direction, the cavity has a first inner wall and a second inner wall opposite to each other, the first inner wall and the second inner wall abut against the eccentric portion, and the first direction is perpendicular to both a length direction of the shaft cover and the width direction of the shaft cover.

6. The rotating shaft mechanism according to claim 4, wherein the shaft cover comprises a shaft cover wall and a shaft cover connector, the shaft cover wall defines the accommodating space, at least part of the shaft cover connector is arranged in the accommodating space and detachably connected to the shaft cover wall, and the cavity is arranged on the shaft cover connector.

7. The rotating shaft mechanism according to claim 6, wherein the shaft cover connector is slidably connected to the base in a first direction, and the first direction is perpendicular to both a length direction of the shaft cover and a width direction of the shaft cover.

8. The rotating shaft mechanism according to claim 6, wherein in a width direction of the shaft cover, an end of the shaft cover connector is provided with an opening in communication with the cavity, and the opening is configured for the eccentric portion to extend into the cavity.

9. The rotating shaft mechanism according to claim 8, wherein a limiting flange is arranged on the shaft cover wall, and the limiting flange is arranged opposite to the opening to limit at least part of the eccentric portion in the cavity.

10. The rotating shaft mechanism according to claim 3, wherein the eccentric portion is a columnar structure protruding relative to the rotating shaft, and a central axis of the eccentric portion is parallel to and different from a central axis of the rotating shaft.

11. The rotating shaft mechanism according to claim 10, wherein
the rotating shaft comprises a flat section and a cylindrical section, and the eccentric portion, the flat section, and the cylindrical section are connected in sequence;
the swing arm is provided with a flat hole fitting the flat section, so that the rotating shaft is fixed relative to the swing arm in the circumferential direction;
the swing arm is further provided with a swing arm hole fitting the cylindrical section; and
the base is provided with base holes for the flat section and the cylindrical section to be inserted, and a shaft section of the flat section exposed from the flat hole and a shaft section of the cylindrical section exposed from the swing arm hole are respectively inserted into the corresponding base hole.

12. The rotating shaft mechanism according to claim 10, wherein the eccentric portion and the rotating shaft are integrally formed.

13. The rotating shaft mechanism according to claim 1, wherein the shaft cover is slidably connected to the base in a first direction, so that the shaft cover is movable toward the base in the first direction, and the first direction is perpendicular to both a length direction of the shaft cover and a width direction of the shaft cover.

14. The rotating shaft mechanism according to claim 1, wherein the swing arm drives the shaft cover to move away from the base through the connection assembly during rotation of the swing arm from the folded position to the unfolded position.

15. The rotating shaft mechanism according to claim 1,
wherein the swing arm comprises a first swing arm and a second swing arm, the first swing arm and the second swing arm are both rotatably connected to the base, the second swing arm has the unfolded position and the folded position, and the second swing arm is connected to the shaft cover through the connection assembly; and
wherein the first swing arm is connected to the second swing arm through a first connection structure, so that the first swing arm drives the second swing arm to rotate between the unfolded position and the folded position.

16. The rotating shaft mechanism according to claim 15, wherein
the first connection structure comprises a sliding groove and a sliding part, the sliding groove is arranged on one of the first swing arm and the second swing arm, and the sliding part is arranged on the other of the first swing arm and the second swing arm; and
one end of the sliding groove is arranged close to the base, the other end of the sliding groove is arranged away from the base, and the sliding part slidably fits the sliding groove.

17. The rotating shaft mechanism according to claim 15, wherein:
the first swing arm and the second swing arm are arranged side by side in a length direction of the shaft cover; or
the first swing arm is provided with an avoidance notch, and the second swing arm extends into the avoidance notch.

18. The rotating shaft mechanism according to claim 15, wherein the base is provided with a first arc-shaped groove, the first swing arm is provided with a first arc-shaped sheet, and the first arc-shaped sheet slidably fits the first arc-shaped groove, so that the first swing arm is rotatably connected to the base.

19. A terminal device, comprising:
a display screen;
at least two sub-bodies arranged adjacent to each other: and
a rotating shaft mechanism, wherein the rotating shaft mechanism comprises a base, a swing arm, a connection assembly, and a shaft cover;
wherein the shaft cover is provided with an accommodating space, at least part of the base is arranged in the accommodating space, and the swing arm is rotatably connected to the base, so that the swing arm is rotatable between an unfolded position and a folded position relative to the base;
wherein the connection assembly is connected between the swing arm and the shaft cover, and the swing arm drives the shaft cover to move toward the base through the connection assembly during rotation of the swing arm from the unfolded position to the folded position; and wherein the at least two sub-bodies are configured to bear the display screen, and the rotating shaft mechanism is located at a joint between the at least two sub-bodies.

20. The terminal device according to claim 19, wherein swing arm of the rotating shaft mechanism is connected to the at least two sub-bodies, the swing arm is at a folded position when the at least two sub-bodies are in a folded state, and the swing arm is at an unfolded position when the at least two sub-bodies are in an unfolded state.

* * * * *